United States Patent [19]

Staas, Jr.

[11] 3,745,531
[45] July 10, 1973

[54] RANDOM ACCESS TAPE MACHINE
[75] Inventor: Philip C. Staas, Jr., Malvern, Pa.
[73] Assignee: Control Sciences, Inc., Malvern, Pa.
[22] Filed: Nov. 25, 1970
[21] Appl. No.: 92,819

[52] U.S. Cl............................ 340/172.5, 340/174.1
[51] Int. Cl. ............................................... G11b 5/00
[58] Field of Search..................... 340/172.5, 174.1, 340/172.5; 235/157; 35/9 A

[56] References Cited
UNITED STATES PATENTS

| | | | |
|---|---|---|---|
| 3,484,751 | 12/1969 | Cameron et al. | 340/172.5 |
| 3,141,243 | 7/1964 | Chapman et al. | 35/9 A |
| 3,294,924 | 12/1966 | Fein | 179/100.1 |
| 3,355,718 | 11/1967 | Talarczyk | 340/172.5 |
| 3,273,260 | 9/1966 | Walker | 35/9 A |
| 3,330,915 | 7/1967 | Roberts et al. | 179/100.2 S |
| 3,360,873 | 1/1968 | Tillotson et al. | 35/9 A |

Primary Examiner—Paul J. Henon
Assistant Examiner—Mark Edward Nusbaum
Attorney—Irons, Sears, Staas, Halsey and Santorelli

[57] ABSTRACT

A digitally controlled magnetic tape system provides storage and retrieval of information in accordance with random accessing and affords branching within the program recorded on the tape. Both random accessing and branching operations are performed at high speed for either forward or reverse directions of tape drive to position the tape at a desired, specified address. The digital control also affords ancillary control functions for providing synchronized operation of external devices, such as visual aids, in replay of the tape. The system provides both for the preparation of a programmed tape and automatic playback of that tape in accordance with the recorded program and in response to various input controls coordinated with the program. The system has particular application as a teaching machine wherein an instructor may record a lecture, a question, and multiple choice answers. An evaluation of each proposed answer may then be recorded, with a corresponding control word. Selection of a given answer choice by a student in subsequent play operations automatically presents the instructor's comment to the student, and may provide a grading and scoring operation. Reading of the control word causes the system to automatically present the next instructional segment as defined by the program, and in accordance with the automatic branching and random accessing capabilities of the system. Manual control of the play operation is provided, such as random accessing, to select a tape position for initiation of the program and to permit repeat of questions, while assuring proper operation of the machine in accordance with the desired program.

54 Claims, 30 Drawing Figures

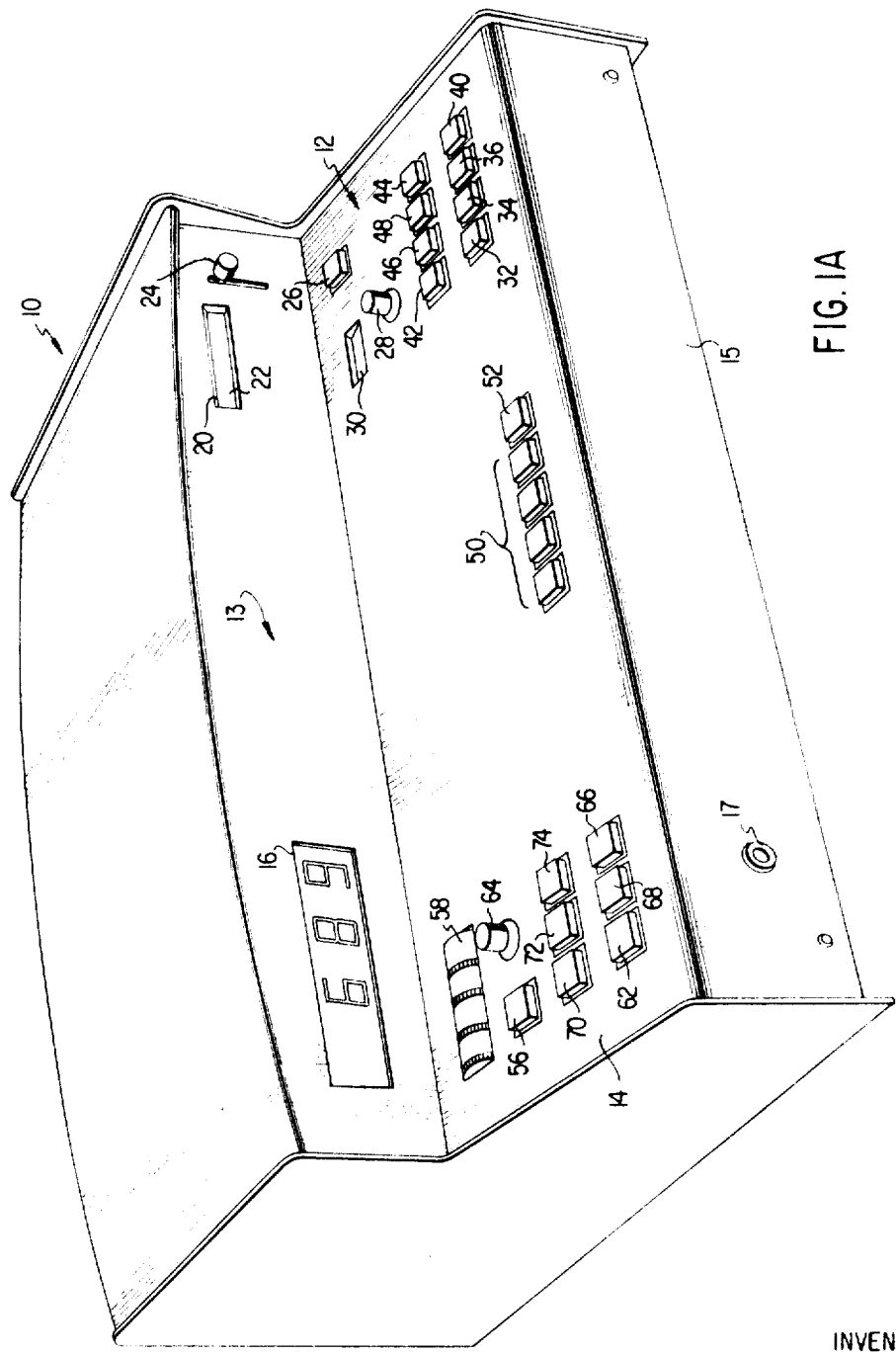

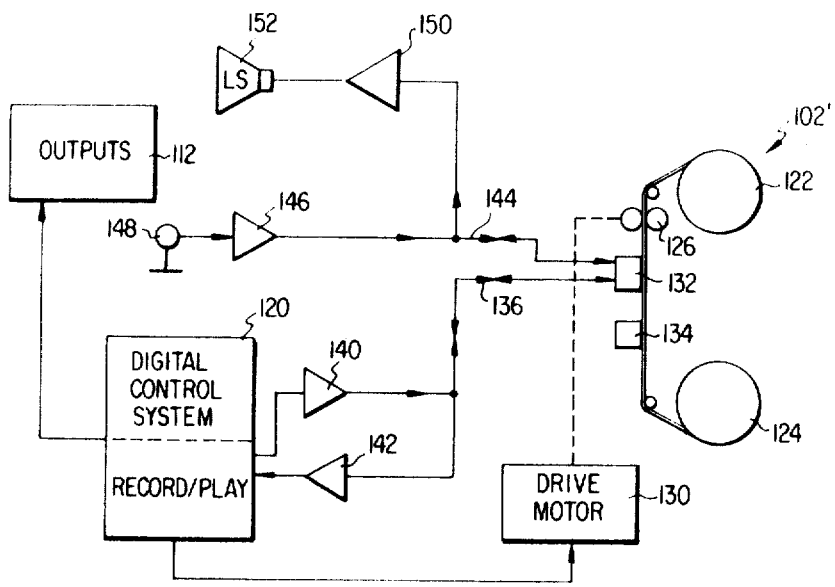
FIG. 3
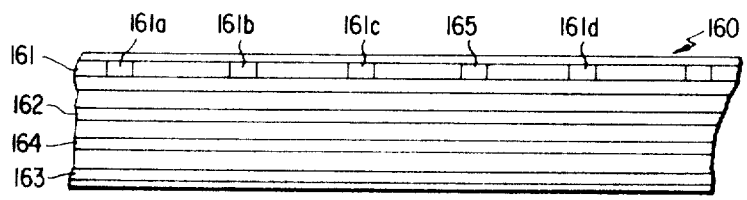
FIG. 4
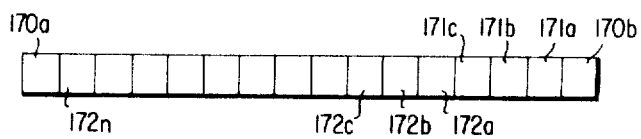
FIG. 5A
| CONTROL WORDS | 171a | 171b | 171c | 172a | 172b | 172c | | 172n |
|---|---|---|---|---|---|---|---|---|
| STOP | 1 | 0 | 0 | — | — | — | | — |
| ANSWER (X) | 0 | 1 | 0 | 1/0 | 1/0 | — | | 1/0 |
| BRANCH [WORD(X)] | 0 | 1 | 1 | 1/0 | 1/0 | 1/0 | | — |
| Q START | 1 | 1 | 0 | — | — | — | | — |
| VISUAL | 1 | 0 | 1 | 1/0 | 1/0 | 1/0 | | — |
| INDEX WORD | 1 | 1 | 1 | 1/0 | 1/0 | 1/0 | | 1/0 |
FIG. 5B

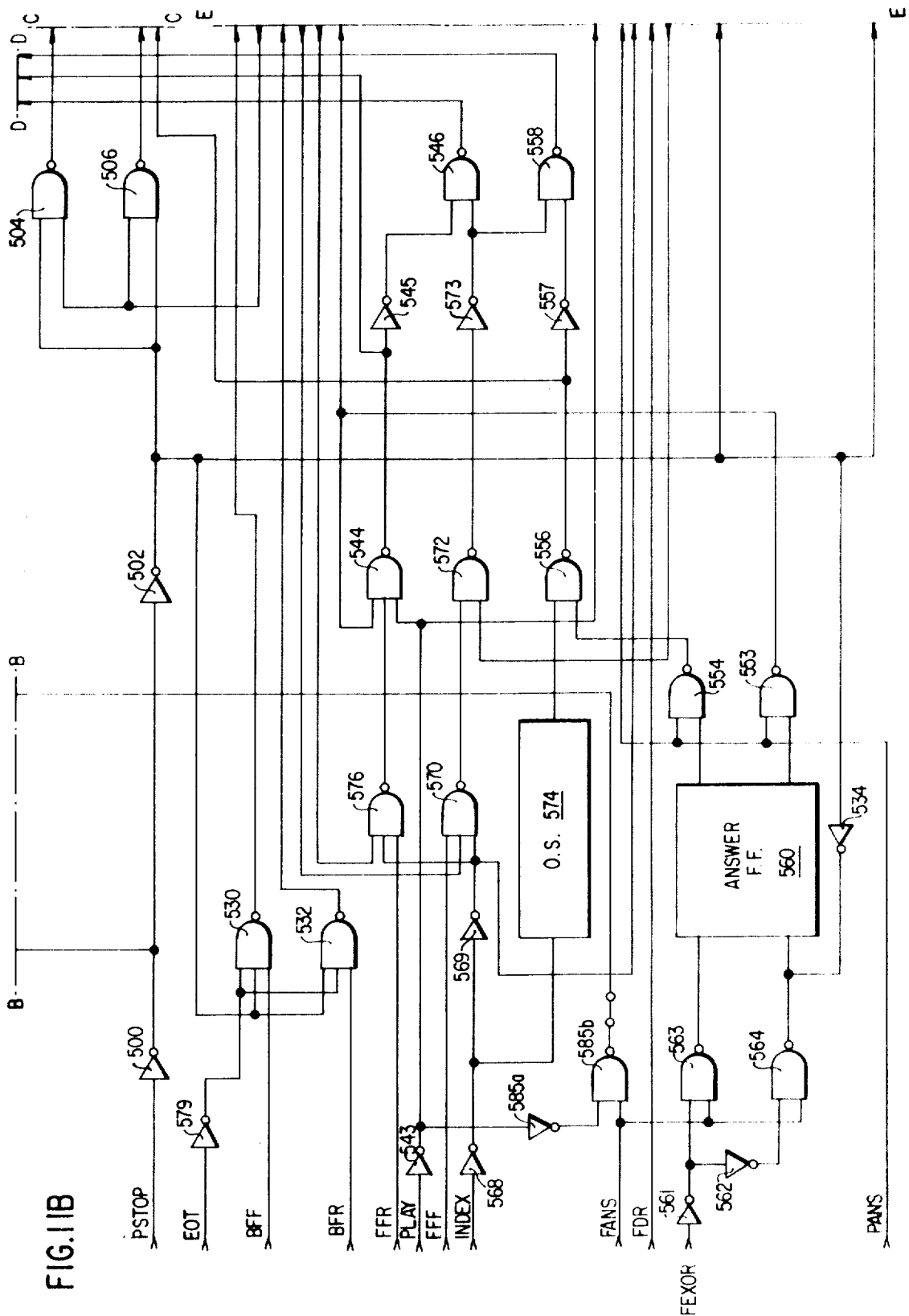

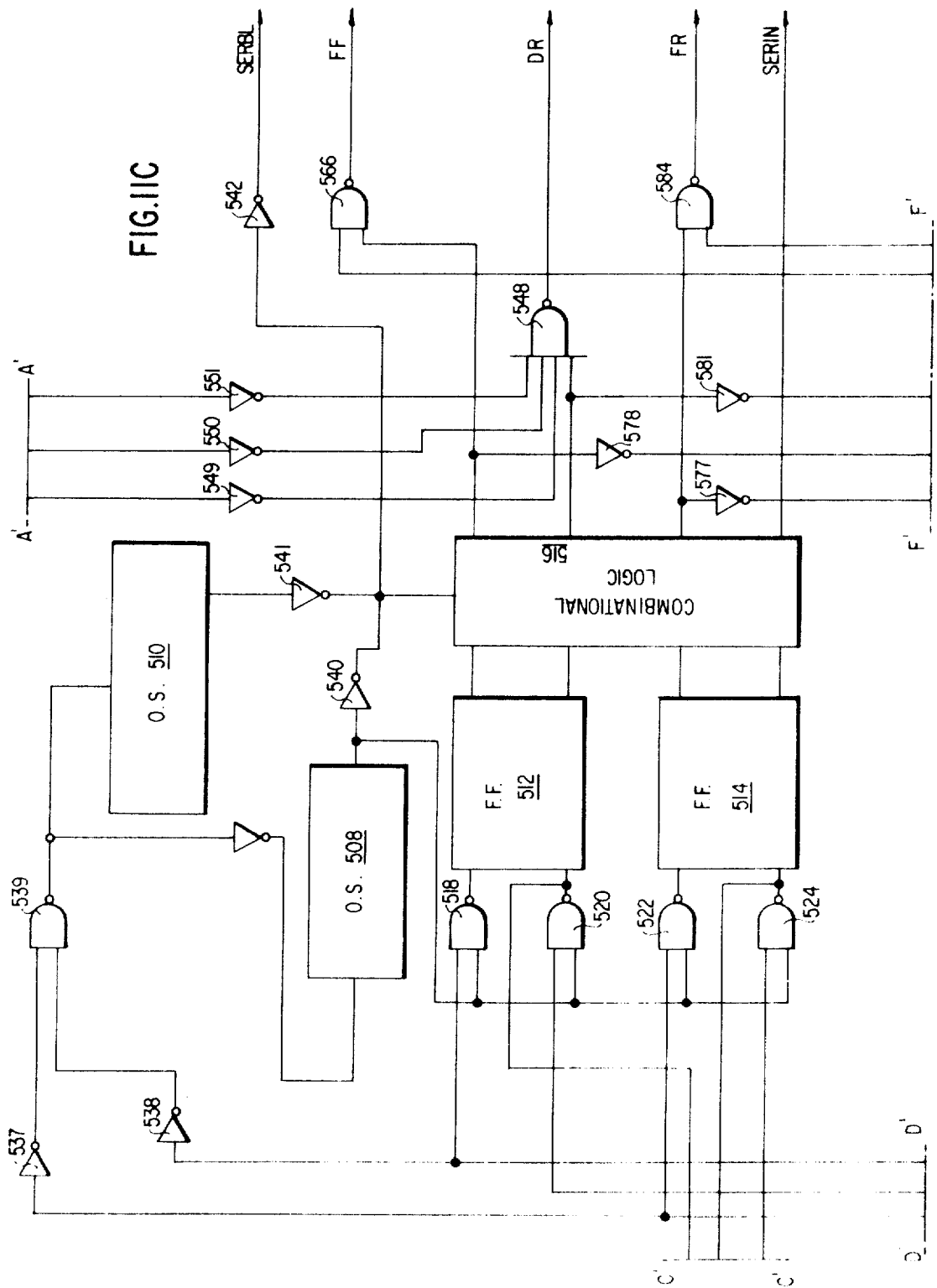

RANDOM ACCESS TAPE MACHINE

BACKGROUND OF THE INVENTION

1. Field of the Invention

This invention relates to information recording and reproducing systems and, more particularly, to such a system employing a magnetic tape of the cassette type affording random accessing and automatically controlled branching operations for reproduction of recorded information in accordance with a program recorded on the tape. Furthermore, the invention relates to such a system finding particular application as a teaching aid.

2. State of the Prior Art

Numerous teaching machines have been proposed heretofore in the prior art which are intended to instruct a student by presenting him with both visual and audible instruction. Many of these machines are provided with means adapted to be operated by the student to indicate his answers to a question and specifically an answer selection to two or more multiple choice answer responses presented to him. Some such machines are automatically programmed to present additional information or instruction to the student following his selection and as a function of that particular selection.

The prior art machines, however, have been defective in varying degrees, rendering them less than satisfactory and in many cases objectionable in view of inadequate operating capabilities or excessive cost. For example, some teaching systems provide each of a number of students with a remote console which communicates with a central computer, on a time-shared basis. Such a system is exceptionally costly and is restricted in use to the availability of a suitable central computer. Since the instructional process necessarily requires prolonged presentation of information and time delays for awaiting responses from students, typically the utilization of computer time is highly inefficient. Further, the format of the program of instruction is generally fixed in accordance with the information provided to the central computer and may not readily be changed.

Other systems of the prior art which do not utilize a central computer, and thus frequently fail to provide sufficiently high speed processing capabilities and information handling capacity, likewise have not been totally satisfactory and present similar and other defects. For example, such systems frequently require an excessive time delay between successive operations, such as between the presentation of lecture or instructional information to the student, the presentation of responses to be selected by the student, and the response of the machine to the student's selection. The machine response may be strictly a right/wrong indication to the student, such as afforded by a simple machine, and thus not providing reinforced learning functions. More complex machines usually are excessively costly, and typically permit only of a rigid format in the programming of the instruction. Many machines, in fact, do not provide at all for the preparation of the programmed tape, thus requiring the use of standardized or package-type programs from another source and thus not geared to the lesson program of the individual instructor.

A rigid format of programming is highly undesirable since it prevents effective reinforced learning. This typically results either from inadequate information storage capacity or inherent limitations in the programming control capabilities of the apparatus. Further, many such machines fail to make sufficient use of the storage capacity, thereby further restricting the effectiveness of the system.

Digital processing systems affording random access and high speed operation are also well known in the art, but such systems typically are of such complexity and expense that they can be applied to programmed teaching techniques only in the context of central computerized systems as above described. More specifically, in the case of teaching machines, digital processing techniques have not heretofore been effectively applied in the retrieval of instructional information which, by its nature, requires long time delays for presentation but, for an effective teaching function, must be accessed and made available for presentation in a relatively brief interval, particularly in relation to the requisite time duration of presentation of that information.

In fact, in the general field of digital data processing for information retrieval, there has heretofore not been provided an information retrieval system affording high speed addressing and branching functions, but which is of relatively low cost yet affords precise and rapid addressing and retrieval operations, and which may employ low cost and convenient recording media, such as magnetic tape cassettes.

These and other defects and unsatisfactory characteristics of prior art systems are overcome by the system of the invention.

SUMMARY OF THE INVENTION

In accordance with the invention, there is provided a digitally controlled magnetic tape system providing for both recording of information and retrieval or reproduction of that information in accordance with a program established on the tape. That program and the system cooperate is providing random accessing and branching functions in retrieving of information and thus in reproducing the recorded information.

The system is ideally suited for use as a teaching machine and has been disclosed in that context. A specific application as a teaching machine involves the presentation of information such as a lecture, the presentation of a question and multiple choice responses related to the lecture material and, further, comments on each such response. During the recording of this information to be reproduced for presentation to a student, digital controls are recorded in accordance with a desired program which establishes the sequence of instructional material to be presented in accordance with the answer response selections made by the student. The system thereby affords forced responses and reinforced learning geared to the level of achievement of the individual student and his ability to progress through the programmed lesson of the tape.

As noted, the preferred recording medium is a magnetic tape and desirably is of the standard cassette type commercially available. In recording, dual tracks are recorded, one for the information, and particularly audio, and the other for digital control. During recording, and at periodic intervals such as every two seconds, an index word in a numerically ordered sequence is recorded on the control track, and thus simultaneously with the continuous recording of audio on the information track. When it is desired to establish a control function, a suitable control word in digital format is recorded in the control track in lieu of an index word; that index word is stored for that interval and is recorded in the next available periodic recording interval of the control track, maintaining the numerically ordered sequence of the index words. In addition to the automatic recording of the index words, the operator, during record functions, may effect an edit operation in which, having located a desired position on the tape, a new sequence of index words may be initiated for further recording, or any of the control words may be recorded. Further special control capabilities are also afforded, such as provision of control words affording external control functions such as coordinated display of visual information and the like. In addition, and of significance to the application of the system as a teaching machine, the control words may include instructions to effect grading of student response selections; in addition, an external device may be thereby controlled to accumulate correct and incorrect answer selections for grading.

The control functions are best understood in the context of the play operations, again in the teaching machine application of the system. A student having been presented with the lecture information, question and multiple choice answers, is then directed by the audio information to make a selection of those available responses. Having made a response, the system advances to the prerecorded comment on that response and reproduces the comment. Grading of that selection may now be effected automatically as above described and prerecorded command associated with that specific response selection now controls the further sequence of the instructional program. For example, a branching command may cause the tape to reverse at high speed to again present the question and the multiple choice answers to permit a second chance to the student to select an answer where an incorrect selection was made. Alternatively, the branching command may be to return to the beginning of the same, or to a preceding or following, instructional segment of the tape. Where the answer selection is incorrect, a prerecorded command may cause the tape to advance to the successive lesson segment or to branch forward to a subsequent lesson segment where the progress indicated by a correct answer selection justifies eliminating intermediate segments of the program. Multiple successive branching may, of course, be performed as controlled by a branching command in each segment to which the tape has been directed.

A significant feature of the system is the capability of reading commands in both fast forward and fast reverse directions of motion of the tape, such as effected during a search operation and for automatically selecting the proper direction based on a determination of the tape position when a search operation is initiated. The speed of fast drive in either forward or reverse is substantially in excess of the normal drive speed during play operations, thus maintaining at a minimum the delay between audio reproduction of different segments of the tape. For example, fast drive is at 100 inches per second whereas normal drive is at 1 7/8 inches per second. Typically, the program will not require branching through more than relatively short portions of the tape in which case but a fraction of a second is required, but even where substantial portions of the tape up to its entire length must be transported in a branching operation, at most a few seconds delay is entailed.

This extremely rapid high speed forward and reverse drive during search operations is achieved by a dual speed demodulator provided in the modem, which is selectively responsive to the control track in the high and normal drive speeds. The electronic logic processing circuits are of more than ample speed in operation to permit the requisite processing of the derived digital words for accomplishing the requisite control functions.

A further feature of the invention is the ability to process the digital words thus read, whether in fast or normal drive speeds and whether in forward or reverse directions.

The system also permits of a random access search function under direct selection of the operator, in addition to the automatic search functions performed in branching operations. Thus, both in recording a program as well as in playback of that program, the desired tape position may be selected and the tape driven rapidly to that position for further operations as desired. The system of the invention thus has general applicability as a random access information retrieval system, in addition to its specific application as a teaching machine.

In either of these applications, it is apparent that defects of prior art systems have been overcome. The system of the invention, more particularly, provides greater reliability and versatility in the recording of information to be reproduced and control functions to control reproduction of that information in accordance with a desired program, and particularly instructions, enables reinforced learning by affording repetition of desired segments of the tape and/or branching to remedial instruction segments and the like, all at rapid speeds introducing a minimum of delay in the presentation to the student. Similarly, a student selection is followed within a very brief interval by a specific statement from the instructor commenting on the answer thus selected.

The system is relatively simple in operation, both for the instructor preparing and recording a program, and for the user, such as a student, in play operations. The system responds positively and immediately, both for the presentation of information to the student and in response to student selections, assuring that no ambiguity or confusion can result and thus maintaining the attention of the student at all times. Reinforced learning, and learning at the speed of the individual student is thus assured.

BRIEF DESCRIPTION OF THE DRAWINGS

FIG. 1A comprises a perspective view of a housing for the system of the invention as embodied in a teaching machine;

FIG. 3 is a further block diagram of the system illustrating a cassette-type magnetic tape as utilized in and controlled by the system;

FIG. 4 shows a section of magnetic tape illustrating the assignment of recording tracks thereon and digital words in a control track of the tape;

FIG. 5A comprises an illustration of a digital word and identifies the bit positions of the word;

FIG. 5B comprises a logic table of illustrative bit encoding for various digital control and index words;

DETAILED DESCRIPTION OF THE INVENTION

Figure 1B:
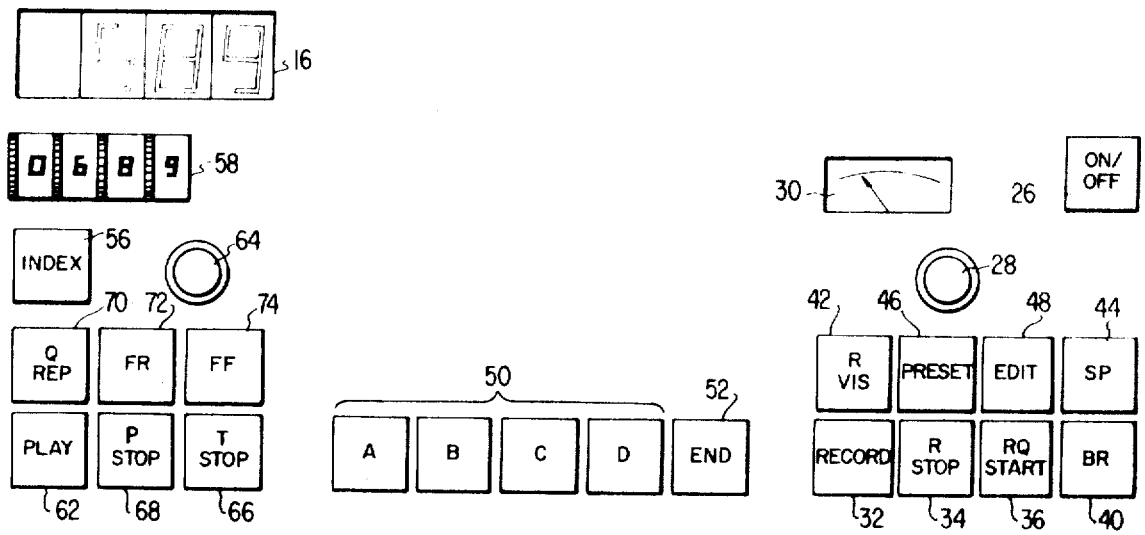
FIG. 1B is an enlarged diagrammatic view of the selection and control buttons and indicating means provided in the control panel areas of the housing as shown in FIG. 1A.

In FIG. 1A is shown a perspective view of a housing for the system of the invention, and having arranged on control panels thereof display and control elements utilized in operation of the system. More particularly, the housing 10 includes a contoured panel 12 having an upper vertical portion 13, a generally horizontal portion 14 and a front vertical portion 15.

The panel portion 13 includes an opening 20 of rectangular configuration for receiving a conventional magnetic tape cassette 22. The cassette 22 is mechanically latched in position when properly inserted and is released for removal by release control 24. The display 16 preferably is provided by a number of seven segment displays as are well known, to provide a numerical display for visual observation. As more fully explained hereafter, the number displayed corresponds to an index number of an index word recorded on the control track of the tape and identifies a current position of the tape. The front vertical panel 15 includes a jack input 17 for connecting a microphone, or other source of information, to the system during recording. Suitable output means are provided, though not shown, and particularly include an audio reproducing means such as a conventional speaker which may be mounted interiorly of the housing and communicate with the exterior through a grill (not shown) in the housing. In addition, other output terminals such as for exterior control functions, as in synchronized control of a visual aid, may be provided in the housing.

The control elements provided on panel portion 14 are best understood and more readily appreciated from the enlarged view thereof provided in FIG. 1B, in which like elements are indicated in identical fashion. Referring concurrently to FIGS. 1A and 1B, therefore, the on/off button 26 is the primary power control for the system. The elements 28 through 48 and 52 are related to the record mode of operation and the elements 56 through 70 are related to the play mode. The remaining elements are operable in either mode, as required.

Considering first the record mode, it is to be understood that both digital words for digital program control and information, such as audio, are simultaneously recorded in the record mode. Thus, for the audio recording, there is provided a volume control knob 28 and a recording level meter 30. Actuation of RECORD button 32 places the machine in the record state. In the record state, an instructor, for example, may record a lecture and a question thereon with a related group of multiple choice answers to be selected by a student in subsequent replay of the tape. The instructor may also then record comments on each answer selection, following the multiple choice answers. During this recording, the system automatically generates and records on the tape index words in a numerically ordered sequence at periodic intervals, such as every two seconds. These index words permit addressing functions in accordance with the random access and branching capabilities of the system. The instructor also records various digital control words on the tape in accordance with a desired program of the instructional sequence, as now generally described with regard to the various control buttons on panel portion 14.

RSTOP button 34 has a dual effect; in a normal record state, its actuation both causes a stop control word to be recorded and automatically stops the tape. As to the second function and as later explained in detail, during the recording of the multiple choice answers, it is desired not to to record a stop word; thus, in that state, the actuation of RSTOP button 34 simply stops the tape drive.

Typically, therefore, the instructor will proceed through a lecture, a question, and a group of answer choices and then actuate RSTOP 34. In play, the system will proceed through this same sequence and then stop, giving the student time to consider his answer selection.

Since a student may wish to have the question repeated before selecting an answer, there is provided an RQSTART button 36. Actuation of this button in the record mode and prior to the instructor dictating a question records a control word identifying the start of the question, and serves to locate this position of the tape in an automatic branching operation in replay, when the student requests repeat of the question, as later described. After recording the start word, the tape continues in drive in the record state and the instructor dictates the question and the multiple choice answers, identifying the answers as A through D ad provided herein, or any other suitable designation. He then depresses RSTOP button 34, as noted.

The instructor may now comment on each answer selection, and for this purpose establishes the record answer state, by first actuating the RECORD button 32 and then the appropriate one of the answer buttons A through D, thereby recording a control word respectively identifying the corresponding answer selection and permitting addressing of each thereof individually in a subsequent play operation. As noted, RSTOP button 34 may be actuated between or during this segment, and merely stops the tape in this operation. After dictating a comment on the last answer selection, the END button 52 is actuated which, in this operation, records a stop word on the tape and stops the tape drive. During the answer segment, a branching control word may be recorded at any time, typically at the end of an answer comment. This is accomplished by setting the index dial to a desired index number corresponding to the tape location to which branching is desired, and then depressing BR button 40. Branching may provide automatic repeat of the same or an earlier segment of the tape, as to lecture or questions as desired, or to a later portion, as explained in relation to the EDIT button 48, in accordance with the program to be established.

Various external controls are also afforded by the system, to be generated during the play operation. This is achieved by a similar technique in the recording of an appropriate digital control word. Illustrated is the RVIS button 42 which, when actuated, records a control word for achieving synchronized operation of a visual aid such as a slide projector. As later explained, the visual aid synchronizing control word may be recorded with a specific index number set in the dial for effecting display of specifically identified slides in accordance with that index number and during specific times of the audio program from the tape. Numerous additional control functions can be provided by recording an appropriate digital control word including in its format specific number settings. Thus, various commands in addition to those herein specified may be afforded, as illustrated by the spare SP button 44.

The edit operation produced by actuation of EDIT button 48 permits erasing a previously recorded portion of the tape and substituting therefor new information. Generally, the tape is advanced to the position in which the edit operation is to be performed, and the index number just preceding that position determined. Index dial 58 is set to the number and the PRESET button 46 actuated to establish that index number in the internal index number generator. EDIT button 48 is then actuated and recording proceeds as heretofore described, permitting the instructor to insert a new digital word and the machine then returns to a stop state. Further recording is then performed in the record operations as above described.

During record operations, the system may actually be controlled into one of the states which generally are described herein as associated with the play mode of operation. An example thereof is the state in which the system is stopped following recording of a stop word. From that state, additionally, and regardless of whether an instructor had previously been recording information or a student playing back information, either of the fast reverse of fast forward drives of the tape may be commanded by actuation of the respectively corresponding FR and FF buttons 72 and 74, so long as these buttons remain depressed. These operations correspond to those generally obtaining in a conventional tape recorder for high speed tape transport, adequate merely to position the tape in a general area of interest.

The present system, however, affords true digitally controlled random accessing, permitting high speed drive of the tape to a specific position thereof identified by a prerecorded index number. For this purpose, the index dial 58 is set to the desired index number position and button 56 depressed whereupon the tape advances at high speed to that position and stops. Display 16, when the tape stops, displays the number which, as illustrated in FIG. 1B, is the desired index position. As will later appear, the internal processing of the system for achieving high speed random accessing in accordance with the input index control is substantially the same as that employed in the playback operation in response to reading of a branch control word from the tape. In that operation, the branch control word identifies the index position of the tape and automatically effects the random access search, as described for the index input control, to position the tape at the desired index number location. The random access or search function is performed at extremely high speeds, for example, 100 inches per second whereas the normal drive speed may be 1⅞ inches per second. Searching, therefore, occupies but a minimum of time.

The play operation or mode is typically initiated, following turn on of the machine by actuation of button 26, by actuation of play button 62. Typically, the program will permit the tape to be transported at normal speeds for the reproduction of audio information recorded on the tape, through external speaker means. A volume control 64 is accordingly provided for the speaker.

TSTOP button 66 may be actuated in the play operation, as well as in record operations, for temporarily stopping the machine while maintaining its current state. Alternatively, a student may actuate the PSTOP button 68 and place the machine in the PSTOP state; when a stop control word is read from the tape in the playback mode, the machine automatically achieves that state and tape drive ceases.

Thus, and for a typical program, the system will present to the student a lecture followed by a question and multiple choice responses, at which time a stop control word is read from the tape as previously recorded thereon and the machine stops. If the student desires to have the question and multiple choice answers repeated, he may actuate QREP button 70. As previously described, this generates a branching function causing the tape to reverse at high speed until the QSTART word associated with that question and answer group is read and the tape drive will then cease and a repeat playback of the question and answers automatically will proceed until the tape automatically stops at the conclusion of the last multiple choice answer.

The student then makes his answer selection by depressing the appropriate one of the buttons A, B, C, or D. The system rapidly advances in a high speed search to the position on the tape containing the control word identifying that corresponding answer comment and automatically proceeds in the normal drive speed to reproduce the instructor's prerecorded comment on that answer selection.

Associated with each such answer comment, and indeed throughout the instructional sequence, any of various control words may be read from the tape to generate the corresponding automatic responses of the system as described above in relation to the recording operations. For example, a branch word at the end of an answer comment may cause a repeat of the same lecture of an earlier lecture, or advance to a next successive or later lesson segment. A suitable control word for indicating a correct answer, as above described, may also control an external grading device such as to accumulate a score for that student in response to that specific lesson program.

Figure 2:
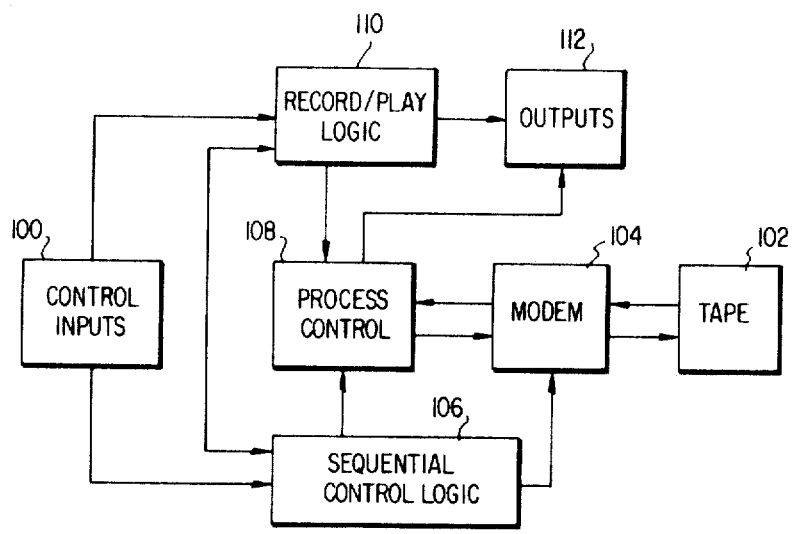
FIG. 2 is a basic block diagram of the system of the invention.

In FIG. 2 is shown a block diagram of the basic components of the system. The control inputs described in relation to FIGS. 1A and 1B are represented in block 100. The tape system is generally represented in block 102. Associated therewith is a modem 104 which interfaces between the digital controls of the system and the tape system 102 to provide appropriate signals for recording on the magnetic tape as well as to provide certain clocking functions as later described, and for reading the tape.

As is apparent from the foregoing description, and as more fully explained hereinafter, the various operates states of the system, and the corresponding functions to be preformed in both the record and the play modes of operation must follow in accordance with prescribed sequences. These sequences are established and controlled by the sequential control logic shown at block 106. The control functions of sequential control logic 106 are intimately involved in the entirety of the data processing operations of the system, and thus is shown to be responsive to the control inputs block 100 and to communicate with the modem 104, the process control block 108, and the record/play logic block 110. As later explained, process control block 108 includes various gating and comparator logic circuit; in addition, it includes shift register logic for converting digital words processed in parallel form within the system to serial form for recording on tape, and for effecting the reverse conversion in play operations.

The control inputs 100 are also applied to the record/play logic block 110, which responds to the button actuation to formulate digital control words representing these inputs and which are processed for controlling the system operation and for recording on tape to establish a desired program; block 110 also generates such control words in the play mode, responsive to button actuation, as well as responding to the digital control words read from the tape to control the system operation in accordance with the prerecorded program. The various outputs derived in the play mode which may include, for example, indications of right and wrong answers, controls for external visual aids, and the like are represented at block 112.

The block diagram of FIG. 3 illustrates the relationship of the tape system, shown at 102' and the digital control system shown generally at block 120 in the further context of the recording and reproduction of information on the tape, in accordance with a desired program.

Referring first to the tape system 102', and as previously noted, there is preferably employed a tape cassette having a length of magnetic tape to be wound upon and between the spools 122 and 124. For this purpose, a capstan drive 126 is driven by appropriate prime mover means, illustrated by drive motor 130 responsive to the digital control system 120. The basic elements and functions of the tape system and its drive are well known in the art and thus are shown only schematically herein and briefly described to explain the functioning capabilities as required. The tape drives of fast forward, fast reverse, and drive may be provided by suitable motor control, or by the provision of three selectively energized and engaged motors providing these drive rates. The capstan is selectively engaged with the tape to effect driving thereof, and is released to permit removal of the tape cassette.

A read/write head 132 is caused to selectively engage the tape for reading and writing operations and, for record functions, there is further provided an erase head 134 to erase any previously recorded information on a tape as in establishing a new program during recording and edit functions, for example. Selective actuation means for the erase head 134, are, of course, provided, through not shown.

The transmission of digital signals between the digital control system 120 and the tape system 102' is schematically illustrated by lead 136 which selectively connects record amplifier 140 and playback amplifier 142, for the record and play modes, respectively, with the read/write head 132. Similarly, lead 144 represents the transmission channel for audio information in both record (write) and reproduce (read) operations, and selectively connects the head 132 with a recording amplifier 146 and with an output audio amplifier 150. Amplifier 146 has an associated input signal source, such as microphone 148, and output amplifier 150 has an associated audio output means such as loudspeaker 152. It will thus be appreciated that driving of the tape, its initial positioning and the programmed sequence of successive positions as provided by the digital control system 120 are accompanied by the simultaneous, respectively associated recording of information on, and reproduction of information read from, the audio channel of the tape. In addition, during play operations, control outputs 112 may be provided in time synchronism with the audio reproduction and in accordance with the tape program. It will also be understood that information other than audio may be provided in the audio channel and particularly that digital information in parallel or serial form may be recorded on the tape in one or more channels for reproduction in accordance with the program of the control track in accordance with the digital control system of the invention.

In general, the random accessing capabilities of the system permit both branching and cycle programming. As well known, the branching operation, above described, permits introducing new or alternative, supplementary material whereas the cycling provides for repeating previously presented material. Thus, branching affords a new approach or another point of view as in a program of instruction whereas cycling reinforces a lesson segment by repetition.

As noted, the system is not limited to teaching functions providing interplay between the programmed course established by the instructor and a student, but also has general applicability to data retrieval. Particularly, the data may be stored in listings which have sublistings. Further, a sublisting can contain the address of any other listing or sublisting of the same or another group thus recorded on the tape, with the instruction to proceed to that address. Thus, the versatility and flexibility of the system finds ready application in the general field of data retrieval not only for random accessing but in which branching and cycling may also be required.

In FIG. 4 is illustrated a section of magnetic tape 160 illustrating the utilization thereof in the disclosed embodiment of the system of the invention. A tape cassette of the flip-over type is used in the system, and thus four tracks 161 through 164 are illustrated. Tracks 161 and 162 are utilized in combination as associated control and information tracks, and tracks 163 and 164 similarly are utilized as control and information tracks, respectively, for the two positions of the flip-over cassette, thereby doubling the time available from a given length of tape. Further, with regard to the control track 161, there are illustrated at 161a through 161c periodically recorded index words which, due to the constant transport speed of the tape 160 are thereby equally spaced longitudinally on the tape, a control word 165 and a further index word 161d. The index words 161a through 161d are in numerically ordered sequence. However, as later detailed, when a control word is generated in response to a control input produced at the discretion of the instructor, that control word is inserted in the interval normally allocated to a next successive index word. That index word is retained and recorded in the next successive periodic interval to reinitiate the numerically ordered sequence of index words.

The general format of the digital words recorded in the control track is illustrated in FIG. 5A. Each digital word comprises a fixed number of bit places and is defined by start and stop control bits 170a and 170b. Predetermined bit positions within the word are assigned to the code bits for identifying the specific control words and for distinguishing them from index words, in accordance with appropriate encoding functions. The number of bit positions utilized is a function of the number of control functions provided in a given system. In the present system, three control bit positions 171a, 171b, and 171c are provided, affording a three bit binary coding of up to eight separate control words. Bit positions 172a, 172b, . . . 172n contain binary coded information identifying index numbers corresponding to tape position; a sufficient number of such positions 172a . . . 172n are provided for affording a numerically ordered sequence of index numbers at the prescribed intervals and throughout the length of the entire tape.

In FIG. 5B is shown a logic table illustrating a possible arrangement of bit encoding in accordance with logic 1 and 0 notations for the bit positions 171a, 171b, and 171c for identifying the control and index words; in addition, further information relating to the control words, and index numbers are shown in accordance with logic 1 and 0 notations in the form of 1/0 representing the variable condition of these bits depending upon the control function or tape index position, for the associated bit positions 172a, 172b, . . . 172n. A dash is provided where the bit position is not used and thus is a "don't care" condition. Particularly, five control words and the associated binary encoding of the bit positions 171a through 171c are shown, as well as the index word encoded as 111.

Considering FIG. 5B more specifically, the stop control word is encoded as 100; since no further information is required as to stopping the tape, the associated positions 172a . . . 172n are merely "—". Answer (X) may be any of four multiple choice answers A, B, C, and D. Two associated bit positions 172a and 172b are thus encoded to identify uniquely each thereof. As later explained, the system automatically establishes the correct binary encoding of the associated bit positions 172a and 172b in response to actuation of the answer buttons A through D in both record and play modes. In addition, a given associated bit position, such as 172n may be utilized by setting of the index dial to indicate whether the specific answer is correct or incorrect. It is also possible by this technique for the instructor to provide weighted scoring of answers, or to provide for two or more correct answers to a problem. In play, this coding is read and may be provided to external scoring means as later explained.

The branch and index control words have associated bit positions 172a . . . 172n which are encoded, as indicated by the notations 1/0, to identify index words of desired addressing positions. The visual control word has associated bit positions which, for example, may identify a particular slide or other selectable item to be visually displayed upon reading the visual control word from the tape in the play mode and thus in synchronism with the audio reproduction.

DETAILED SYSTEM DESCRIPTION

Prior to this discussion, certain terminology utilized in the remaining portions of the specification will first be considered. Reference has been made heretofore to record and play modes of operation. These are essentially mechanical functions, in each of which various submodes of a corresponding mechanical nature may obtain such as drive of the tape in fast forward or fast reverse or normal play speeds.

The electronic or logic conditions of the system are defined as states, and which selectively obtain in the record and play modes. More specifically, the system as herein disclosed defines seven states, RECORD, RANS (record answer), RSTOP (record stop), PLAY, PANS (play answer), INDEX (a random access search), and PSTOP (play stop). Certain further conditions may also obtain which are described as substates, and particularly EDIT.

The system is placed into a specific one of these states or substates in accordance with control inputs presented to the system. These control inputs are presented by the actuation of the control button on the machine, as above described, as well as by the control words read from the tape; furthermore, the state which is established is also a function of any currently existing state, and the system itself can automatically cause various of the states and substates to be established in accordance with its processing functions. Thus it will be appreciated, that a controlling factor regarding the state which is established is the mode of operation of the system, and the existence of control inputs and control words read from the tape are necessarily also related to the mode of machine operation. As will later appear, states which are not permitted, since logically inconsistent with prior existing states or undesirable in view of a desired program sequence and control, are prevented from obtaining. This control is generally afforded by the sequential control logic of the digital control of the system.

Figure 6A:
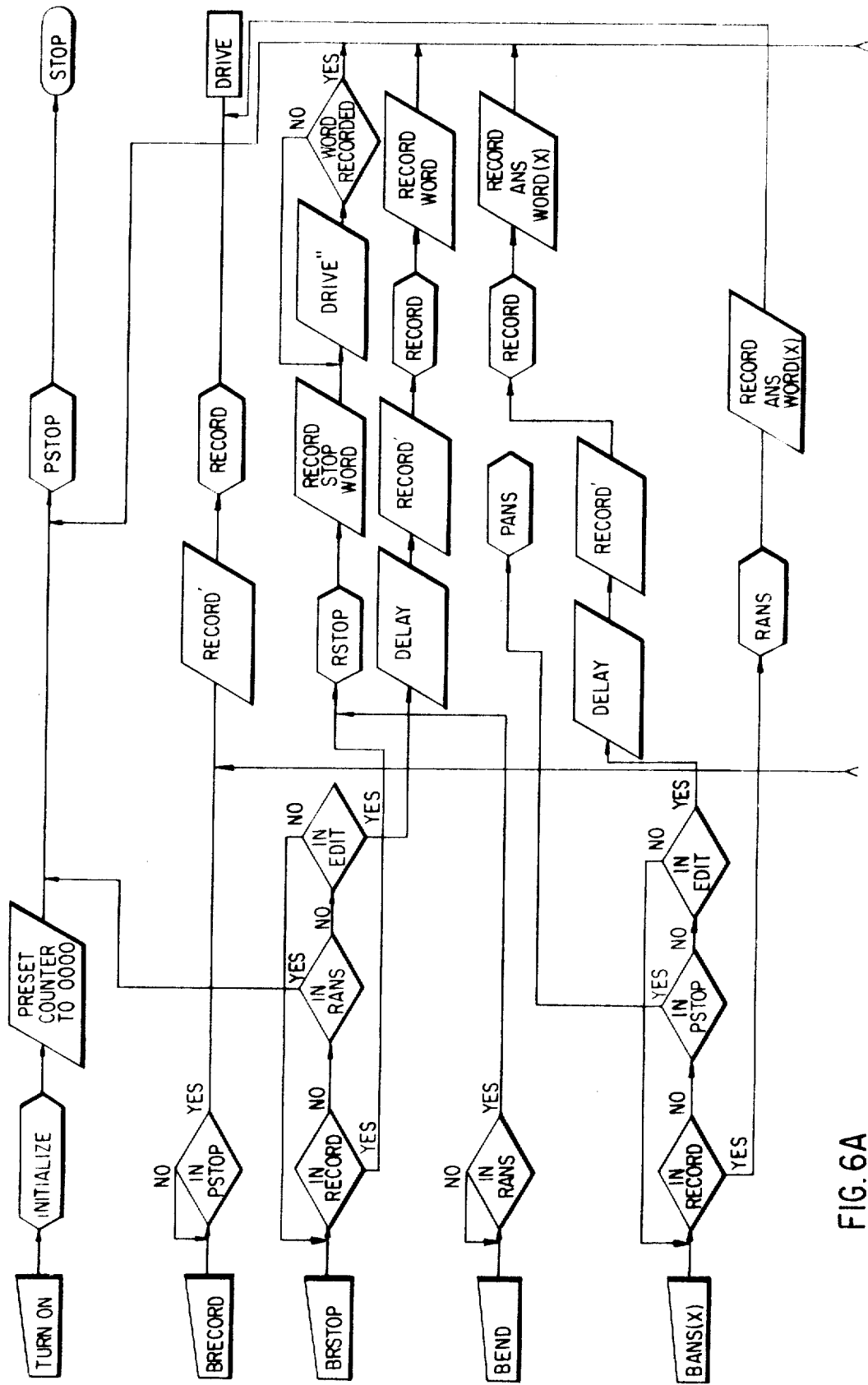
FIG. 6 comprises a logic flow diagram for the record mode of operation of the system of the invention, FIG. 6 being shown in portions in FIGS. 6A, 6B, and 6C.
Figure 6B:
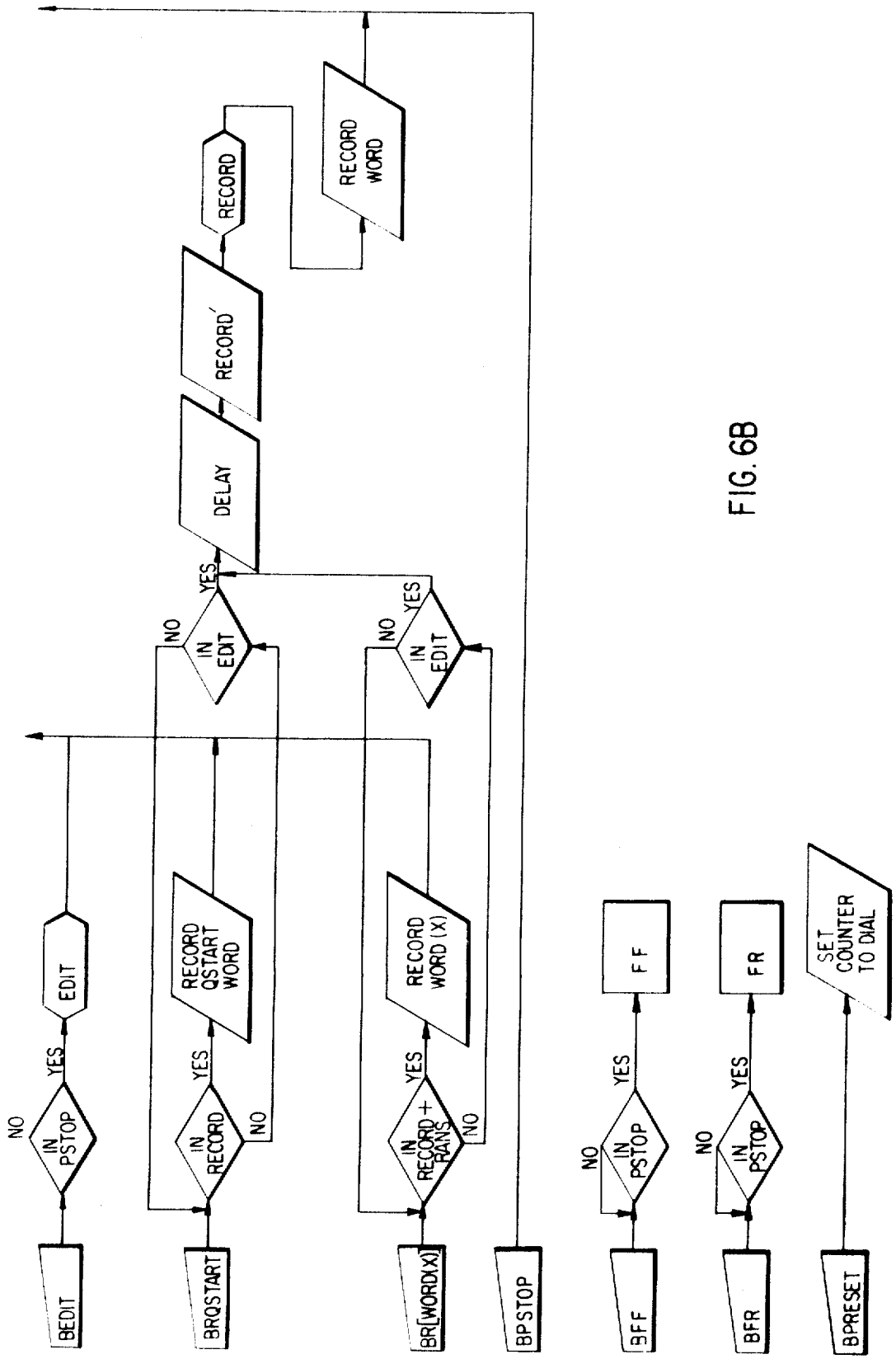
Figure 6C:
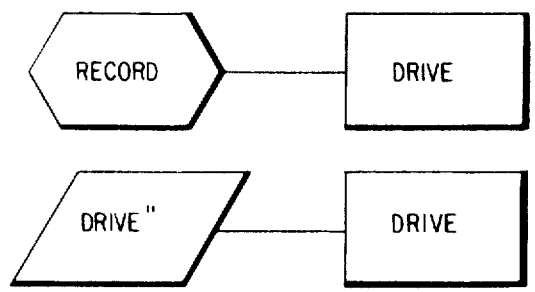
Figure 7C:
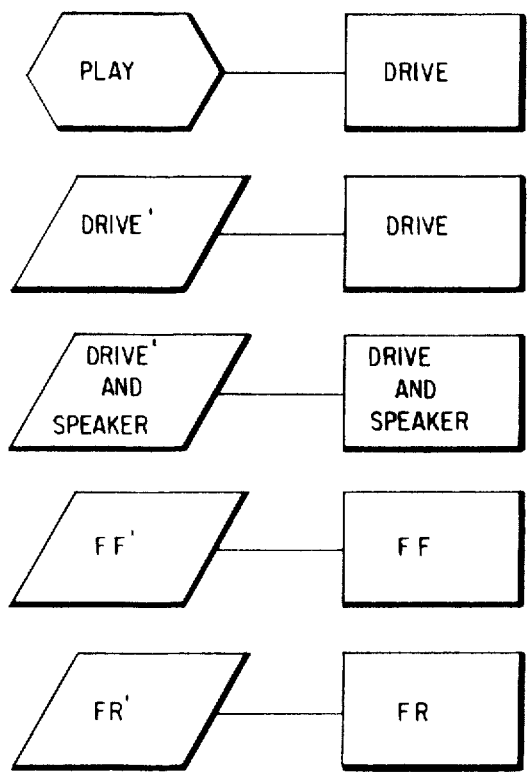
FIG. 7 comprises a logic flow diagram for the play mode of operation of the system of the invention, FIG. 7 being shown in portions in FIGS. 7A, 7B, and 7C.
Figure 7A:
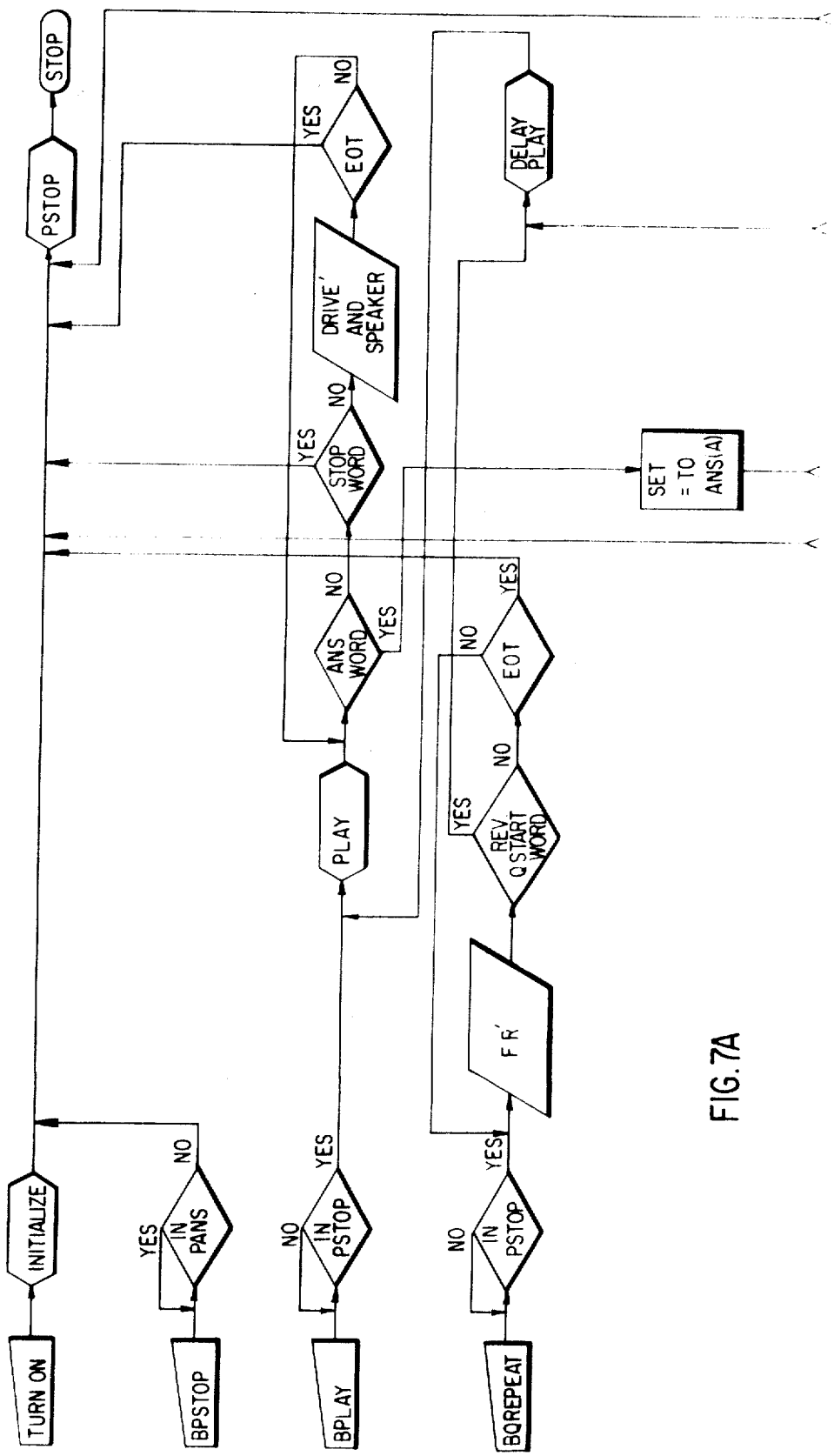
Figure 7B:
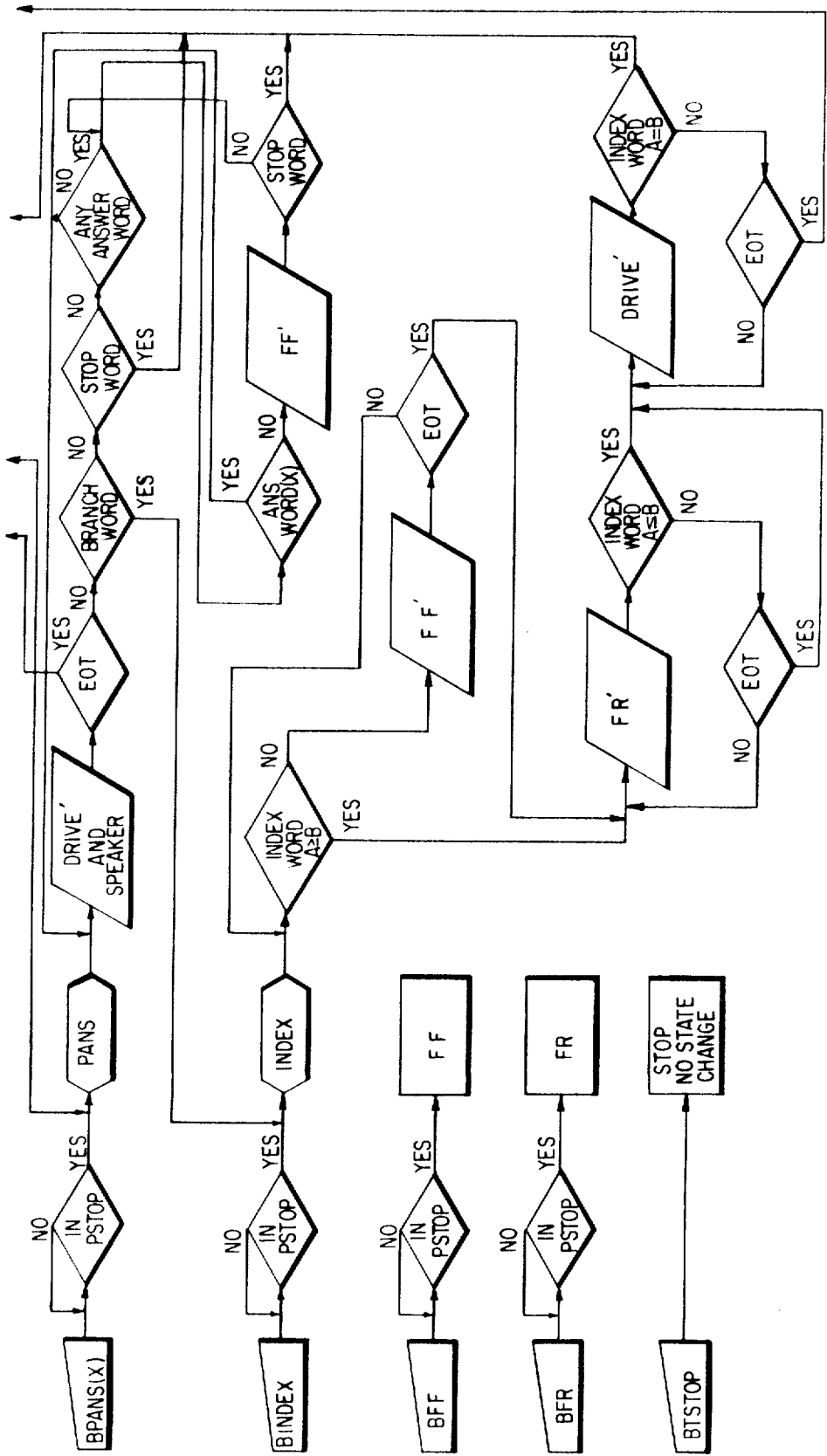

In FIGS. 6 and 7 are shown the logic flow diagrams for the record and play modes of operation, respectively, these diagrams affording a clear presentation of the states which obtain in each of these modes in response to control inputs and control words read from tape and thus serving to describe the operation of the system of the invention as herein disclosed.

Conventional logic notations are employed throughout the drawings and particularly in the flow diagrams. Thus, control inputs resultant from button actuation are represented by trunkated rectangular blocks. Command functions, or internal subroutines, established in response to the control inputs and the control words read from tape are represented by parallelograms, and the logic states established in the machine, by hexagonal figures. The decision logic functions are represented by diamond-shaped configurations. Terminal conditions are represented by elongated circular-type elements, and system outputs, by rectangular elements. In the description of the flow diagrams of FIGS. 6 and 7, the discussion proceeds from the first through the last of the control inputs and for each, in the direction of the flow from left to right generally in the logic functions which result.

In each of FIGS. 6 and 7, the control inputs established by actuation of the control buttons, detailed in FIG. 1B, are directly identifiable by the labelling of the buttons, which is identical thereto, but preceded by the letter B. The turn-on control input corresponds to actuation of the on/off switch 26 in FIG. 1B; this initializes the machine for operation, placing it in the PSTOP state.

Considering the record logic flow of FIG. 6 more fully, actuation of the ON button also results in the internal command to preset the index number generator to 0000; that generator, as later explained, generates a numerically ordered sequence of index numbers which are recorded on the tape for the addressing function. As later explained, also, the index number generator can be preset to a desired index number other than 0000 such as in an EDIT operation. Concluding the first line of logic flow, the system is thus placed in the PSTOP state resulting in the output STOP condition. Essentially, the system is not in standby preparatory to recording.

To enter the RECORD state, the system must be in PSTOP. The decision logic, labelled IN PSTOP, makes this determination. If the output of the decision logic is NO, no action results; if the output is YES, the command function DRIVE' is produced and the system is placed in the RECORD state, resulting in the DRIVE output. Whereas the RECORD state is shown to produce the DRIVE output in this flow, it is to be understood that, as shown in FIG. 6C, the RECORD state always implies, and thus results in, a DRIVE output. While considering FIG. 6C, and as will appear elsewhere in the subject flow diagram, internal command function, or the internal subroutine RECORD', as also results for various types of RECORD command functions during a RECORD state, also implies a DRIVE output. Similarly, a DRIVE" internal command also produces a DRIVE output.

Returning now to the logic flow of FIG. 6, BRSTOP is processed by the decision logic labelled IN RECORD, IN RANS, and IN EDIT, in the sequence shown. If in the RECORD state, the system is placed in the RSTOP state, resulting in the internal command to record a STOP word. That in turn produces the DRIVE" internal command and, from FIG. 6C the DRIVE output. DRIVE" is maintained until the STOP word has been recorded, whereupon the system is placed in the PSTOP state. If the system is in the RANS state, the system is returned to PSTOP state without recording a STOP word, as previously discussed. Alternatively, if the system is in neither of the RECORD nor RANS states, but is in the EDIT substate, the command function DELAY is generated, after which the RECORD' command is generated, placing the system in the RECORD state and generating the command to record the STOP word. This, of course, implies a DRIVE output and, as in the preceding logic flow associated with the input control BRSTOP, a logic loop to assure that the STOP word has been recorded, whereupon the system enters the PSTOP state. It will therefore be appreciated that the BRSTOP control input can produce recording of a STOP word only if the system is in the RECORD state or in the EDIT substate. If the system is in the RANS state, BRSTOP merely produces the PSTOP state enabling the instructor to stop operations during recording of ANSWER comments, but without recording a STOP word. This is desired since rapid scanning through the answer segment of a tape is to be performed in random addressing as well as in branching and therefore a STOP word must not be recorded, all as previously discussed. However, in the EDIT substate, BRSTOP, after a delay which permits the tape to come up to proper speed for recording, is effective to record a STOP word. The system then enters the PSTOP state. The EDIT substate is explained more fully hereafter.

Continuing, it will be recalled that the END button is actuated for recording a STOP word at the end of the answer segment. Thus, in response to BEND, and proceeding through the logic flow, if the system is in RANS, the RSTOP state obtains, resulting in recording of a STOP word.

BANS(X) is the control input produced in the RECORD state upon actuation of any of the answer buttons A through D. Recording of the answer control word ANS(X) identifying the actuated button requires that the system be in the RECORD state, in accordance with the decision logic labelled IN RECORD. The RANS state thus may obtain, producing the command to record the answer word, shown as RECORD WORD ANS(X), and the DRIVE output control results. The instructor then proceeds to record his comments on the thus designated answer selection. Upon completion of each answer comment, he may actuate the button for establishing BRSTOP which, in the RANS state, simply stops the machine. At the conclusion of the answer segment, he may actuate the END button, producing BEND and, since the system is in RANS, establish the RSTOP state and recording of a STOP word. As previously noted, the buttons A through D are also used in the PLAY mode. The logic flow thus provides that if the system is not in the RECORD state, but rather is in PSTOP, the BANS(X) input produces the PANS state for automatically playing back the selected answer, as explained in more detail in relation to the PLAY logic flow diagram.

The EDIT substate also participates in the flow being described such that, if the system is in EDIT, depression of ANS buttons A through D results in issuance of signal EDANS' to effect recording of the desired answer word.

As previously discussed, the EDIT substate is provided to permit an instructor to enter a desired portion of a program already recorded, set the index number generator to the index number at that position of the tape, thereupon to record new or different information, while erasing previously recorded information from the tape. EDIT can be established only from the PSTOP state. Thus, BEDIT establishes EDIT if in PSTOP. EDIT is considered more fully hereafter; generally, however, it is followed by the RECORD state and then the PSTOP state when the word has been recorded. Again, a suitable logic loop assures that recording has been effected, prior to PSTOP obtaining.

In accordance with the branching capabilities of the machine, a control word may be recorded identifying the beginning of the question portion of an instructional segment of the tape and which typically follows a lecture portion, to permit the student to review the question either under his own control or under a programmed control in the PLAY mode. Thus, the RQSTART button 36 in FIG. 1B is provided for recording a control word identifying the start of the questions and thereby permitting review of the question.

In the flow diagram, this operation is produced by the BRQSTART input which, if the system is in the RECORD state, results in the command to record the QSTART WORD, the RECORD state and associated DRIVE output control being maintained for this purpose. The instructor then dictates the question and a sequence of available answer choices, identifying each as answers A, B, C, or D. At the conclusion thereof he actuates the BEND button with the resulting controls as above described. The system will also respond to BRQSTART in the EDIT substate, producing first a DELAY signal and then the RECORD' command, as in the RECORD state above described.

Recording of control words to effect branching is now considered. It will be recalled that branching requires the identification of the tape position, and thus the index word, or address, to which the system is to branch. This may be either ahead of behind the current tape position and, in the latter case, the index number would not yet be known. The latter situation is explained in relation to the detailed discussion of the EDIT function which follows.

Assuming, however, the index number is known, the index dial is preset to that number and the BRANCH button BR is depressed, producing the control input BR[WORD(X)]. If the system is in either of the RECORD or the RANS states, the command to record the branching control word is generated. Thus, the branching control word with the identification of the address is recorded. If the system is instead in the EDIT substate, BR[WORD(X)], BRQSTART again causes this recording operation, following a delay, as shown.

At any time, the control input BPSTOP can establish the PSTOP state. Further, the control inputs BFF and BFR for fast forward and fast reverse drive of the tape can obtain in the PSTOP states and produce the control outputs FF and FR.

The EDIT substate will now be considered more fully and in relation to control input BPRESET. The latter produces the internal routine of setting the index number generator to the dial setting. Record functions thus will proceed from that newly established count. Thus, for example, in the case of recording a branch word for which the index number was not known, the next preceding index word can be utilized for positioning the tape just prior to the position of recording a control word, such as QSTART or a branch word. The system is then placed in the EDIT substate which can only obtain from the PSTOP state, by actuation of the BEDIT control. Recording of any of the control words, as described for the RECORD state, may then be produced from the EDIT substate, following a delay. The delay in each of the logic flows which precede entry to the RECORD state from the EDIT substate is afforded such that the tape advances from the position to which it was driven in preparation for the editing operation, and is brought up to proper speed for recording the appropriate control word. The editing function may thereby be utilized in various different operations, such as inserting a control word where one had been forgotten previously, changing a presently recorded word, or completing a control word as in the case of a branching forward operation where the necessary index number for the position was not known since not yet programmed. Further, editing can be used to establish an entirely new portion of the program by erasing a prior recorded portion. In a latter type operation, it will be appreciated that a new portion being recorded may be made somewhat shorter than the previously recorded portion. At the end of that newly recorded portion, therefore, the instructor may record a branching command to advance the tape to the beginning of the subsequent and still useful portion of the previously recorded program. Thus, substantial flexibility in the recording of a program is afforded. Note that in each instance, the EDIT substate merely exists for the recording of a single word in accordance with the input control. Thereafter, continued recording proceeds in the normal record function from the PSTOP state.

FIG. 7 discloses the logic flow diagram for the PLAY mode of operation. Again, actuation of the ON button initializes the system, producing the PSTOP state and the STOP condition. The PSTOP state can be produced by control input BPSTOP at any time that the system is not in a PANS state, in accordance with the associated decision logic.

With regard to the remainder of the control inputs in the PLAY mode, no operation will obtain unless the system is in the PSTOP state, in accordance with the decision logic circuits provided as indicated. The only exception is the TSTOP control input which causes the machine to stop, but produces no change in state, as indicated in the last line of the logic flow.

In general, in the PLAY mode the system operates under the control of the recorded program in proceeding through a sequence of instructional material recorded on the tape. Other operations, however, such as random accessing are also controlled from the PSTOP state, and thus generally in the play mode, as later described.

Returning to the consideration of the control inputs, BPLAY establishes the PLAY state, and from the implied logic conditions shown in FIG. 7C, a DRIVE output is produced and reproduction of audio information from the tape proceeds.

Returning to the logic flow, PLAY state is produced and maintained until an answer word (ANS WORD) or a stop word (STOP WORD) is read from the tape. Particularly, ANS WORD results in the control function of DRIVE' and SPEAKER, which is maintained until a STOP word is read from the tape by the decision logic which then produces the PSTOP state and the STOP condition. From FIG. 6C the DRIVE' and SPEAKER control function, or internal subroutine, implies the DRIVE and SPEAKER output control. If the length of tape is exceeded at any time in PLAY, an END OF TAPE (EOT) signal is generated by circuitry on the tape transport, as known in the art, and PSTOP state is initiated. The purpose of the ANS WORD decision logic is explained hereafter.

In a typical program, the STOP word will first be encountered at the conclusion of the question segment at which time the student is now afforded time to contemplate the lecture material and the associated question in making his answer selection. He may desire to have the questions repeated.

Thus, the control input BQREPEAT may be generated producing the FR' command which, from FIG. 6C, produces the FR output for fast reverse drive of the tape, searching for a QSTART WORD. When a QSTART WORD is read, the corresponding decision logic circuit generates, through a delay play signal, the PLAY state. The delay signal permits termination of the fast reverse drive of the tape, and initiation of the normal forward drive for reproduction in accordance with the PLAY state. An EOT signal is also produced in reverse drive to terminate the reverse drive if no QSTART word is recorded in the preceding portion of the tape. As before, EOT produces PSTOP.

Assuming, however, that a QSTART WORD is read, the delay play signal establishes the PLAY state, thereby repeating the previous question, until the STOP word is read, at which time the PSTOP state again obtains and the student is again requested to make an answer selection.

The answer selection is made by depressing one of the buttons A through D and accordingly producing the control input BPANS(X), the X representing one of A, B, C, and D. The system is thereupon placed in the PANS state, and, through a series of command and decision logic functions to be described, produces the command function FF', implying the control output FF for driving the tape in fast forward, searching for the selected answer. Upon reading the selected answer word, decision logic ANS(X) initiates the command DRIVE' and SPEAKER, implying the output control DRIVE and SPEAKER for audio reproduction of the thus selected portion of the tape containing the instructor's comment on the selected answer.

Note that the decision logic labelled ANY ANSWER WORD assures that merely reading of a control word identifying an answer does not take the system out of FF until the specific ANSWER WORD for the answer selected by the student is encountered. Further, if either an EOT signal is produced or a STOP WORD is read, the corresponding decision circuits automatically place the machine in the PSTOP state. The EOT decision assures that the machine will not continue searching the event that the PANS(X) control is presented at an improper time, i.e., when no further answers are contained on the tape, and thus is essentially a protection function. The STOP WORD decision circuit, however, is of more practical effect, particularly where, as frequently occurs, it is desired to proceed directly from a given answer sequence to the next lesson segment. Thus, upon reading a STOP word at the end of an answer segment, the delay PLAY signal is generated and, in turn, the PLAY state produced for presentation of the next lesson segment.

The machine rapidly advances through any portion of the tape in which information is not to be reproduced. Consider the example of the student having selected answer B. Following the STOP word at the end of the question, and thus in PSTOP, actuation of BANS(B) causes FF' to be generated and maintained, even though ANS WORD(A) is first read in accordance with the logic decision labelled ANY ANSWER WORD. When ANS WORD(B) is read, however, the tape is slowed to normal drive and the instructor's comments are reproduced, in accordance with DRIVE' and SPEAKER. When the instructor's comments for answer B are finished, ANS WORD(C) will be read. The associated decision logic thus again establishes the command FF', rapidly advancing the tape until the STOP WORD following that answer segment is encountered, again producing the delay PLAY signal and the ensuing functions as above described.

The branching capability of the system is well illustrated in this same logic flow path currently under consideration. If at any time during the PANS state a branch word is read from the tape, the corresponding decision logic produces the INDEX state. The foregoing logic flow of answer searching is then disrupted and the operations pertinent to the INDEX state for searching for the index number and thus tape position identified by the BRANCH WORD ensues.

By contrast, actuation of the control input BINDEX produces the INDEX state for the random access operation. As previously described, the index wheels are set to the desired tape position and the INDEX button 56 of FIG. 1B actuated to effect random accessing of the tape, and particularly to appropriately advance the tape to position it at that requested and identified index number position.

The internal search operations are the same whether a branching control word is read from the tape or whether an external control input BINDEX has been presented. Further, whereas branching has been shown in the PANS control input flow, it is apparent that the branching function may be provided at any desired position in a program. Essentially, the internal subroutines or commands provide for the procedure of advancing in fast forward initially, followed by fast reverse, followed by drive at normal drive speed from the desired index position for reproduction. In the related logic flow, B is the index number derived from the BINDEX control input or from the BRANCH WORD read from tape. A represents the index numbers as they are read from the tape during high speed transport of FF or FR in the search operation. Comparison of A and B thus is utilized in the search operation, to obtain A=B.

Thus, initially, the command FF' is established and the tape is driven in fast forward, the decision logic labelled INDEX WORD A B effecting the noted comparison and maintaining the command FF'. If A B does not obtain, upon decision logic EOT recognizing an end of tape signal, the command FR' for fast reverse drive of the tape is produced to continue the search for satisfying that comparison. Alternatively, if the condition A B does obtain, command FR' is produced and thus prior to EOT. The search then is for A B, as defined by the decision logic labelled INDEX WORD A 24B. Decision logic EOT maintains the fast reverse operation until the comparison A B is satisfied. However, if the tape should reverse to the beginning without that comparison being satisfied, EOT is recognized and the DRIVE' command is generated. Alternatively, as soon as the comparison A B is satisfied, the DRIVE' command is produced. The tape thus is driven in the forward direction at normal drive speed until decision logic INDEX WORD A=B is satisfied, whereupon the delay play signal is issued and related functions obtain. As a precautionary function, if decision logic INDEX WORD A=B is never satisfied, the tape will drive at normal speed until the END OF TAPE signal is produced at which time the system goes into the PSTOP state. This operation would normally result only from improper programming of the tape.

As also shown in the RECORD logic flow, the control inputs BFF and BFR producing fast forward and fast reverse control drive for the tape may be selected in the PSTOP mode.

It is important, in a teaching machine, to provide controls which prevent improper operation wherein a student may attempt to frustrate the program. These controls also have applicability to assure proper operation in applications of the system of the invention as general data retrieval systems. For example, the BPSTOP control input is prevented from having any effect while in the PANS state, by the associated decision logic. Thus, a student is prevented from stopping the machine during playback of an answer selection. Thus, the student cannot place the machine in the PSTOP state during PANS and thereby, for example, attempt to avoid grading of his answer selection, or skip any portion of the programmed lesson, such as by actuating the fast forward or fast reverse buttons. Further, the previously noted command SET=TO ANS(A) is afforded to prevent frustrating the learning program by a student intentionally or unintentionally actuating the PLAY button producing the PLAY control input, when he is directed to make an answer selection. For example, a student may actuate the PLAY button when he is uncertain of his answer selection, thereby to attempt to prevent scoring of that answer. The system responds, however, by arbitrarily making the selection of ANS(A) as his answer.

Referring now to the line of logic flow for the BPLAY control input, if the PLAY state is established during ANS, the associated decision logic, in response to reading of any answer control word from the tape, sets that answer equal to ANS(A), and establishes the PANS state. The resulting search for answer A and grading and scoring functions then obtain as before described.

From the foregoing logic flow diagrams, it will be apparent that a student response unit may be implemented as a separate system, apart from the instructor's programmer unit or, in other words, that a more simplified machine functioning only in the PLAY mode may be provided to a student whereas a combined system affording both PLAY and RECORD modes of operation would be provided to the instructor for recording the program on the tape.

DISCUSSION OF DETAILED LOGIC DIAGRAMS

Sequential Control Logic:

As is well known in the art, sequential control logic or, more simply, sequential logic, is a technique by which a present state is employed to control a future state of a system. The sequential control logic of the subject system thus performs many of the functions of the logic decision circuits discussed in relation to the flow diagrams of FIGS. 6 and 7, as to permitting a command function, derived either from the control inputs afforded by actuation of the buttons or from control words read from the tape, to establish a different state of the machine as a function of the current state. The sequential control logic therefore interfaces the various control inputs with the current state of the machine to prevent inconsistent operations, or improper operations, from being initiated by the instructor in programming the tape, or by the student in responding to a programmed lecture in playing back the tape.

The various inputs to the sequential control logic are readily identifiable with reference to the flow diagrams of FIGS. 6 and 7, and will be more specifically explained in connection with the discussion of the portions of the system by which these inputs are generated. In general, the prime indications on the inputs to the sequential control logic denote the fact that they may result from two or more different operations. For example, RECORD' is produced by any of control inputs which result in a recording operation, including BRSTOP, BANS(X), BRQSTART, and BR[WORD(X)] when produced in the RECORD state or the EDIT substate, as shown in the flow diagram.

ANSWER ' results from actuation of any of the buttons A through D in either RECORD or PLAY operations. RSTOP', END', and BPLAY result from actuation of the corresponding buttons. DPLAY' corresponds to the DELAY PLAY subroutine identified in the flow diagram and particularly is produced upon completion of the operations of QSTART, PANS, and INDEX, upon obtaining A=B. EOT is produced from the tape transport, as noted. DR is the DRIVE command function. INDEX' results from actuation of the INDEX button and BRANCH' from the reading of a BRANCH word from the tape. The SPEAKER input is generated with DR for audio reproduction. BPSTOP results from actuation of the PSTOP button whereas FPSTOP is produced from the shift register during a PLAY operation. PSTOPR' and PSTOPP' are generated during RECORD and PLAY operations, respectively, wherein the final result of a specific operation is to stop the machine. To further identify these inputs, the RECORD logic produces the RECORD', RSTOP', END', and PSTOPR' inputs, and the PLAY logic generates the ANS', DPLAY', DR, INDEX' BRANCH', and SPEAKER inputs. The shift register logic generates a PSTOP input, and the BPLAY, BPSTOP, and PSTOPP' inputs are generated directly by actuation of the corresponding buttons. The outputs of the sequential control logic comprise signals identifying the seven basic states of the system, RECORD, RANS, RSTOP, PLAY, PANS, INDEX, and PSTOP and also an output F3 which is true for any record operation.

Figure 8A:
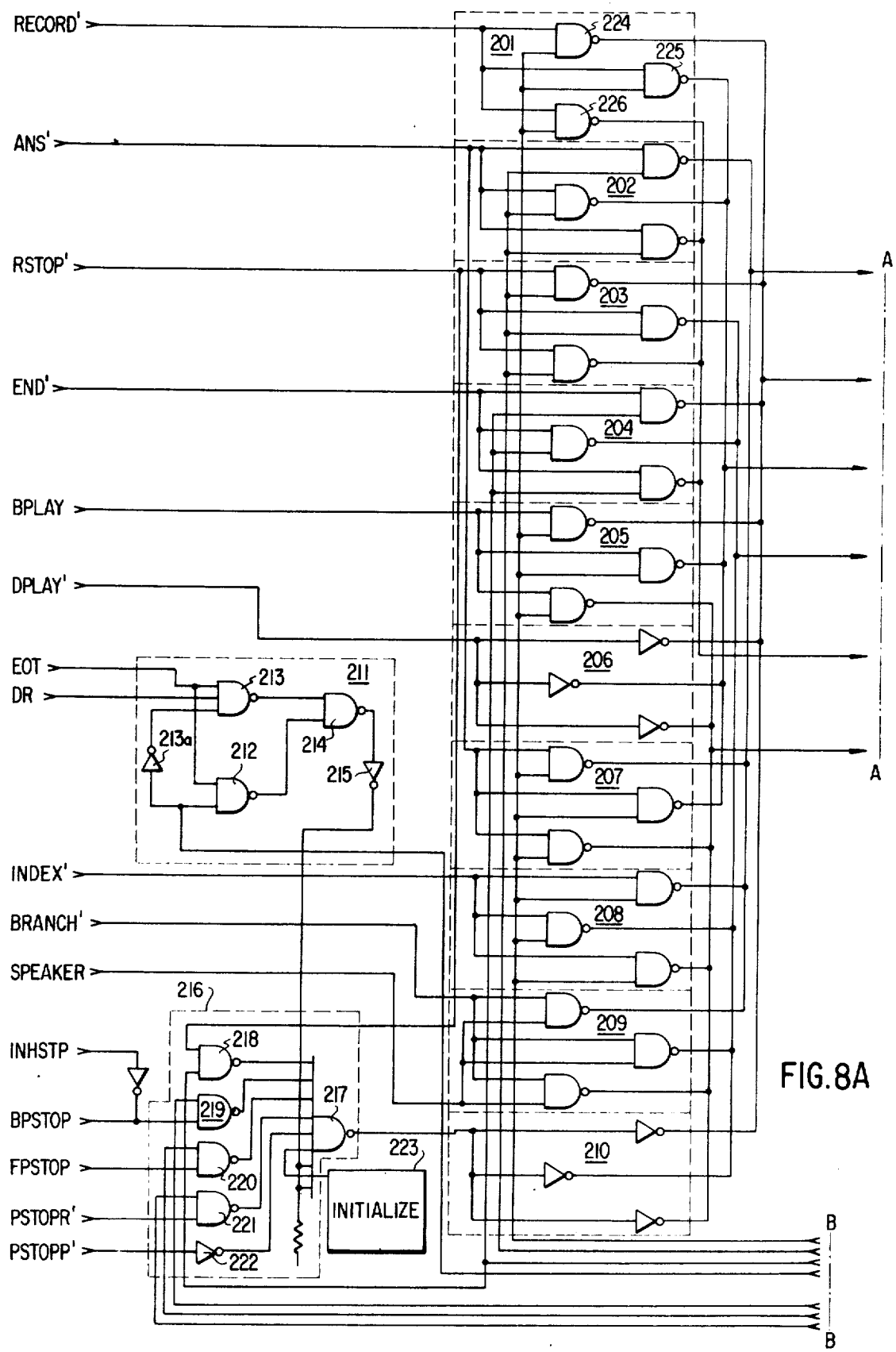
FIG. 8 comprises a detailed logic diagram of the sequential control logic portion of the system of the invention and is shown in portions in FIGS. 8A and 8B to be combined as indicated.
Figure 8B:
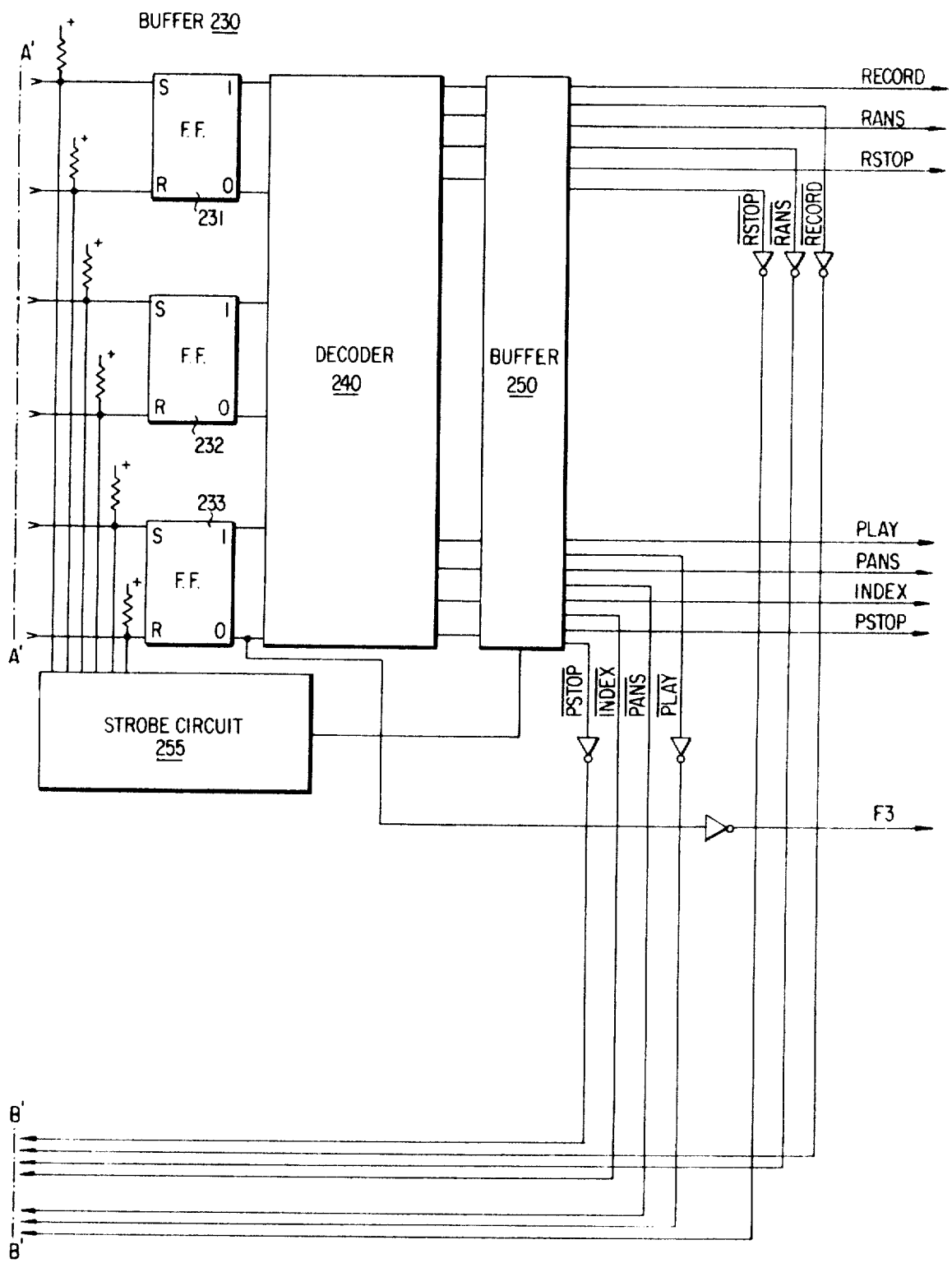

The basic organization of the sequential control logic of FIG. 8 includes an encoder 200 comprising a plurality of gates responsive to the various inputs referenced above, and which produces a three bit binary code output. A buffer storage 230 comprising three bistable flip-flops responds to the three bit binary code output of the encoder 200 to store an indication of the encoded function. A one out of eight decoder 240 responds to the binary encoded values stored in the buffer register 230 to supply on one of its eight output lines an output signal for setting a respectively corresponding one of the storage elements of a further buffer storage 250. The further buffer storage 250 thus produces the output signals selectively identifying the current state in accordance with the seven states previously discussed. Buffer storage 250 also provides a plurality of outputs 260 comprising the complements of the state outputs, and which are supplied to the encoding gate system 200. It will thus be appreciated that the encoding gate system 200 performs an encoding function, and also is responsive to the current state of the system to be selectively enabled in accordance with the sequential control logic functions of the system to produce the encoded outputs only when they are consistent with the permitted sequence of operations in the system.

The specific sequencing functions performed by the sequential control logic in establishing a specific one of the seven states of the machine in response to the various inputs are expressed by the following equations:

$$RECORD = (RECORD')(PSTOP)$$

$$RANS = (ANS')(RECORD)$$

$$RSTOP = (RSTOP')(RECORD) + (END')(RANS)$$

$$PLAY = (BPLAY)(PSTOP) + (DPLAY')$$

$$PANS = (ANS')(PSTOP)$$

$$INDEX = (INDEX')(PSTOP) + (BRANCH')(SPEAKER)$$

$$PSTOP = (INITIALIZE) + PSTOPP' + (RSTOP')(RANS)$$
$$+ (BPSTOP)(PANS) + (FPSTOP)(PLAY)$$
$$+ (PSTOPR')(RSTOP) + TEND$$

Considering the circuitry of the sequential control logic in more detail, the encoding gate system 200 includes a plurality of gates 201 through 210 which respond to respectively corresponding ones of the plurality of inputs, and the outputs of which are selectively combined to produce the three bit encoded inputs to the buffer storage 230. With the exception of gates 206 and 210, each of the gates 201 to 210 receives an input from a corresponding one of the present state output lines of the further buffer storage 250, which must be a logic 1 for the gate to be enabled by the respectively associated inputs provided thereto. Gates 206 and 210 perform an encoding function; however, the inputs thereto and/or further gating circuitry associated therewith affords enabling thereof in accordance with the sequential control logic, as will be explained.

Considering the gate 201 specifically, and as illustrative of the sequentially controlled gates of the group 200, gate 201 includes three NAND gates 224, 225, and 226. These gates are normally disabled and produce a logic 0 output. When the RECORD' input is true and thus logic 1, each gate receives a first enabling input. These gates are only enabled, however, if the PSTOP current state is true and thus logic 1. This, of course, conforms with the sequence of the flow diagrams wherein the RECORD state can only be produced from the PSTOP state.

The operation of the remainder of the sequentially controlled gates thus will readily be understood and, as well, the gates 206 and 210. Gate 202 thus produces an output to establish the RANS state in response to ANS' when the RECORD state is true from its associated current state line. Gate 203 produces an output for establishing the RSTOP state when the RECORD state is true, and gate 204, the RSTOP state when the RANS state is true in response to the END' input. Further, gate 205 produces an output to establish the PLAY state in response to BPLAY when the PSTOP current state is true, and gate 206, the DPLAY' signal leading to the PLAY state. Gate 207 produces the PANS state when ANS' is received, if the PSTOP state is true. Gate 208 produces INDEX state in response to INDEX' if PSTOP is true, such as in a random access search function, whereas gate 209 produces the INDEX state if BRANCH' is received when at the same time the SPEAKER input is true, and thus during normal play functions when a BRANCH word is read from the tape. Gate 210, discussed below in detail, produces the PSTOP state in response to a plurality of different inputs and which may result when any one of the current states INDEX, RANS, PANS, PLAY, and RSTOP exists.

With regard to producing PSTOP, gate 210 receives an output from gate 216, the latter receiving an output from gate 211, and each receiving a plurality of inputs. As to gate 211, NAND gates 212 and 213 have one input interconnected by inverter 213a and a further NAND gate 214 which functions in combination with the NAND gates 212 and 213 to produce a logic OR function in response to the inputs. A further explained, INDEX is supplied as a current state signal from buffer storage 250 to gate 211. The output of NAND gate 214 is inverted by inverter 215 and supplied to NAND gate 217 of gate 216. Thus, whenever INDEX, EOT, or DR is true and thus logic 1, NAND gate 214 produces a logic 1 output and inverter 215, a logic 0 output to NAND gate 217 of gate 216. INHSTP to be described is generated during each periodic recording interval and inhibits BPSTOP from actuation of the PSTOP button from stopping the machine during recording of a digital word to assure complete recording thereof.

NAND gate 217 functions as a logic OR to the inputs to gate 216 and particularly receives as inputs the outputs from NAND gates 218 through 221 and inverter 222, as well as the output from gate 211. The final input to the NAND gate 217 is derived from an initializing circuit 223 which provides an RC time constant of delay subsequent to initial turn-on of the machine which exceeds the time duration of any spurious signal which may result in that initial turn-on. The previously noted inputs to gate 211 are thus processed in gate 216 in accordance with a logic OR function.

The output of gate 216 therefore is normally logic 0 and becomes logic 1 when, in accordance with any of the noted current states of the machine, a control input either from actuation of a control button or reading of a control word from the tape establishes the command function to stop the tape. Gate 210 thus comprises the PSTOP gate. The output of gate 210 is supplied to the reset input of each stage of buffer storage 230.

The buffer 230 includes three flip-flops 231, 232, and 233 which are set in response to a logic 0 at the S (set) terminal and reset in response to a logic 0 at the R (reset) terminal of each thereof, and produce logic 1 at the 1 and 0 output terminals thereof, respectively, when in the SET and RESET states. The outputs of the flip-flops 231, 232, and 233 are applied to the decoder 240 which responds to the three bit binary code to produce a corresponding output signal on each of the eight output lines thereof. Flip-flop 233 also produces an output F3 from its reset output terminal 0. In accordance with the encoding, the reset output of flip-flop 233 is logic 1 and, thus, the flip-flop is reset and F3 is true for any of the states RECORD, RANS, and RSTOP. Thus, when F3 is true, some form of record function is to be performed.

The further buffer 250 comprises eight independent storage elements respectively receiving the eight outputs of the decoder 240 at the S (set) terminals thereof and producing in response thereto the respectively corresponding outputs, as labelled, identifying the current state of the system. For purposes of isolation, the complementary outputs of the flip-flops of the buffer 250 are supplied through inverters, with the exception of INDEX and PANS which are applied directly, to the input stage of the sequential control logic and particularly to the encoder 200 and the associated input gating circuits211 and 216, to provide the sequential control.

The strobe circuit 255 responds to the presence of a signal on any of the outputs of the individual gates of the encoder 200 to produce, a predetermined time duration thereafter, a reset signal. That reset signal is applied to the reset (R) terminals of the flip-flops of the buffer 250 to clear the data stored therein prior to receipt of the data from buffer 230 for a new state.

The operation of the sequential control logic is thus understood by consideration of an example. As noted, the RECORD' input enables the NAND gates 224, 225, and 226 of the gate 201 which, if enabled in accordance with the state PSTOP being true, produces a logic 0 at the output of each thereof. A logic 0 is thus applied to the R input of flip-flop 231, and a logic 0 to the set inputs of flip-flops 232 and 233, correspondingly resetting and setting these flip-flops. The flip-flops 231, 232, and 233 thus present a three bit binary encoded signal to the decoder 240.

In response to the enabling of gate 201 and the producing of an output thereby, data strobe circuit 255 produces a strobe signal to reset the flip-flops of the buffer 250 simultaneously, the latter then being enabled to subsequently receive the output of decoder 240 to store therein a newly established state of the machine. Thus, it will be appreciated that the interplay of the buffer 250 with the encoder 200 of the sequential control logic enables maintaining the present state to provide a logic decision in encoder 200 as to establishing a new state in response to a new command function or control input. That future state, if permitted, then in encoded form is stored in the buffer 230; simultaneously, the strobe circuit 255 resets the buffer 250 to thereupon be set by the output of decoder 240, in response to the stored binary indication of the new state in buffer 230, in accordance with the newly established state of the system.

Figures 9A, 9B:
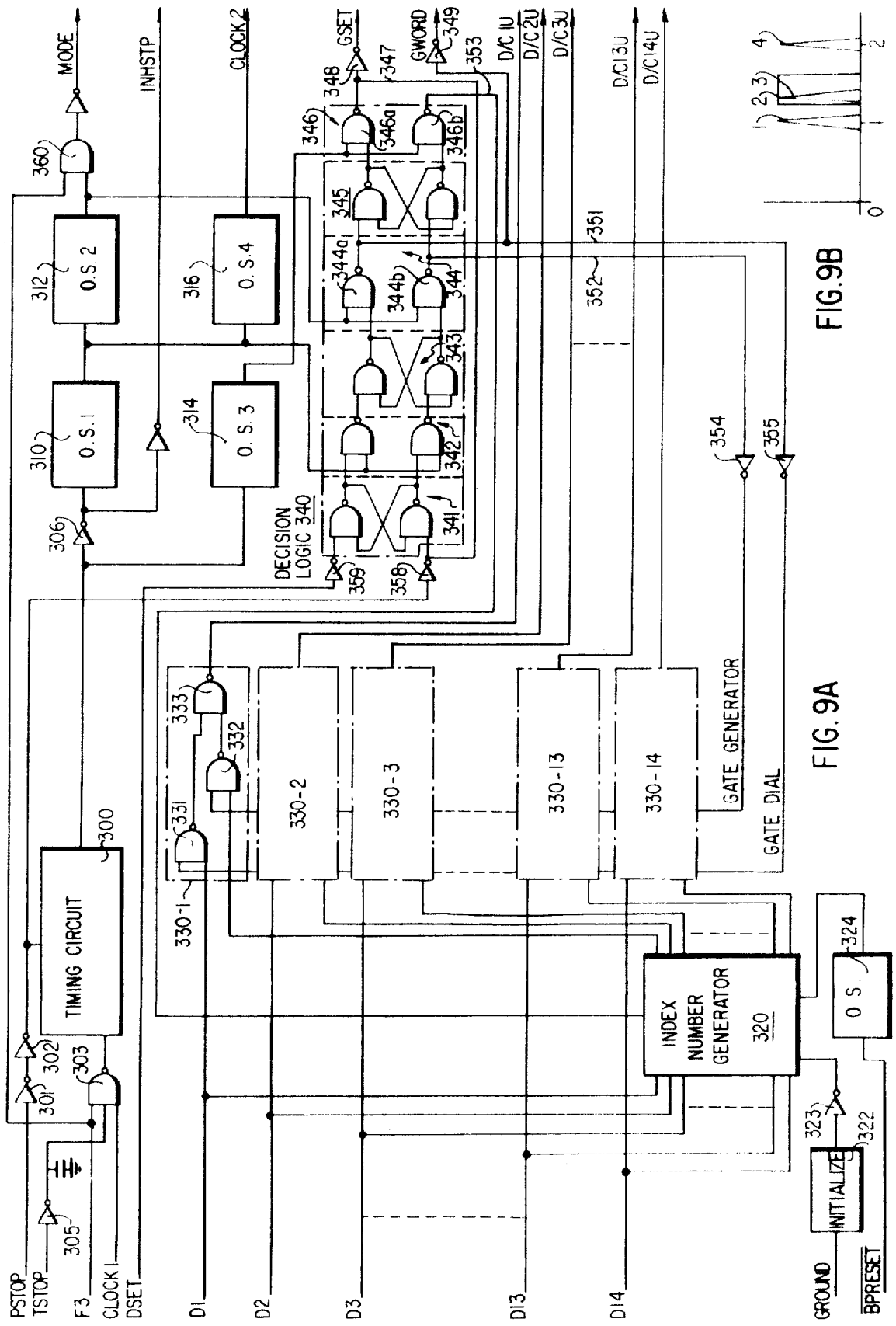
FIG. 9A comprises a detailed logic diagram of the record/gate logic portion of the system of the invention.
FIG. 9B is a waveform of timing signals generated in the record/gate logic.
Figure 10A:
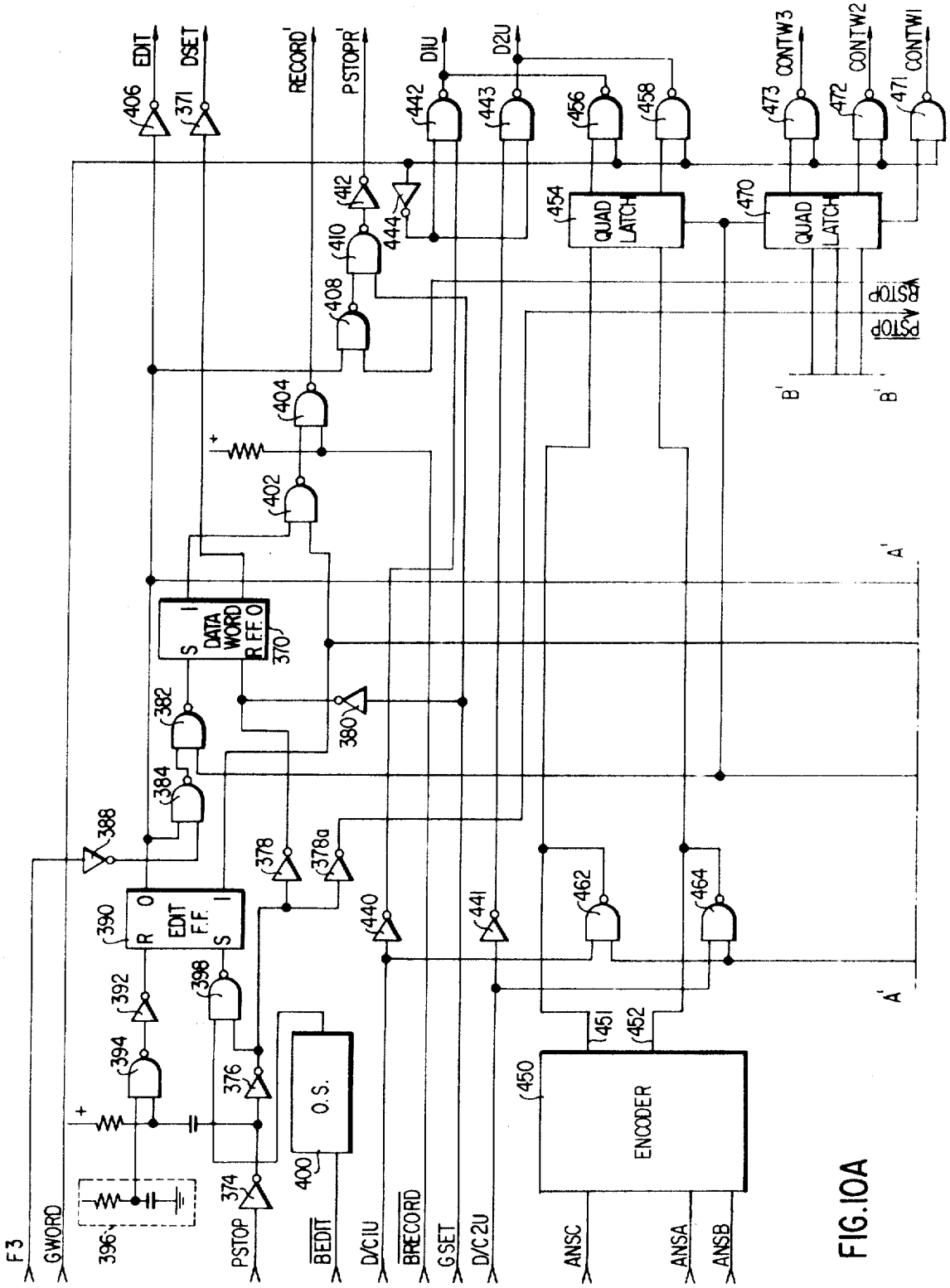
FIG. 10 comprises a detailed logic diagram of the record logic portion of the system of the invention and is shown in portions in FIGS. 10A and 10B to be combined as indicated.
Figure 10B:
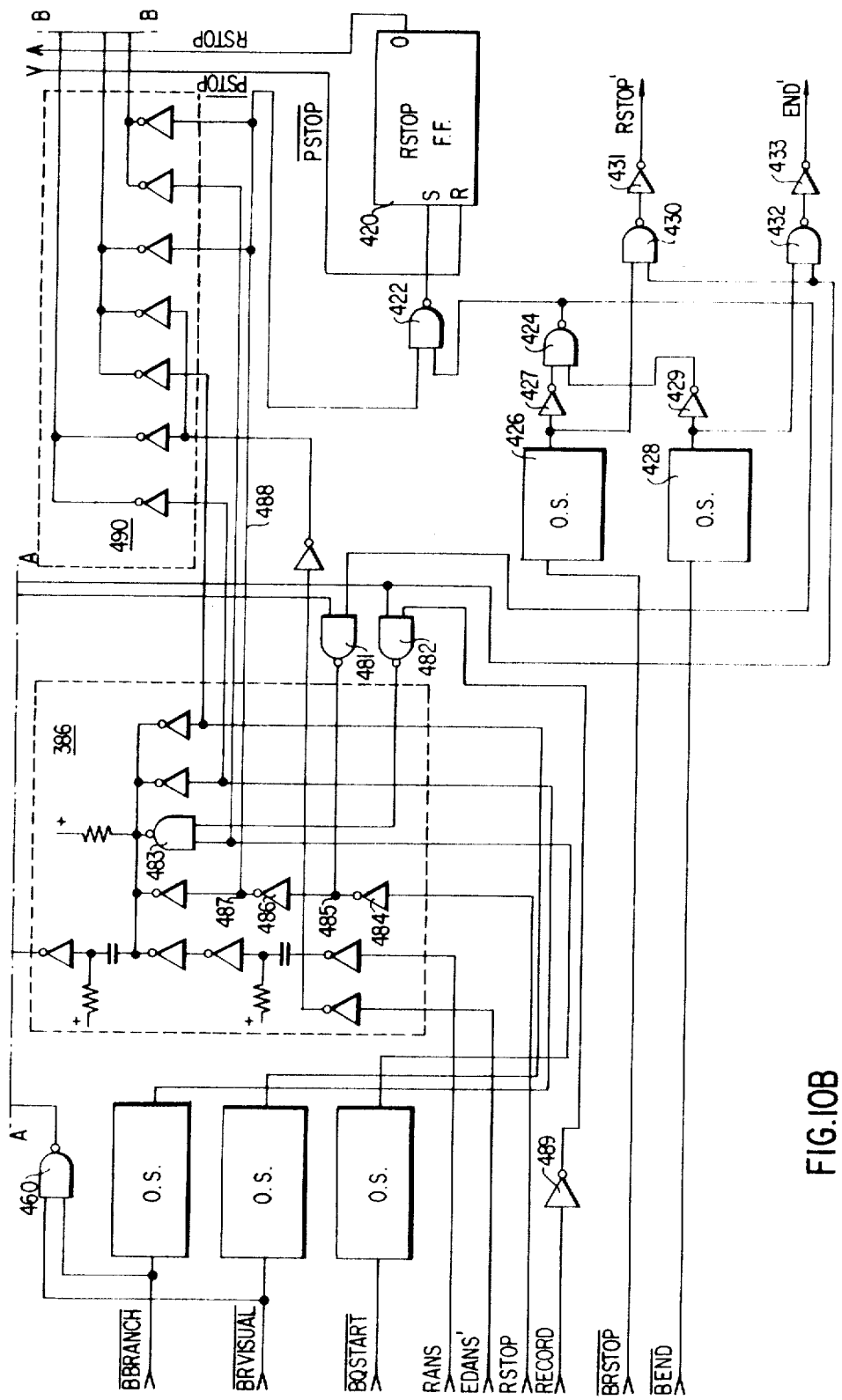
Figure 12A:
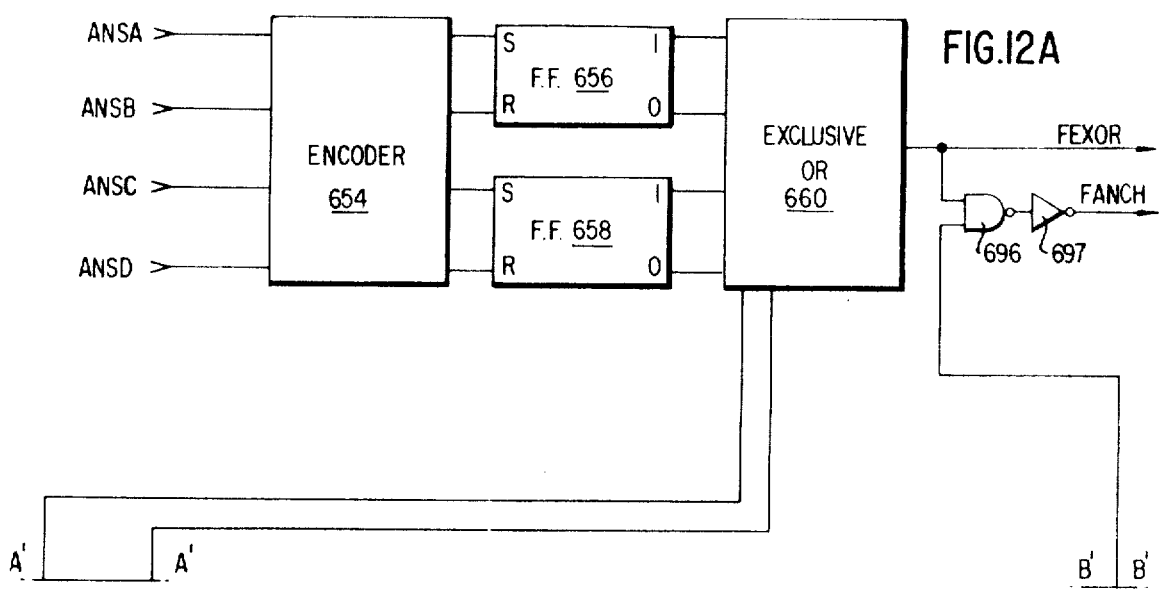
FIG. 12 comprises a detailed logic diagram of the shift register logic portion of the system of the invention and is shown in portions in FIGS. 12A through 12C.
Figure 12B:
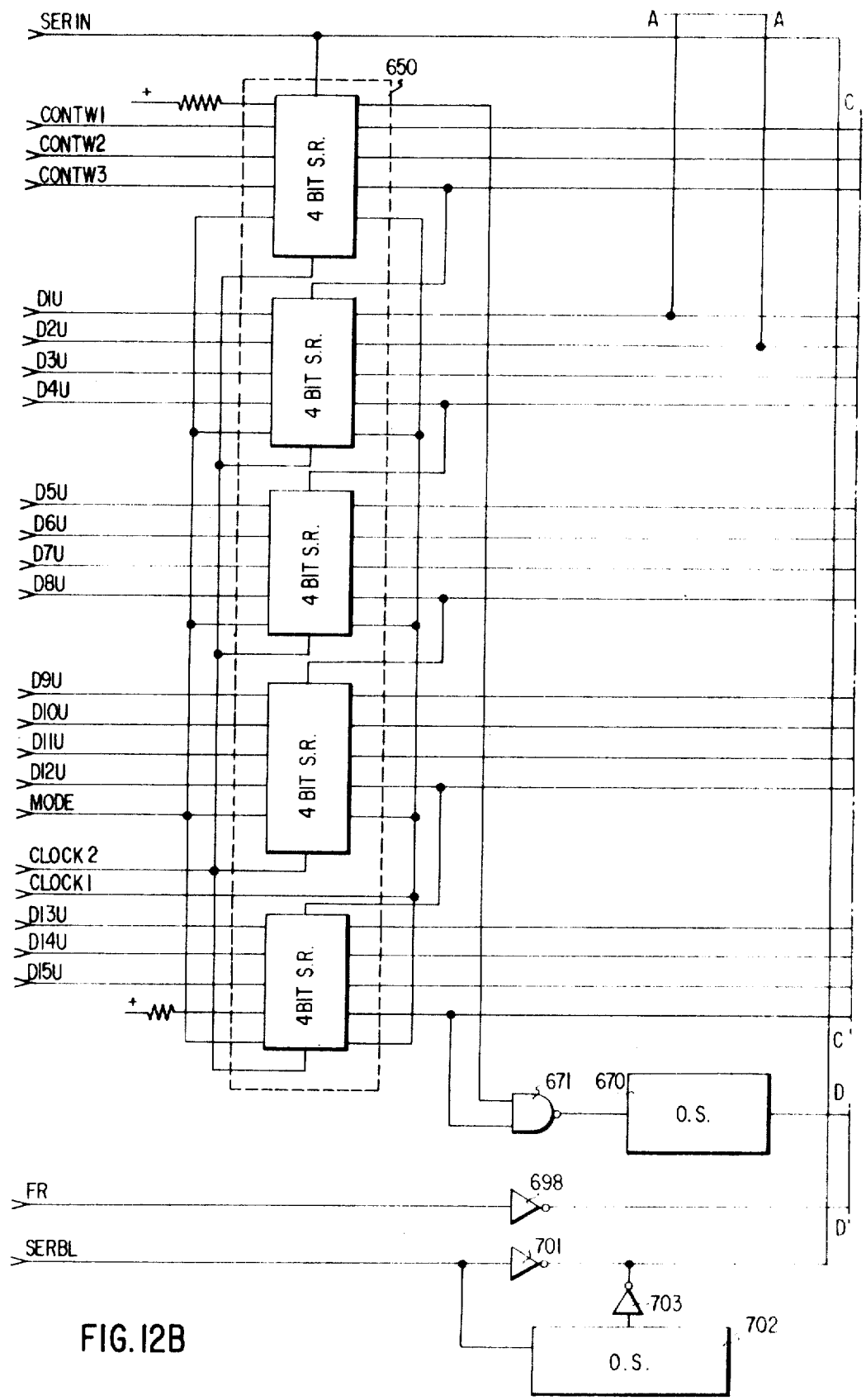
Figure 12C:
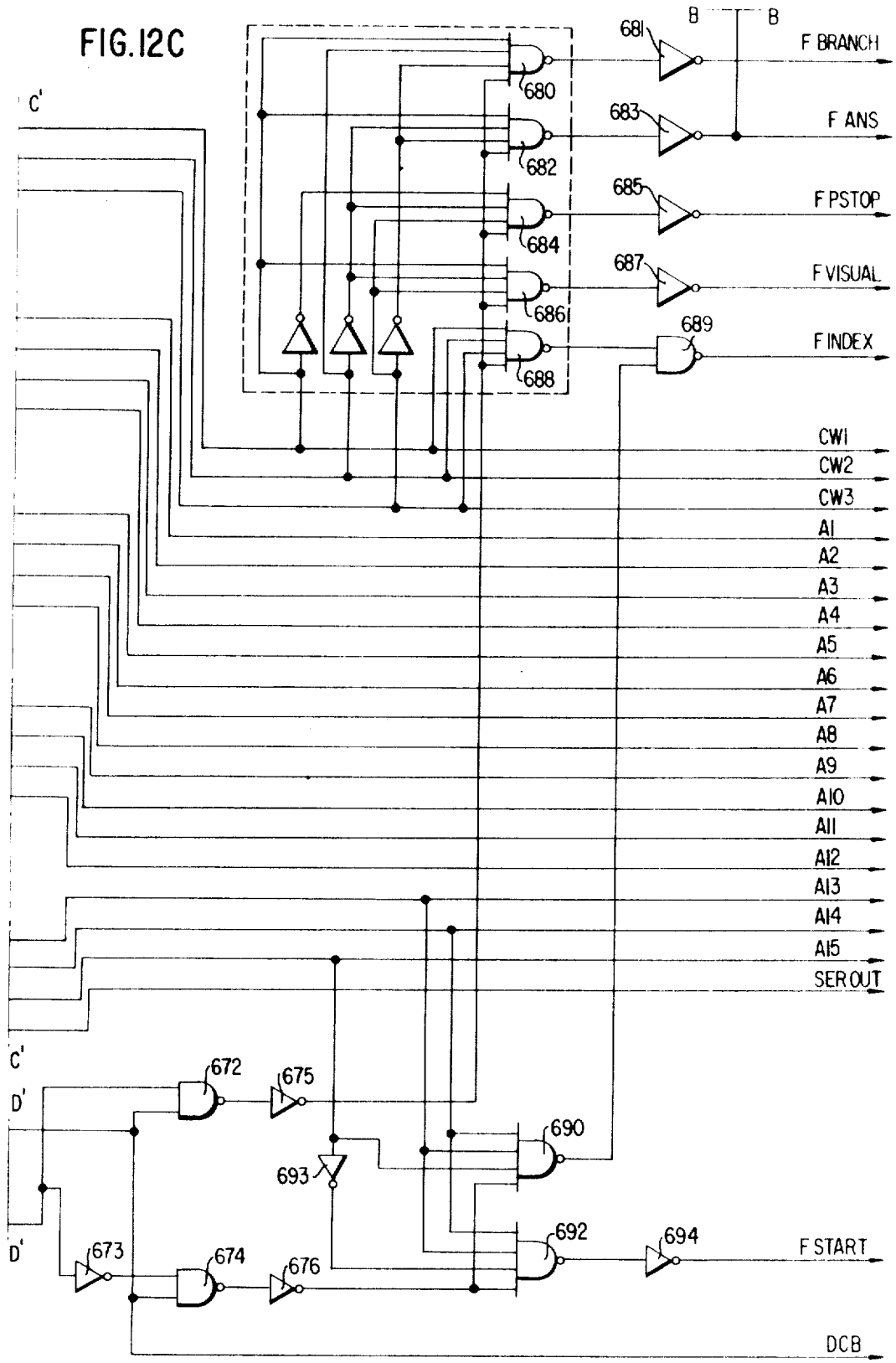
Figure 13A:
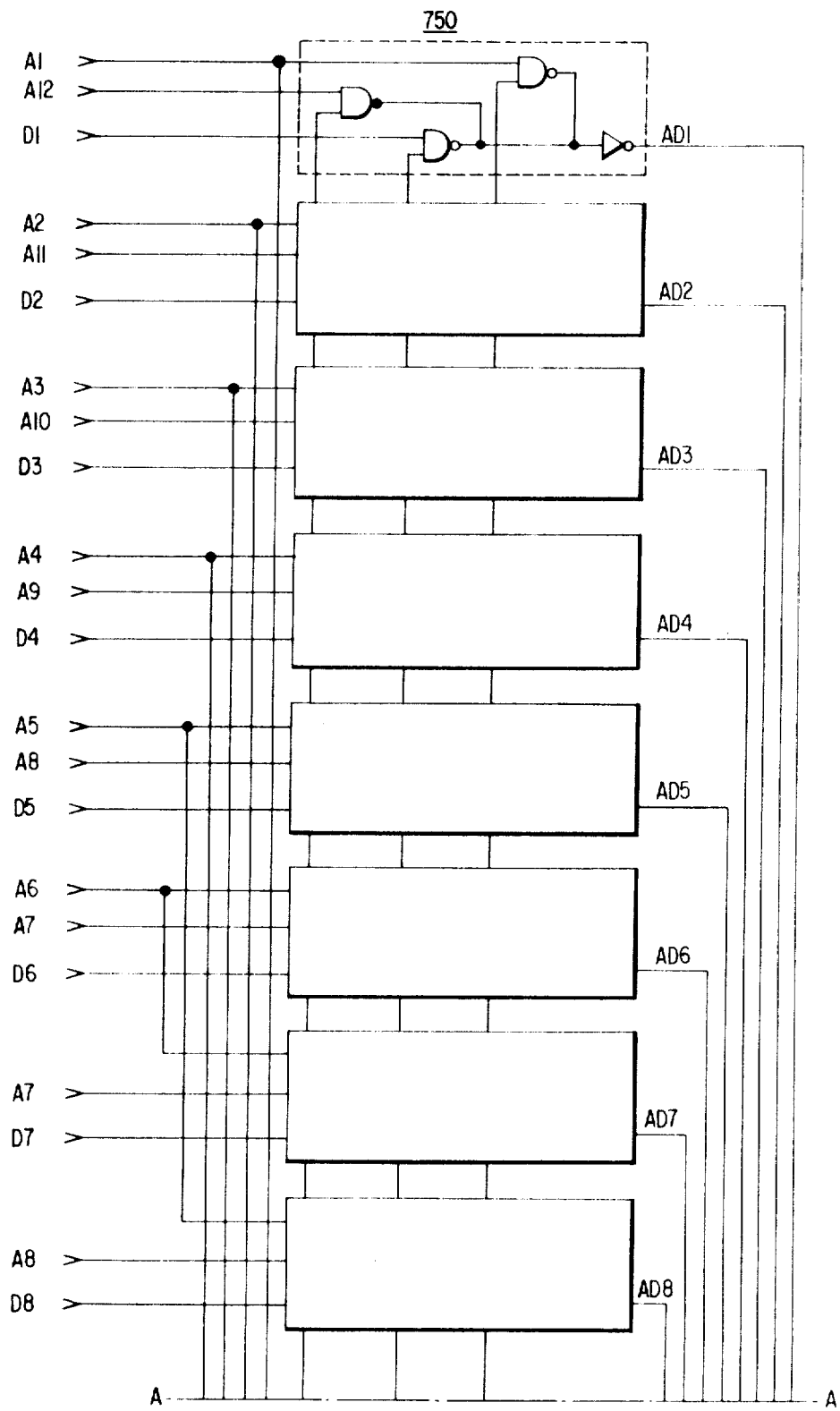
FIG. 13 comprises a detailed logic diagram of the gate and comparator logic portion of the system of the invention and is shown in portions in FIGS. 13A and 13B.
Figure 13B:
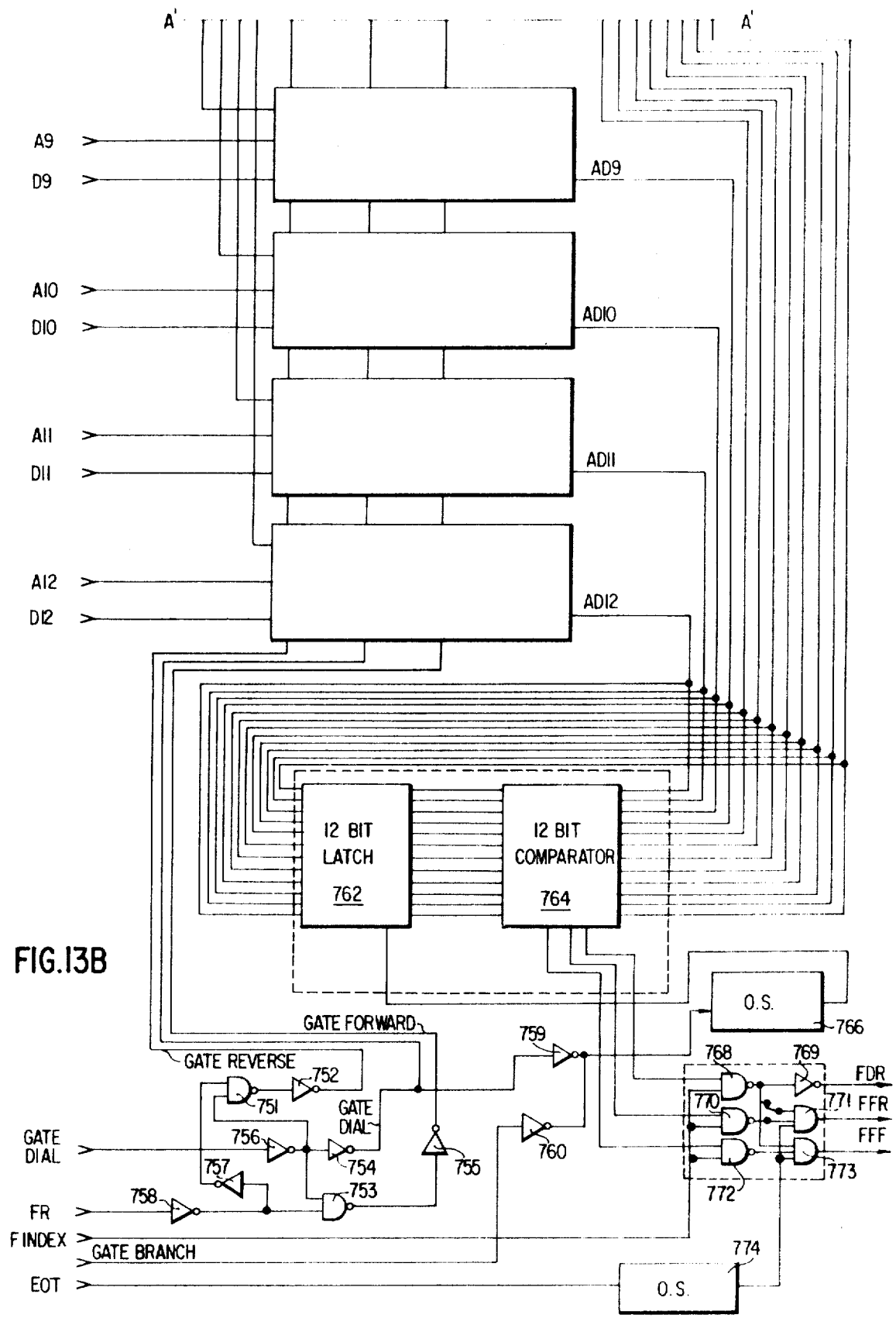
Figure 14A:
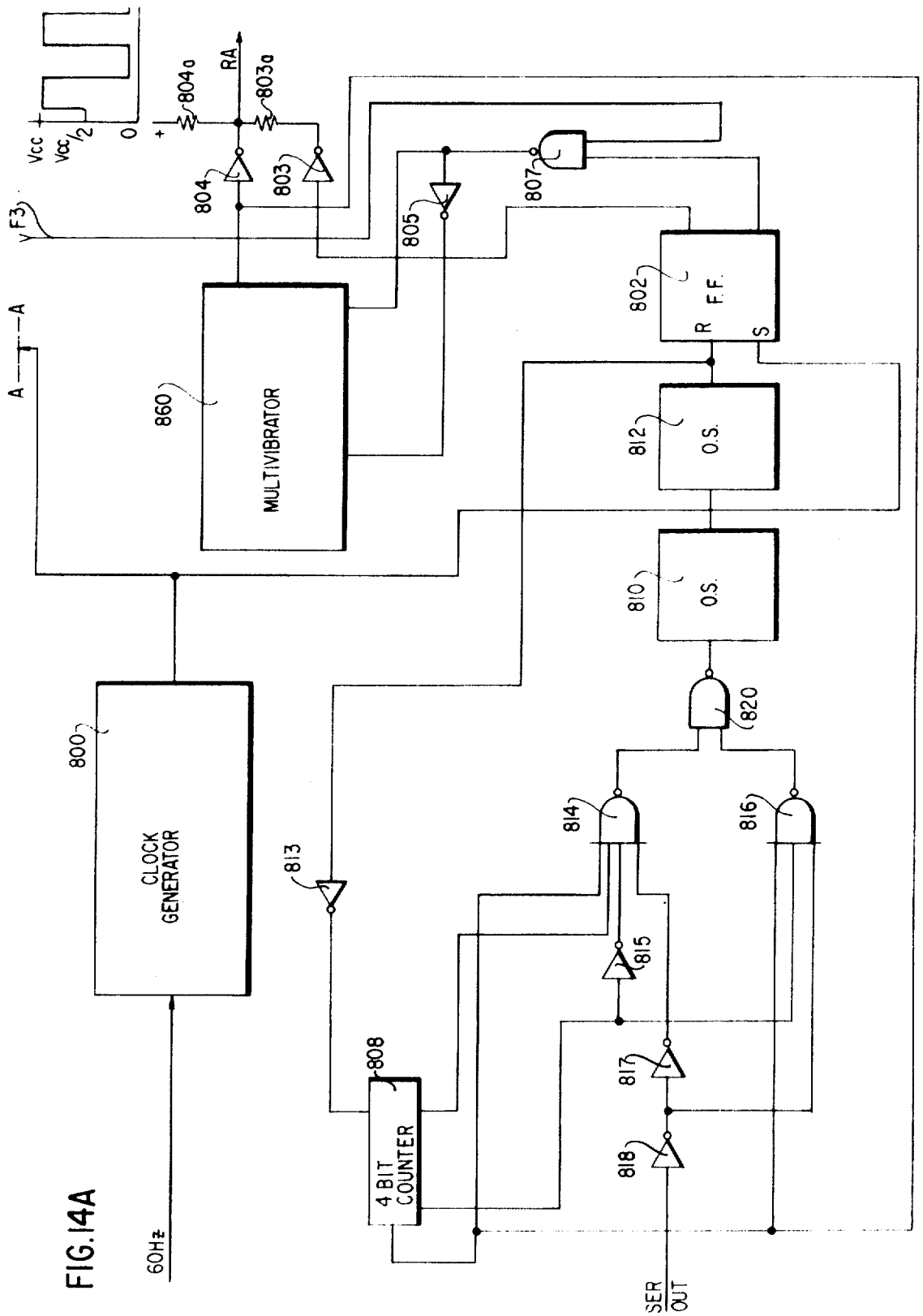
FIG. 14 comprises a detailed logic diagram of the modem employed in the system of the invention and is shown in portions in FIGS. 14A and 14B.
Figure 14B:
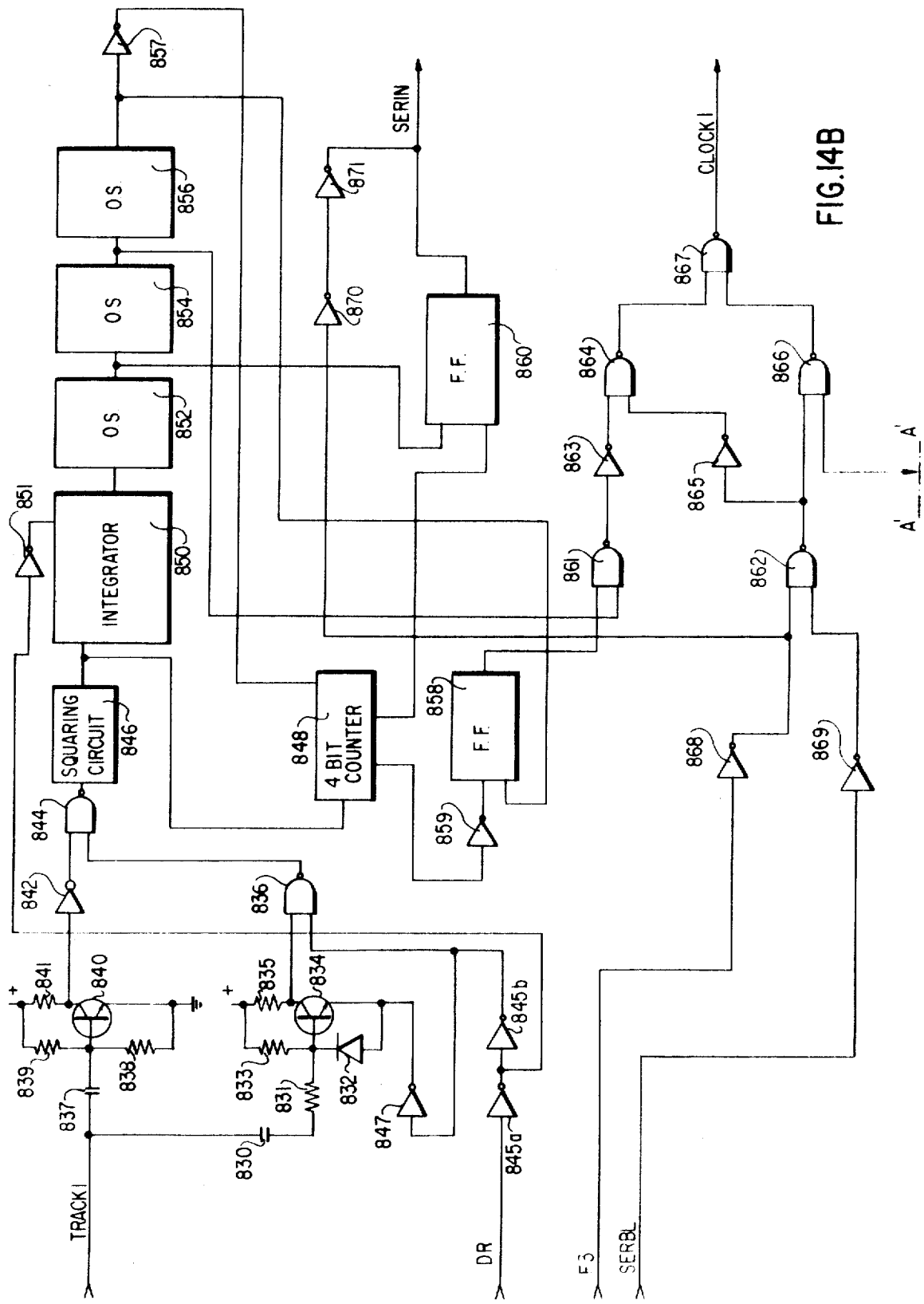

RECORD/GATE LOGIC AND RECORD LOGIC — FIGS. 9 and 10:

The portions of the system shown in FIGS. 9 and 10 relate to the RECORD mode of operation. In general, the record/gate logic of FIG. 9A provides for timing the automatic recording of index words in the numerically ordered sequence, as before described, as well as for selectively enabling the alternative recording of control words. That portion also includes the index number generator and the controls for its automatic sequencing, as well as for presetting thereof as in the EDIT operation; in addition, there are included the controls for inserting an index number in a branching control word and for input of an index word for random access, in INDEX. The record logic of FIG. 10 generally provides for responding to the control inputs pertinent to the recording operations, and for encoding those inputs in a prescribed format for processing to establish the various states and substates and resulting control operations. Processing of the bits of data which comprise these words is performed in a parallel fashion in the system, although the recording on tape is in a serial format. The necessary conversion is afforded by a shift register and associated circuits discussed hereafter in relation to FIG. 12. Basic system timing and signal conversion for magnetic tape record/read operations is provided in the modem, discussed in relation to FIG. 14.

Considering first the record/gate logic of FIG. 9A, the PSTOP and F3 inputs are provided by the sequential control logic, clock 1 comprises a 60 Hz pulse train derived from the modem, and the input DSET is derived from the record logic. DSET identifies that a control word is to be recorded in lieu of an index word. TSTOP is produced directly by the actuation of the TSTOP button for temporarily stopping the machine without a change of state. D1 through D14 comprise inputs from the index dial and are processed by a decimal to binary converter associated with the dial (not shown) to present a binary coded decimal value corresponding to the index number set manually in the index dial of FIG. 1B. System ground is supplied to an initializing circuit. BPRESET is produced by actuation of the PRESET button when the index number set in the dial is to be established in the index number generator, such as in an EDIT operation.

Timing circuit 300 provides the timing control for the periodic recording of index words, as well as defining the time position of a control word to be inserted in lieu of an index word. The circuit 300 is essentially a counter which counts down 128 pulses at the clock 1 rate of 60 Hz to produce an output pulse approximately every two seconds. The pulse preferably is a square wave of approximately a two second period. The circuit 300 is reset by the PSTOP input as applied thereto through inverters 301 and 302. Initiation of the count function of timing circuit 300 is produced by the output of NAND gate 303 in response to F3 which as will be recalled, is true during any RECORD operation, and thereupon responds to the clock 1 input from the modem. Note that the PSTOP input is applied through inverter 305; since PSTOP is normally logic 0, inverter 305 normally produces an enabling input to NAND 303. However, when PSTOP is received, NAND 303 is disabled and prevents further operation of timing circuit 300. Thus, the system is in a standby mode and, as will be described, further sequencing or advancing of the index number generator is terminated.

The timing circuit 300 has associated therewith four timing circuits which define intervals within the two second cycle of the output of the timing circuit 300. These circuits are identified by the numerals 310, 312, 314, and 316. Each may comprise a one shot multivibrator and thus the circuits are respectively labelled OS1, OS2, OS3, and OS4. Their function is more readily appreciated in connection with the adjacent timing chart of FIG. 9B.

In FIG. 9B are illustrated four pulses labelled 1, 2, 3, and 4 and which are generated by the one shots OS1 through OS4, respectively. OS1 is set in response to the leading edge of the positive half-cycle of the square wave pulse from the timing circuit 300, through inverter 306, to substantially simultaneously therewith produce pulse 1 at the one second time position relative to an initial 0 time. The output of inverter 306 is also supplied as the output INHSTP, as described in relation to FIG. 8, assuring recording of a full word.

The pulse output of OS1, in addition to being applied to OS2 and OS3, performs a further function to be explained and in accordance with which it is termed the DATA SOURCE GATE pulse. OS2 is enabled a few microseconds following receipt of the pulse from OS1 and produces pulse 2 of a few milliseconds duration, termed the DATA ENABLE GATE pulse, the function of which is hereinafter explained.

OS3 also responds to the pulse 1 output of OS1 to produce pulse 3, occurring within the duration of the DATA ENABLE GATE pulse 2, termed the CLOCK 2 output. OS4 responds directly to the output of timing circuit 300, and particularly to the trailing edge of the positive half-cycle of the pulse, and thus one second after pulse 1, to produce pulse 4, termed the CLEAR STROBE pulse. The one shots OS1 through OS4 thus repeat this function of generating the noted pulses 1 through 4 over a one second interval of each two second cycle of the output pulses from timing circuit 300, during F3.

The foregoing timing functions define the time period at which a control word or an index word is to be gated in parallel form into the shift register which then supplies serial data bits to the modem for recording in the tape.

The numerically ordered sequence of index numbers for the index words is generated by index number generator 320 which, during recording of index words, is caused to advance by one count for each two second interval. It will be recalled that the index number generator is disabled from advancing by a count at each periodic interval during which there is instead recorded a control word. The generator 320 is preset to a zero count in response to the output of an initialize circuit 322, applied thereto through inverter 323, upon initial turn-on of the machine. The generator 320 is also responsive to the inputs D1 through D14 from the index dial, to be preset to the count represented at these inputs when enabled for that purpose by a counter preset pulse generated by the one shot 324 in response to the control input BPRESET.

Gating system 330 receives the outputs for each data bit position from the dial inputs D1 through D14 and from generator 320, and is selectively enabled to gate through one or the other thereof, under control of decision logic 340, to be described. The gate system 330 thus includes fourteen identical gates 330–1 through 330–14.

As an example, gate 330–1 includes a NAND gate 331 which receives the D1 input from the index dial and NAND gate 332 which receives the first bit position output of generator 320, each of these also receiving a corresponding, selective enabling input from the decision logic circuit 340. The outputs of NAND gates 331 and 332 are supplied to NAND gate 333. Depending upon which of the NAND gates 331 and 332 is currently receiving an enabling input from decision logic circuit 340, either the dial input or the generator input will be gated through. The gates 330–1 through 330–14 operate in an identical manner and function simultaneously, to produce the outputs D/C1U through D/C14U in parallel. The binary coded decimal count afforded thereby, although only illustrative, is selected as adequate to provide index numbers throughout the entire extent of a typical tape cassette as contemplated for employment in the subject system. It is apparent, however, that any greater or smaller number of index number bit positions may be provided.

Consideration is now given to the decision logic circuit 340. This circuit includes six stages labelled 341 to 346. Gating stage 342 receives the DATA SOURCE GATE pulse from OS1, gating stage 344 receives the DATA ENABLE GATE pulse from OS2, and the output gating stage 346 receives the CLEAR STROBE pulse output from OS4 and also provides a reset output on line 347 to the input stage 341. Gating stage 346 produces, through inverter 348, the output GSET and gating stage 344, through inverter 349, the output GWORD. NAND gates 344a and 344b of stage 344 also produce, selectively, the enabling outputs for the gate circuit 330. More particularly, NAND gate 344a produces on line 351 the enabling output for gating through the dial setting, whereas NAND gate 344b produces on output line 352 the enabling output for gating through the counter value for establishing the index number on output lines D/C1U to D/C14U. Line 351 also supplies, through the inverter 349, the GWORD output. Finally, the NAND gate 346b of the output stage 346 produces, in response to the CLEAR STROBE pulse, a pulse output on line 353 which is applied to the index number generator 320 to increment, or advance, the count generator every two seconds for generating the numerically ordered sequence of index numbers.

In operation, the input stage 341 of decision logic 320 is initialized by the PSTOP state through inverter 358, simultaneously with reset of the timing circuit 300. In the absence of any further input, decision logic 320 will determine that an index word is to be recorded.

The first stage flip-flop 341, however, is set in response to a DSET input, applied thereto through inverter 359, when a control word is to be recorded on the tape in lieu of an index word. The DSET input is produced by the record logic portion of the system and particularly is produced when a control word is to be recorded on the tape, as will be described.

One second following the initialize time of $t=0$, OS1 produces DATA SOURCE GATE enabling the NAND gates of stage 342 to gate through the state of the first stage 341 for storage in the third stage flip-flop 343. The input of the decision logic 340 is now isolated from any further control word which might be presented by actuation of a control button until the processing functions relating to the word first generating DSET are completed. Alternatively, during the normal index word recording, DATA SOURCE GATE also serves to lock in the decision to record an index word, such as where DSET is received following DATA SOURCE GATE. The system is thus committed to follow through on the decision which has been made as to recording either an index word or control word, until the next recording interval.

Gating stage 344, responsive to the DATA ENABLE GATE output of OS2, thus presents an enabling output selectively on lines 351 and 352 in accordance with the state of flip-flop 343, to either gate the dial setting or the counter value through gating circuit 330 in accordance with a decision to record a control word or an index word, respectively.

The output of OS2 is also applied to NAND gate 360, further enabled by the F3 input which is logic 1 during any record operation, to produce, through inverter 361, the output MODE which is applied to the shift register to identify the record mode of operation. The shift register is thereby enabled for receiving the bits, such as D/C1U through D/C14U. In addition, the pulse 3 output of OS3 is applied as clock 2 to the shift register. Clock 2 functions as a strobe to lock the data into the shift register during the enable interval afforded by the MODE output pulse generated by one shot 2.

During the DATA ENABLE GATE from OS2, gate 344 also sets flip-flop stage 345 in accordance with the setting of stage 343. The CLEAR STROBE output of OS4 enables the output gating stage 346 to produce, through inverter 348, the output GSET. GSET thus is generated when the decision is to record an INDEX word. Correspondingly, the output of NAND gate 344b during the DATA ENABLE GATE is supplied to line 352 through inverter 354 to enable the gating circuit 330 to gate through the index number of generator 320. The output of NAND gate 346b also functions, through line 353, to advance the index number generator 320. If, however, a control word is being processed and thus the DSET input is received, the GWORD output, derived from NAND gate 344a through inverter 349, is produced and corresponding, through line 351 and inverter 355, the gate circuit 330 is enabled to gate through the dial setting rather than the counter setting. The output of NAND gate 346b now is logic 0 and thus does not advance the count of the index number generator 320. The pre-existing count in the generator 320 is thus retained when a control word is recorded on the tape at a periodic interval. That retained number is then recorded and the count of the generator 320 advanced, in recording the next index word.

The record logic of FIG. 10 is now considered. The sequential control logic provides the inputs F3, present during the record states, as well as PSTOP, the state required for entering the RECORD mode, and RANS, RSTOP, and RECORD. The record/gate logic generates the GWORD, GSET, D/C1U, and D/C2U inputs. ANSA, ANSB, and ANSC are derived directly by actuation of the corresponding buttons, the control inputs however being supplied through no bounce-one shot circuits in the play logic. BRBRANCH, BRVISUAL, BQSTART, BRSTOP, BEND, and BEDIT are derived from the corresponding buttons and supplied to no bounce-one shot circuits, as shown. In each instance, these circuits eliminate any transients resultant from button actuation. It should be noted that the record buttons are normally closed and the play buttons are normally open switches, and thus actuation of a button produces as a control input the logic states indicated. The play logic also generates EDANS' during the EDIT substate for recording answers.

A major function of the record logic is to identify receipt of a control input and to produce the output DSET identifying that a control word is to be recorded. DATA WORD flip-flop 370 is set under these conditions through gating circuits receiving the control inputs, for producing, through inverter 371, the DSET output. PSTOP, through inverters 374, 376, and 378, or GSET, through inverter 380, initially resets the DATA WORD flip-flop 370. Setting of flip-flop 370 is controlled by the output of NAND gate 382, in turn responsive to NAND gate 384 and to the output of combinational logic 386. NAND gate 384 functions as a logic OR, and thus produces an output to set flip-flop 370 when F3 is received, and thus during record operations. The other input of NAND gate 384 is connected to the reset output of EDIT flip-flop 390. Flip-flop 390 is set in response to BEDIT, through OS400, when PSTOP obtains through inverters 374 and 376, in accordance with the output of NAND gate 398 thereby produced. Note that EDIT flip-flop 390 is normally reset as a result of the initialize circuit 396, through NAND gate 394 which functions as a logic OR, and inverter 392.

NAND gate 382 receives the output of NAND gate 384 and also the output of logic circuit 386, the latter generating a strobe output signal in response to any of the control inputs commanding recording of a control word. Thus, when either F3 is true or when in the EDIT substate, the DATA WORD flip-flop 370 is set when a control input requiring recording of a control word is received, and as a result, the strobe from logic circuit 386 is received. The reset output of the DATA WORD flip-flop 370 thus provides, through inverter 371, the DSET output. In EDIT, and thus when both flip-flops 370 and 390 are set, NAND gate 402 is enabled; NAND gate 404, providing a logic OR function, thus produces RECORD' as an output. NAND gate 404 also produces RECORD' in response to BRECORD, independently of NAND gate 402, since it performs a logic OR function, as noted.

The EDIT output is produced through inverter 406 from the reset output of EDIT flip-flop 390, when the latter is set. Generation of PSTOPR' as a record logic output results from NAND gates 408, 410, and inverter 412. NAND gate 408 operates as a logic OR to the reset state of EDIT flip-flop 390, as well as to the reset state of the RSTOP flip-flop 420. NAND gate 410 operates as a logic AND to the output of NAND gate 408 and the signal GSET, generated by decision logic circuit 340, to produce, through inverter 412, PSTOPR' which places the machine in PSTOP. The GSET signal, during EDIT, thus results in the PSTOPR' output and, through the sequential control logic the PSTOP state.

From FIG. 9, it will be recalled that GSET is generated in response to recording of any control word. From the timing circuit 300 and associated one shots, cooperating with the decision logic 340 in the record/gate logic circuit of FIG. 9, it will also be recalled that OS3 gated the data into the shift register a few milliseconds following the leading edge of the output of OS1, defining the beginning of the noted timing interval between the one and two second time positions. The GSET signal, however, is generated at the end of that one second timing interval. Thus, a substantial portion of a full second is afforded for serial read out of the shift register and recording of the control word on the tape. Thus, the entire recording function for a control word comprises a one second start up time to assure proper tape speed for recording, and one second for a recording interval at the end of which GSET is generated and the system placed in the PSTOP state for subsequent operations.

The RSTOP flip-flop 420 is reset by PSTOP, received through inverters 374, 376, and 378a, and is set by the output of NAND gate 422, the latter receiving the RSTOP input through two series inverters 485 and 486 in the logic circuit 386, as well as the output of NAND gate 424. NAND gate 424 operates as a logic OR to the outputs of one shot circuits 426 and 428 and their respectively associated inverters 427 and 429, the one shots 426 and 428 respectively responding to BRSTOP and BEND. These inputs respectively represent the actuation of the RSTOP button in the RECORD state and the actuation of the END button during the RANS state, the two controls for recording a STOP word as hereinbefore discussed.

The outputs of one shots 426 and 428 are also applied to respectively associated NAND gates 430 and 432 which receive in common the EDIT substate from the reset output terminal of EDIT flip-flop 390 and produce, through associated inverters 431 and 433, the RSTOP' and END' outputs. Thus, in EDIT, RSTOP', and END' are produced, but are gated out in the EDIT substate.

It will be recalled, of course, that the recording of a STOP word is prevented in the RANS state, and that the END button was provided for recording a STOP word during RANS, at the end of the answer segment. Hence, the separate controls RSTOP' and END'. These signals are supplied to the sequential control logic and, if accepted thereby, result in the RSTOP input to the RECORD logic. Similarly, RECORD', if accepted, results in the input RECORD to the record logic from the sequential control logic.

The encoding and general format of the control words and the processing of the data bits thereof by the record logic is now considered. Again, it will be recalled that data is entered in parallel into the shift register. As later detailed, the shift register comprises twenty stages for storage of a corresponding twenty data bits. From FIG. 5B, it will be recalled that the first three bits are encoded in binary to distinguish the digital word as an INDEX word or as a specific one of the control words. Where an answer control word [ANS(X)] is recorded, the next two bit positions are utilized in a two bit binary code to identify the specific answer as one of A through D. These two bits may be the two least significant of a total of fourteen bit positions normally used to identify an index number to be recorded. These two bits thus are automatically processed in the record logic through special gating circuits to be described.

Referring now specifically to FIG. 10, the D/C1U and D/C2U inputs are supplied through inverters 440 and 441 to output NAND gates 442 and 443, respectively. Gates 442 and 443 are enabled by the GWORD input through inverter 444. GWORD, when false, identifies the recording of an INDEX word, and through inverter 444, gates the two index number bit positions D1U and D2U through NAND gates 442 and 443.

When a control word is recorded, GWORD is true and thus gates 442 and 443 are disabled. Bit positions D1U and D2U are thus available for use in conjunction with a control word as above specified. Thus, for example, ANS(A), ANS(B), and ANS(C) are encoded by encoder 450 to a two bit code (normally identifying ANS(D) in the absence of any of the other three) on lines 451 and 452, applied to the quad latching circuit 454. GWORD, now true, for recording of a control word, enables NAND gates 456 and 458 to gate this two bit binary answer code through as the D1U and D2U outputs.

The third operation in relation to D/C1U and D/C2U is that in which those bit positions may be employed in conjunction with the control words including an index number, such as BRANCH and VISUAL. Thus, NAND gate 460 responds to the BRBRANCH and BRVISUAL inputs to enable NAND gates 462 and 464 in combination when either of these inputs is received. The outputs of these gates are normally logic 1, as are the outputs of the encoder 450, a logic 0 from the outputs of any thereof, however, controlling the logic state of the lines 451 and 452. Thus, the data bits for the bit positions D/C1U and D/C2U are gated through NAND gates 462 and 464 when either of BRBRANCH and BRVISUAL is received to be set into the quad latch circuit 454 and gated through to the output by GWORD as aforedescribed.

The generation of the three bits CONTW1, CONTW2, and CONTW3 for defining a control word is now considered. These outputs are obtained from gates 471, 472, and 473, respectively, which receive corresponding outputs of quad latch circuit 470 and GWORD signal. Since GWORD is logic 0 for the INDEX state, these gates are normally disabled, producing logic 1 outputs for the noted output signals. Thus, the INDEX control word is defined as 111.

In response to any of the inputs from BRBRANCH through BEND and with certain conditions satisfied, as hereafter explained, logic circuit 386 produces a strobe pulse on output line 480. As above noted, the strobe pulse identifies the receipt of a signal identifying a control word to be recorded on the tape, and is applied through NAND gate 382 to set the DATA WORD flip-flop 370 to identify this condition. In general, these same inputs are provided through encoding circuit 490 which produces a three bit binary code, supplied to the quad latch circuit 470, for storing therein the binary code of the control word to be recorded. Again, that binary code is gated through NAND gates 471, 472, and 473 by GWORD to produce CONTW1, CONTW2, and CONTW3.

The circuitry and operation of the logic circuit 386 is apparent and its operation readily understood. Detailed discussion thereof is limited to a few of the associated elements. NAND gate 481 is enabled from the output of EDIT flip-flop 390 during the EDIT substate, and by the output of NAND gate 424 to gate through a command to record a STOP word in the EDIT substate. This indication is supplied to a common junction 485, to which the RSTOP input also applied through inverter 484. In addition, the signal at junction 485 is applied through inverter 486 to junction 487 and, in turn, through line 488 to the encoder 490 and also to the input of NAND gate 422 associated with the RSTOP flip-flop 420 for setting the latter.

The NAND gate 482 receives the RECORD input through inverter 489 and the EDIT output of the EDIT flip-flop 390 to produce an enabling input to NAND gate 483 when the system is in either the EDIT or the RECORD states. NAND gate 483 also receives BQSTART and thus is enabled for the recording of a QSTART control word, only when the system is either in the EDIT or the RECORD states.

The logic gating for the encoding functions of the encoder 490 is clearly shown and further description thereof is not deemed necessary. The encoding performed thereby is in accord with the illustrative table of FIG. 5B.

Figure 11A:
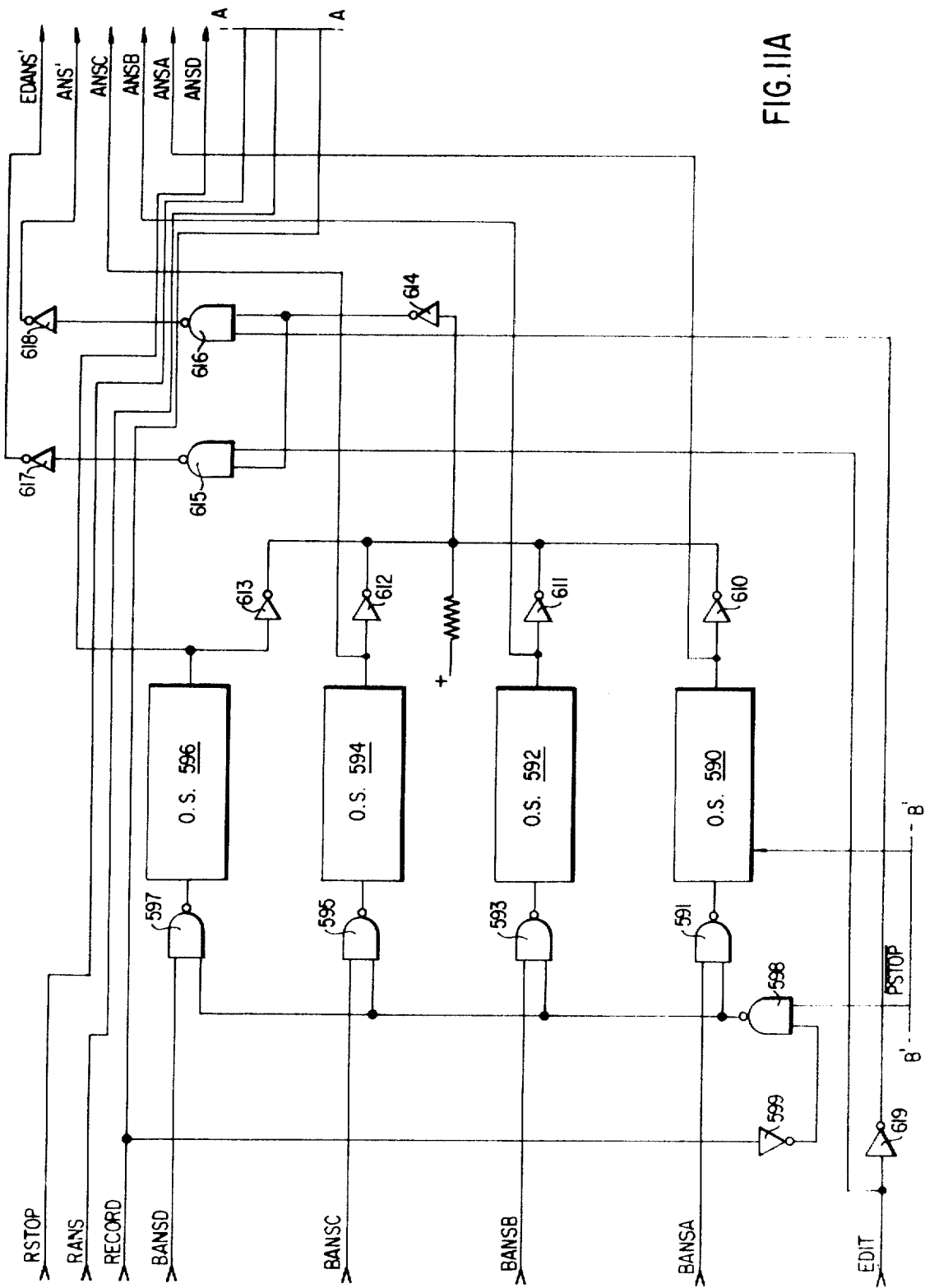
FIG. 11 comprises a detailed logic diagram of the play logic portion of the system of the invention and is shown in portions in FIGS. 11A through 11D.
Figure 11D:
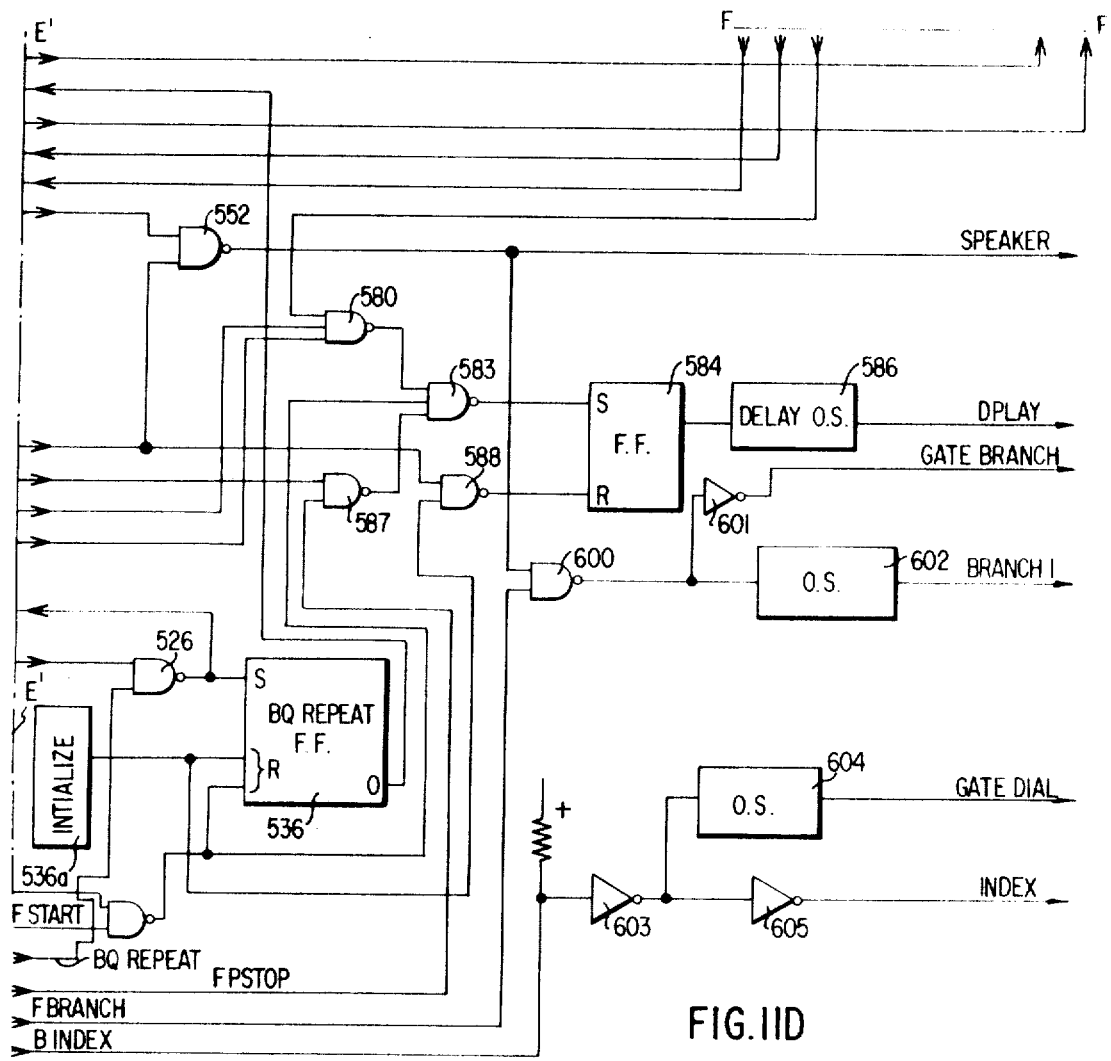

PLAY LOGIC — FIG. 11:

The play logic of FIG. 11 provides for various of the internal system controls as well as the controls for reproduction of stored information in accordance with the program and as a function of the student responses to the questions posed by the program. Play logic also provides for the generation of the motor drive signals represented as the outputs FF for fast forward, DR for normal drive, and FR for fast reverse, audio reproduction being cut off during FF and FR. In conjunction with the output DR, play logic provides the SPEAKER output enabling audio reproduction.

These various control functions of the play logic are generated in response to inputs from a variety of the other portions of the system. Particularly, play logic is responsive to inputs identifying the state of the system from sequential control logic and including RSTOP, RANS, RECORD, PSTOP, PLAY, INDEX, and PANS. Since the play logic is directly responsive to control words read from the tape, the outputs from the shift register logic. FANS, FEXOR, FSTART, FPSTOP, and FBRANCH are also applied as inputs to the play logic. The gate comparator, to be discussed, supplies the inputs FFR, FFF, and FDR to the play logic in accordance with comparison functions as a result of which normal drive, fast forward, and fast reverse drive are to be generated; as noted, play logic provides the output controls for the drive functions.

The remaining inputs to the play logic are generated directly by actuation of buttons and particularly include BANSA, BANSB, BANSC, and BANSD responsive to actuation of the corresponding buttons A through D in the PSTOP mode, the control functions BFF and BFR responsive to actuation of the buttons for effecting fast forward and fast reverse tape drives, respectively, and BQREPEAT responsive to actuation of the QREPEAT button for enabling the repeating of a series of multiple choice questions presented to the student prior to making an answer selection.

In conjunction with the motor drive controls, play logic also provides for control functions relating to data processing and thus generates SERBL which effects serial blanking of data read from the tape during start up of the tape from a STOP condition. Similarly, play logic generates SERIN when no motor drive signal has been generated. SERIN is processed in parallel with the inputs to the shift register to effectively blank out any extraneous signals which may erroneously appear as information and be entered into the shift register during the interval in which the tape is slowed to a STOP condition. DPLAY' is supplied to the sequential control logic which, in turn, generates the PLAY state. The PLAY state then is supplied by the sequential control logic to the input of the play logic. BRANCH' and INDEX' are also supplied from the play logic to the sequential control logic which establishes the corresponding states. GATE BRANCH and GATE DIAL are supplied to the gate/comparator logic for gating through the index number of a dial setting during actuation of the BINDEX button, or gating through an index number contained within a control word read from the tape for a BRANCH operation, respectively.

Play functions are discussed in order of PSTOP, PLAY, PANS, and INDEX. PSTOP is used primarily to initialize or reset the various play functions. The PSTOP input to the play logic is derived from the sequential control logic and is applied to inverters 500 and 502 to supply PSTOP to NAND gates 504, 506, 530, 532, and inverter 534. The outputs of gates 504 and 506 are applied directly to the reset inputs R of flip-flops 512 and 514. Gates 504 and 506 serve to inhibit the PSTOP input when the play logic is in the BQREPEAT substate as identified by the output of flip-flop 536, to be discussed later in detail.

Flip-flops 512 and 514 serve to generate the three motor drive signals of fast forward (FF), fast reverse (FR), and drive (DR) and the fourth state of STOP. Input gates 518, 520, 522, and 524 control setting and resetting of the flip-flops 512 and 514. The purpose of these gates is to ensure that commands can be entered into the flip-flops only when the one shots 508 and 510 are in their "up" or on states.

Specifically, the inputs to inverters 537 and 538 are OR'd in gate 539 to trigger the aforementioned one shots. The output of one shot 508 is used to enable NAND gates 518, 520, 522, and 524, permitting the inputs to these NANDs to appear appropriately at the inputs to flip-flops 512 and 514. It is seen then that data appearing on the inputs to these states will not enter and change the state of the flip-flops unless the one shot 508 has been triggered, ensuring that extraneous signals will not falsely set flip-flops 512 and 514.

The purpose of one shot 510 is to inhibit the combinational logic 516 from gating through the outputs of flip-flops 512 and 514, so that during a change of inputs to the flip-flops 512 and 514 there will not be erroneous outputs appearing as motor drive signals. As stated previously, the absence of signals FF, DR, and FR implies the STOP state which also obtains during the blanking period or gating out period of one shot 510. Further, it is seen that the outputs of one shots 508 and 510 are combined through inverters 540 and 541 to generate an input to inverter 542, resulting in SERBL signal.

The motor drive signals FF, FR, and DR as thus generated result from various input conditions and gating conditions now to be discussed. The PLAY state, derived from the sequential control logic, is inverted in inverter 543 and made an input to NAND gate 544, operating as a logic OR. The output of gate 544 appears then as an input to gate 520 and subsequently resets flip-flop 512. The output of gate 544 is also inverted in inverter 545 to appear as an input to NAND gate 546 also serving as a logic OR. The output of gate 546 then is an input to gate 522 which serves to set flip-flop 514, as well as to provide an input to inverter 537 which results in triggering of the one shots 508 and 510, as discussed before.

As also described previously, the setting of flip-flop 514 and resetting of flip-flop 512 result, subsequently, in establishing motor drive signal DR. Specifically, the output from combinational logic 516 is made an input to NAND gate 548 which functions as a logic OR, its output resulting in motor drive signal DR. Three other input signals are OR'd in inverter 548, resulting in motor drive signal DR as follows. The RECORD, RSTOP, and RANS inputs, derived from the sequential control logic, are inverted in inverters 549, 550, and 551, respectively, and supplied to gate 548.

The SPEAKER output results from the PLAY state input, supplied through inverter 543 to gate 552 serving as a logic OR, its output supplying signal SPEAKER directly. SPEAKER output also results from the PANS input from the sequential control logic supplied to NAND gates 553 and 554. These gates are enabled by the output of flip-flop 560, which it is recalled, is placed in its reset state through inverter 534 in response to the PSTOP input. The set state of flip-flop 560 is then passed by gate 553 to provide an input to gate 544, serving as a logic OR, the latter then supplying signals to inverter 545 and NAND gate 520 to reset flip-flop 512 and thereby produce the motor drive condition DR. The output of gate 553 is also provided as an input to gate 552, the latter serving as a logic OR, to produce the SPEAKER output.

Operation of the system in the PANS state is as follows. The RESET state of flip-flop 560 obtains until inputs result from the combination of signals FANS and FEXOR. These signals are derived from the shift register logic and result from control words being read from the tape. The logic condition of FANS true and FEXOR true simultaneously maintains the RESET state of flip-flop 560 as follows. FEXOR true is inverted in inverter 561 and again in inverter 562 to appear as a true input to gate 564. When FANS is also true, the logic 0 state is produced at the output of gate 564 and thus maintains a reset input to flip-flop 560.

When FANS is true and FEXOR is not true, the following logic condition obtains. The output of inverter 561 becomes logic 1, and the output of inverter 562 is logic 0, and FANS produces a logic 1 input to gates 563 and 564. The outputs of these NAND gates thus is a logic 0 for the SET input to flip-flop 560 and a logic 1 for the RESET input to flip-flop 560. This results in a change of state of flip-flop 560 such that the SET state, now being logic 1, is passed by gate 554 resulting in an input to gate 556, serving as a logic OR. The output of gate 556 is applied to inverter 557 and in turn to gate 558, also serving as a logic OR. The output of gate 558 then provides an input to gate 518, the output of which sets flip-flop 512. The output of gate 556 also provides an input to gate 524, serving to reset flip-flop 514. These states of flip-flops 512 and 514 result in the subsequent generation of motor drive signal FF. This is accomplished by combinational logic 516, the output of which provides an input to gate 566, the latter serving as a logic OR and producing FF directly from its output. It is seen then that the combination of signals FANS and FEXOR serve to set and reset flip-flop 560, resulting in the establishment of motor drive signals DR or FF, accordingly. Note also that signal SPEAKER obtains only when signal DR has been established through the aforediscussed logic.

The INDEX state input, derived from the sequential control logic, is inverted in inverter 568 and supplied as an input to one shot 574 which performs a holding function to maintain the INDEX state in its logic 0 condition for a specified period of milliseconds. This state is then an input to inverter 569 which provides its output to gate 570 serving as a logic NAND, NAND gate 576 also serving as a logic NAND. Two others inputs are required for gate 570. These are signal FFF derived from the shift register logic and the output of inverter 578, which receives as its input the state of combinational logic 516 corresponding to the FF condition. Gate 576 is receiving as two more of its inputs, signal FFR derived from the shift register logic and the output of inverter 577 which is receiving as its input the output of combinational logic 516 corresponding to the FR condition.

Establishing of the various motor drive signals proceeds as follows, whenever the INDEX state is established. It is recalled that a logic 1 for INDEX state results in the triggering of one shot 574. The inverted, or logic 0, output of the one shot 574 serves as an input to gate 556 which is performing a logic OR function. The output of gate 556 then provides an input to gate 524 resulting in the reset of flip-flop 514, and also provides an input to inverter 557 which supplies an input to gate 558, serving as a logic OR. Gate 558 thus supplies an input to gate 518, resulting in the setting of flip-flop 512. The setting of flip-flop 512 and the reset of flip-flop 514 result subsequently in the establishment of motor drive signal FF. This state of the play logic, when in INDEX, obtains until signal FFF is received from the shift register logic.

It will be shown subsequently that signal FFF results from a comparison of digital words on tape, such that A>B obtains, and therefore it is desired to stop tape motion and command fast reverse. As discussed previously, the presence of the three inputs INDEX, FFF, and the logic 1 output of inverter 578 are sufficient to establish setting of flip-flop 514. Setting of flip-flop 514, in combination with the setting of flip-flop 512, results in the generation of the motor drive signal FR. This state of the play logic, when in INDEX, thus obtains until signal FFR is received as derived from shift register logic.

The condition FFR results from a comparison of digital words such that A<B is satisfied and tape motion then is to be stopped and a drive command issued. Recalling the inputs to gate 576, that is, FFR, INDEX, and the output of inverter 577, the gate 576 then issues the proper signal to result in resetting of lip-flop 512 and the subsequent generation of motor drive signal DR. This state of the play logic obtains when in INDEX until signal FDR is received from the shift register logic.

Signal FDR results from the comparison of digital word A=B being satisfied, and corresponding to the tape being located precisely at the index word sought. Signal FDR provides an input to gate 580, serving as a logic NAND, and having two other inputs, that is, INDEX and the output of inverter 581. The output of gate 580 then provides an input to the DPLAY circuitry to be discussed subsequently. It is noted that in the INDEX state, the generation of motor drive signal DR does not enable the logic for producing the SPEAKER output, since no audio playback is to be performed in the INDEX mode. Also note the sequential functioning performed by inverters 577, 578, and 581 in accomplishing the proper sequencing of motor drive signals when in INDEX state, i.e., the procedure is always followed of fast forward, fast reverse, drive, and then play.

Motor drive signals FF and FR may also be generated with direct button input as follows. The BFF input is supplied to gate 530, serving as a logic NAND. Gate 530 also receives as inputs the condition PSTOP and the output of inverter 579, which has as its input signal EOT (end of tape). If PSTOP and END OF TAPE are both not true, and BFF is true, then the output of gate 530 supplies an input to gate 566, serving as a logic OR, to establish the motor drive signal FF. Gate 532, however, receives as inputs BFF, PSTOP, and the complement of EOT from inverter 579. The output of gate 532 then supplies an input to gate 584, serving as a logic OR, and thus producing the motor drive signal FR. Note, therefore, that the system must be in the PSTOP state without an EOT (end of tape) signal in order to enable fast forward or fast reverse tape drive in response to actuation of buttons FF and FR, and thus the control inputs BFF and BFR.

As discussed previously, logic control are provided to prevent a student from attempting to avoid the programmed sequence of instruction on tape. The circuit which requires selection of an answer word rather than some other mode of operation is formed from gates 585a and 585b. Gate 585b, when receiving inputs FANS and the true state of PLAY, is enabled and provides an input to one shot 590, to be discussed presently.

Operation of the QUESTION REPEAT substate proceeds as follows. Flip-flop 536 is initially reset through the initialize circuit 536a corresponding to turn-on of the system. As noted, the reset state of flip-flop 536 enables gates 504 and 506 so that reset of the motor drive circuitry is effected when signal PSTOP is true. Flip-flop 536 is then set under the conditions that the system is in PSTOP and signal BQREPEAT is present. These signals provide an input to gate 526 which sets flip-flop 536 and also supplies an input to gate 572, serving as a logic OR. The output of gate 572 is then inverted in inverter 573, providing an input to gate 546 which subsequently sets the motor drive flip-flops 512 and 514 to issue the fast reverse motor drive signal FR as discussed previously. This condition obtains in the play logic when in the PSTOP state, until signal FSTART is received from the shift register logic.

Signal FSTART results from the reading of a start word from tape when in the fast reverse motor drive condition. Gate 528 then receives as its inputs PSTOP and FSTART and resets flip-flop 536, returning it to its previous state, and also issues a signal to gate 583. Gate 583 serves as a logic OR, the output thus setting flip-flop 584 and its set output in turn providing an input to one shot 586 which issues the signal DPLAY'. In this manner, then, the system has been commanded to search for a QSTART word on the tape and, having found the word, the system is then placed in the PLAY mode to again play that section tape.

The generation of DPLAY' may also result from the issuance of signal FDR when in the INDEX state, as discussed previously. With FDR, INDEX, and DRIVE signals all true, gate 580 provides an input to gate 583, serving as a logic OR, which again is used as an input to flip-flop 584 and which in turn triggers one shot 586, resulting in issuance of signal DPLAY'.

DPLAY' also results from the logic condition of FPSTOP and PANS as follows. When in the PANS state, and when control word signal FPSTOP is read from the tape corresponding to a programmed STOP word, signal FPSTOP derived from the shift register logic is issued to gate 587. Gate 587, having its inputs FPSTOP and PANS both true, then issues a signal to gate 583, again serving a a logic OR, which in turn sets flip-flop 584. Flip-flop 584 then triggers one shot 586 to again issue signal DPLAY'.

In summary, DPLAY' results from three conditions in the system, namely, the completion of the INDEX seeking as indicated by issuance of signal FDR, the location of a QSTART position on the tape as indicated by signal FSTART when in the PSTOP state and the QREPEAT substate, and the issuance of signal FPSTOP when in PANS, the latter corresponding to the completion of an answer segment programmed on tape.

The operation of responding to branching commands on tape proceeds as follows. Signal FBRANCH derived from the shift register logic is issued to NAND gate 600. Gate 600 combines its inputs SPEAKER and FBRANCH in an AND function to trigger one shot 602. The output of one shot 602 then issues signal BRANCH' which is supplied as an input to the sequential logic control and which, in turn, establishes the INDEX state of the system. The output of gate 600, through inverter 601, also establishes the signal GATE BRANCH which is supplied as an input to the gate comparator logic to be discussed subsequently.

In a similar manner, index state of the system may be established in response to BINDEX under the following conditions. BINDEX provides an input to inverter 603. The output of inverter 603 triggers one shot 604 and provides an input to inverter 605. The output of one short 604 provides signal GATE DIAL which is supplied to the gate control logic, to be discussed. The output of inverter 605 provides signal INDEX' which is issued to the sequential control logic and which, in turn, establishes the INDEX state of the system.

The play logic also contains circuitry for generation of answer signals, ANSA, ANSB, ANSC, ANSD and related control signals as follows. One shots 590, 592, 594, and 596 receive as their inputs the outputs of gates 591, 593, 595, and 597, respectively. The aforementioned gates are enabled by the output of gate 598, serving as a logic OR. Gate 598 has as its input the conditions PSTOP and RECORD. This logic then provides a condition that gates 591, 593, 595, and 597 will be enabled whenever the system is either in PSTOP or RECORD states. It is seen then that signals BANSA, BANSB, BANSC, and BANSD trigger the appropriate one shots 590, 592, 594, and 596, respectively, to result in signals issued as ANSA, ANSB, ANSC, and ANSD. These signals then are supplied to the system, as required, to perform functions in both the PANS and RANS states.

The outputs of the one shots 590, 592, 594, and 596 are NOR'd through inverters 610, 611, 612, and 613 and inverted through inverter 614 to supply an input to gates 615 and 616. These gates serve to issue either ANS' or EDANS' according to the state of signal EDIT. Signal EDIT is supplied directly to gate 615 and through inverter 619 to gate 616. The output of gate 615 is inverted by inverter 617 to result in signal EDANS'. The output of gate 616 is inverted by inverter 618 to result in signal ANS'.

It is seen then, that signals ANS', EDANS', and ANSA through ANSD are issued by the logic AND'ing of the input signals BANSA through BANSD and the state of the machine as either in PSTOP or RECORD. Further, the logic state of EDIT determines whether a logic signal ANS' or EDANS' will be issued. The use of these signals, that is, ANS' and EDANS' has been discussed previously in connection with the record functions.

SHIFT REGISTER LOGIC — FIG. 12:

The operations involving the states of PLAY, PANS, and INDEX involve the generation of signals from the shift register logic. The shift register is the primary interface between the modem and the system electronics, and the modem, of course, is the primary interface between the tape itself and the digital electronics. The shift register interprets the 1's and 0's in serial form, as read from the tape and as supplied as an output from the modem. The usual shift register word format is a twenty bit word. The word is described elsewhere as being composed of two control bits at bit positions 1 and 20, three control bits called CONTW1, CONTW2, and CONTW3, and fifteen remaining bit places to be used in INDEX words and ANSWER words or other logic functions. The information of these words has been discussed previously in the record logic. The important features of the shift register are that it receives data in serial format and provides a parallel output of the state of its twenty bits.

As to the receipt of data in a serial format, whenever logic 1 is received at positions CB1 and CB2 of the shift register 650, these signals are supplied as inputs to gate 671. The output of gate 671 triggers one shot 670 to issue signal DCB which is applied an an input to gates 672 and 674, as well as comprising an output of the system.

Shift register positions 2, 3, and 4, indicated as signals CW1, CW2, and CW3, respectively, are supplied as inputs to a combinational logic circuit, resulting in a number of control words formed in the following way. The true outputs CW1, CW2, and CW3 as well as their inverted outputs from inverters 698, 699, and 700, are supplied to the four input NAND gates 680, 682, 684, 686, 688, 690, and 692. Gates 680 through 688 are enabled by DCB when generated, and FR. Signal FR, derived from the play logic, is inverted in inverter 698 and provided as an input to gate 672 directly and, through inverter 673, as an inverted input to gate 674. The output of gate 672 is inverted through inverter 675 and used to gate the aforementioned four input NAND's. The output of gate 674 is inverted through inverter 676 to enable the remaining four input NAND gates 690 and 692. Thus, it can be seen that one or the other groupings of the four input NAND's will be enabled, depending upon whether FR is true or not true. Also, it is required that the control bit signal DCB be true, as issued by one shot 670, thus ensuring that the output of the combinational logic corresponds to only twenty bit words correctly filling shift register 650.

The following logic conditions result from states of CW1, CW2, and CW3 and, of course, the true state of signal DCB. Signal FBRANCH, an output of inverter 681, results from the true state of CW1, the true state of CW2, and the inverted state of CW3. Signal FANS, from inverter 683, results from the true states of CW1 and the inverted states of CW2 and CW3. Signal FPSTOP, from inverter 685, results from the inverted states of CW1, CW2, and the true state of CW3. Signal FVISUAL, from inverter 687, results from the true states of CW1, the inverted state of CW2, and the true state of CW3. Signal FINDEX, from gate 689, results from either the true states of CW1, CW2, and CW3 when FR is not true, as described previously, and the presence of signal DCB. Gate 689, serving as a logic OR gate, accepts the output from either gate 688 or gate 690 to form signal FINDEX. The above signals then result from tape motion in the forward direction implying that FR is not true, and this includes both motor drive DR and FF.

In the reverse tape drive direction, and thus when FR is true, gates 690 and 692 are enabled as described previously. FINDEX again is generated when in this case shift register outputs A13, A14, and A15 are all true, and the proper coincidence of signal DCB has occurred. The output of gate 690 then provides an input to gate 689, serving as a logic OR. Signal FSTART, inverted through inverter 694, results from the true states of shift register outputs A13, A14, and inverted output A15. Again, it is required that both DCB and FR be true to enable gates 690 and 692. Shift register output CB2 is also designated as signal SER OUT and is used in the recording modes of the system as an input to the modem. The remaining shift register outputs labelled A3 through A15 are not spedifically employed further in this system for any control function but are made available, in particular to the gate comparator logic, for further processing.

The nature of shift register 650 is such that it can receive binary data serially, as indicated by signal line SERIN, and the data appearing on SERIN, that is, logic 1 or 0 states, are clocked through the shift register in the usual fashion by signal line labelled CLOCK 1. At all times then, the state of the shift register is provided in parallel outputs on lines labelled CB1, CW1, CW2, CW3, A1 through A15, and CB2 or SER OUT.

Data may also be inserted into the shift register in a parallel manner, as now described. For the serial input, the signal line MODE was held at a logic 0. However, when data is to be entered into the shift registers in parallel, signal line MODE is raised to a logic 1. In this condition of the shift register, data appearing on input lines labelled CONTW1, CONTW2, and CONTW3 and D1U through D15U is allowed to enter the shift register and, with the presence of signal CLOCK 2, is then stored in the shift register. Note that parallel inputs to the shift register corresponding to the first and last bit places are maintained at a logic 1 input by parts 651 and 652. This ensures that logic 1 for the control bit positions will obtain for every word loaded into the shift register in parallel. The data thus loaded in parallel into the shift registers may then be clocked out serially with CLOCK 1 appearing on signal line SER OUT, as discussed previously.

One shot 702 is employed to control the input to the shift register during conditions of tape start up and tape slow down corresponding to, in the first case, the establishment of a motor drive signal and in the second case, the establishment of the motor stop condition. This ensures that no extraneous bit data can enter the shift register.

Signal line SERIN presents the serial data to the shift register and, in particular, is derived from modem output. Under control of SERBL (serial blank) inverters 701 and 703, the latter responsive to one shot 702, serve to clamp the input of the shift register to a logic 0 when SERBL is true and when one shot 702 is timing up. From the figure, it is seen that SERBL is an input to inverter 701 as well as an input to one shot 702, the input of one shot 702 then being an input to inverter 703. Recall that an additional inverter in the play logic also was employed to effect serial blanking from the motor control logic.

Another function performed in the shift register logic is that of comparing a selected answer with answer words appearing on tape. Thus, the inputs ANSA, ANSB, ANSC, and ANSD are supplied to encoder 654, which correspondingly controls setting and resetting of the flip-flops 656 and 658. The states of flip-flops 656 and 658 are then compared with shift register outputs A1 and A2 in exclusive OR circuit 660. The logic of the exclusive OR is such that an output FEXOR will be issued only when there is perfect comparison of the bits so stored in flip-flops 656 and 658 and the logic condition of the shift register at locations A1 and A2. Signal FEXOR is then supplied to the play logic for operation in PANS mode as discussed previously.

Signal FANCH from inverter 697 is formed by the NAND gate 696 in response to its inputs FEXOR and FANS. Therefore, FANCH will be true when the correct answer has been selected by the operator in the PLAY mode and may be used for external information.

GATE COMPARATOR LOGIC — FIG. 13:

The function of the gate comparator logic is to compare the data, appearing in words at the output of the shift register, with data selected with the thumb wheel index dial. Gating logic 750 accepts inputs A1 through A12 and D1 through D12. Gating is accomplished through a logic 1 appearing on one of the three lines REVERSE, GATE DIAL, and FORWARD. When one of these lines is raised to a logic 1, the outputs of gating logic 750, comprising the signals AD1 to AD12, correspond to the input conditions either in A1 through A12 or D1 through D12. Signals AD1 through AD12 are then presented to a comparator to be discussed subsequently.

The conditions for establishing logic 1 for the gating signals REVERSE, GATE DIAL, or FORWARD are as follows. Signal FR, derived from the play logic, is inverted both through inverter 758 and applied as an input to gate 753, and through inverter 757 and applied as an input to gate 751. Signal GATE DIAL, also derived from the play logic, is inverted through inverter 756 and made an input to gate 753 and gate 751, as well as inverter 754. The states of FR and GATE DIAL are presented in three of the four possible binary combinations, that is FR and GATE DIAL; FR and GATE DIAL; and FR and GATE DIAL. The fourth state of FR and GATE DIAL both true does not occur in the system, as understood by the play logic.

For the condition of FR not true and GATE DIAL not true, it is seen that both inputs to gate 753 are true; therefore, its output as a NAND will be a logic 0 and, as an input to inverter 755, the output for GATE FORWARD gating will be at a logic 1. Also, it follows that with a GATE input, the output of inverter 756 will be a logic 1 as applied to inverter 754 and which in turn will produce a logic 0 output forming GATE DIAL. Also, gate 751 will have both inputs true; therefore, its output is a logic 1 as supplied to inverter 752, the inverter output then being a logic 0 for GATE REVERSE.

Continuing for FR and GATE DIAL, it is seen that gate 751 will then supply a logic 0 output to inverter 752 such that the inverter output will now produce a logic 1 for GATE REVERSE; also, then GATE FORWARD and GATE DIAL will both be at logic 0.

For the third condition then, FR and GATE DIAL, it is seen that the input to inverter 754 will be a logic 0 so that its output is a logic 1, enabling GATE DIAL. Similarly, the GATE REVERSE and GATE FORWARD will be at a logic 0. Thus, by the states of FR and GATE DIAL, data A1 through A12 appears at the output in a one to one correspondence for FORWARD gating, and A1 through A12 appears in reverse sequence at the output of gate 750 for REVERSE gating, and dial or D1 through D12 inputs appear on the outputs AD1 through AD12 for GATE DIAL gating. Note also that with GATE DIAL true, through inverter 756, inverter 754 provides an input to inverter 759 such that its output will be a logic 0. Similarly, signal GATE BRANCH, when true as applied to inverter 760, also produces a logic 0 at its output. The outputs of inverters 759 and 760 then provide an input to one shot 766.

It is seen that the gating outputs from gate 750, signals AD1 through AD12, are provided as inputs to both a twelve bit latch 762 and a twelve bit comparator 764. Data appearing at the input to the twelve bit latch is strobed into the latch as the result of the output from one shot 766. The timing of one shot 766 was described in the previous paragraph as resulting from the signals GATE BRANCH and GATE DIAL. It is seen then, that with proper strobing, the signals appearing on AD1 through AD12 at one time are stored in the twelve bit latch and, at another time, made available with different data to the twelve bit comparator.

The twelve bit comparator 764 then compares the previous data stored in the twelve bit latch with the present data appearing at the output of gate 750. The twelve bit comparator 764 in the usual manner then determines whether the output of the twelve bit latch and the present output of the gate 750 is a comparison of less than, equal to, or greater than. The comparison output is made an input to gates 768, 770, and 772 which are gated with FINDEX derived from the shift register logic. Gating with FINDEX ensures then that the output of gates 768, 770, and 772 will e properly timed with the data appearing in the shift register and the data to be compared in the logic of gate comparator.

Also provided in the gate/comparator is logic for producing the signals A =B, A   B, and A   B, Signal A=B appearing at the output of inverter 769 results directly from the output of gate 768 through inverter 769. Signal A   B resulting at the output of gate 771 results from combining of the outputs of gates 768, 770, and one shot 774 in gate 771, serving as a logic OR. Signal A   B is formed by combining the output of gates 768, 772, and one shot 774 in gate 773, serving as a logic OR. Note that one shot 774 is triggered by signal EOT derived from the system and provides an inverted output. That is, for EOT, the output of one shot 774 is a logic 1 and for EOT true, one shot 774 will issue a logic 0 pulse, returning then to its normal state of the logic 1 output. The result of this operation, if occurring in the end of tape (EOT) function, is that both an A   B and an A   B signal will be issued, irrespective of particular output of the comparator at the moment. The signals FFR and FFF under the conditions of an END OF TAPE signal are then presented to the play logic for motor control as explained previously.

MODEM LOGIC:

The modem logic provides the functions of encoding digital information for recording on magnetic tape, and the decoding of information derived from magnetic tape into digital or binary form. The modem employed in the system comprises two basic portions. One portion relates to the encoding functions and the other portion, to the decoding functions. Common to these two elements is a clock generator 800.

The clock generator 800, deriving 60 Hz sine wave voltage from the system power supply, forms a 60 Hz square wave. Each pulse is of narrow width, typically of 100 microseconds duration, such that the output of the clock generator is normally at logic 1 with the clock pulse appearing as a logic 0. This is to be understood as a negative going clock pulse.

The encoding circuitry responds to the input signal SER OUT derived from the shift register logic and, in particular, from the output of the shift register, and the clock pulse train output from the clock generator 800 to produce the output signal RA. Signal RA thus is an analog signal suitable for application to the recording head of the tape system for recording a signal on the tape, RA being encoded in accordance with logic 1 and 0 bits.

The encoding operation in producing RA proceeds as follows. Flip-flop 802 is set in response to each clock pulse from generator 800, whereby its output state from its set terminal is raised to a logic 1 for input to gate 807. Gate 807 also receives input signal F3, derived from the sequential control logic and corresponding to the system being in a recording mode. Thus, when F3 is true, the output of gate 807 becomes logic 0 for each clock pulse, and thus switches between logic 0 and logic 1 at the clock pulse rate.

The logic 1 output of gate 807 is used to reset multivibrator 806 and operates through inverter 805 to inhibit the output of multivibrator 806. When a logic 0 obtains at the output of gate 807, the output of inverter 805 is then at a logic 1, enabling the multivibrator 806 to oscillate. The oscillation frequency is illustratively 500 Hz and provides an alternating waveform of logic 1 and logic 0 of equal periods as an input to inverter 804.

The outputs of inverter 804, from multivibrator 806, and of inverter 803 from the flip-flop 802 provide the cyclical waveform RA required by a tape recorder. The purpose of inverter 803 is explained as follows. Recall that in the RECORD mode, flip-flop 802 is set in response to each clock pulse such that its reset output is at a logic 0. The logic 0 output, when applied as an input to inverter 803, raises the output thereof to a logic 1. Under these circumstances, the output of inverter 804 will then oscillate between zero volts, corresponding to the voltage level of logic 0 and the maximum voltage of the power supply, corresponding to the voltage level of logic 1. When flip-flop 802 is in its reset state, however, the input to inverter 803 is a logic 1 such that its output is a logic 0. Under these conditions, the output of inverter 804 cannot exceed a voltage level equal to one-half of the power supply voltage, as a result of the voltage divider network including the resistors 803a and 803b, which are of equal value. As will be described, under these conditions, the multivibrator 806 is in its off, or disabled, state, and no signal is presented to inverter 804, its input therefore being maintained at logic 0. Therefore, the voltage level of signal RA is midway between the power supply voltage level and zero voltage. The resultant waveform of RA, shown adjacent its output line, is particularly desirable for recording on magnetic tape.

The determination of the number of cycles to be generated each time multivibrator 806 is enabled is made by four bit counter 808 in conjunction with the state of the SER OUT input to inverter 818 and the combinational logic associated with gates 814 and 816. The procedure is as follows. The output of the multivibrator 806 is supplied as an input to the four bit counter 808 and also to gates 814 and 816. In normal fashion, the four bit counter 808 divides the input waveform by two, four, eight, and sixteen. These output states of the four bit counter 808 are provided to the gates 814 and 816, in one case through inverter 815, and the other case directly without inversion. In addition, the logic condition of the input SER OUT, whether logic 1 or logic 0, is also presented to the gates 814 and 816 through inverters 818 and 817. Thus, a logic 1 condition of SER OUT presents logic 0 at the input to gate 816 and logic 1 at the input to gate 814. The opposite logic inputs to gates 814 and 816 obtain for SER OUT at a value of logic 0.

Thus, it is possible to generate any desired number of cycles, of from one to sixteen, and to select first and second such numbers of cycles in generating the output RA in accordance with the state of input signal SER OUT comprising either logic 1 or a logic 0. Illustratively, and as employed herein, for SER OUT at logic 0, two cycles of multivibrator 806 are generated and, at logic 1, four cycles of multivibrator 806 are generated.

The outputs of gate 814 and gate 816 are supplied to gate 820, serving as a logic OR, such that when either of gates 814 and 816 produces a logic 0, the output of gate 820 is raised to logic 1. This condition suffices to set one shot 810 in preparation for triggering when the output of gate 820 returns to logic 0. When this occurs, one shot 810 is triggered, issuing an output to a second one shot 812. The purpose of the two one shots in series is to provide the correct time delay for proper forming of the waveform output RA. One shot 812, when triggered, issues at its output a negative going pulse which resets flip-flop 802 and, through inverter 813, resets four bit counter 808 to its initial 000 state.

Thus, each time the clock generator 800 issues a clock pulse, the multivibrator 806 is enabled. Its output cycles are counted by four bit counter 808 until the logic conditions at the inputs of gates 814 or 816 are satisfied, at which time, through gate 820, one shots 810 and 812 are triggered to reset the encoder to its initial starting state. At the output RA then, there are observed periodic groups of cyclic signal voltages of 500 Hz frequency; each such group occurs in time coincidence with the periods of the 60 Hz clock, and thus approximately every 17 milliseconds, and the number of cycles in each group corresponds to the current logic state of input signal SER OUT. For example, then, if SER OUT presents a sequence of logic 1 and 0 states, one would observe at the output RA a train of alternating groups of two cycle and four cycle voltage waveforms oscillating above and below a voltage level midway of system ground and the system power supply level, and wherein the alternating groups occur at a rate of 60 per second.

The decoding portion of the modem will now be described. As previously noted, a feature of the system of the invention is its capability to read digital words from the tape in both normal and high speed drive conditions. Accordingly, there is provided what is termed a dual speed demodulator which is selectively operable in the two different drive speeds to afford accurate reading of the cyclic signals from the tape. It will also be appreciated that the coding scheme in recording permits the reading to be performed regardless of the direction of tape transport. In addition, it will also be shown that the coding scheme affords an inherent clocking function for deriving a tape-generated clock pulse train during playback of the tape.

Cyclical information from the magnetic tape record is presented to the modem on the input signal line labelled TRACK 1. The dual speed demodulator comprises corresponding dual amplifier circuits respectively including transistors 840 and 834. In accordance with the two speed operation, therefore, in normal tape drive, one amplifier operates on the TRACK 1 information whereas in fast speed operation, that is, fast forward or fast reverse, the other amplifier operates on TRACK 1 information.

The selection of amplifiers 840 and 834 is determined by the state of signal DR. When DR is logic 1, the output of inverter 845a is a logic 0, this output being supplied to inverter 845b inverter 851, such that their outputs then become logic 1. Gate 836 receives the output of inverter 846 and is enabled thereby to present the output of transistor 834 to gate 844, the latter serving as a logic OR. By contrast, when DR is a logic 0, gate 836 is inhibited and the output of inverter 842 provides the output of transistor 840 as the logic input to gate 844. The output of gate 844, comprising selectively the outputs of amplifiers 834 and 840, therefore, is then passed through a squaring circuit 846 to ensure a proper digital waveform output for the ensuing decoding circuitry.

Integrator 850 includes dual time constant circuits which are selectively operable in the circuit in accordance with the normal and fast speed tape drives. These circuits are selected by the output of inverter 851 responsive to the logic 1 or 0 state of DR. Particularly, when DR is logic 1, inverter 851 presents logic 1 to integrator 850 to select the longer time constant, and which effectively overrides the shorter time constant circuit. By contrast, when DR is a logic 0, inverter 851 presents logic 0 and inhibits the longer time constant of integrator 850 associated with drive operation, thereby enabling the shorter time constant integrator functions associated with fast speed operation.

The particular features of amplifiers 840 and 834 are now discussed. It is noted that amplifier 840 remains operable in both fast and normal drive operation. In normal drive operation, however, its output is overridden by the output of amplifier 834, as gated through gate 836. Thus, concerning transistor amplifier 834 which is operable for the normal speed operation, the input thereto is maintained at the potential of the emitter through diode 832. This, in conjunction with resistor 833, resistor 831, and capacitor 830, serves to optimize the amplifier characteristics of transistor 834 when amplifying track 1 signal in normal operation. Transistor 834 therefore acts as a switch having states 0 and 1, corresponding to the data appearing on track 1, such that the signal appearing across the output load resistor 835 has the desired characteristics for supply as an input to gate 836. The biasing effect of resistor 833 and diode 832 is selected to afford the desired switching characteristics of transistor 834 in the system application.

By contrast, the input circuit to transistor 840, including capacitor 837, resistor 838, and biasing resistor 839, is such that the waveform appearing on track 1 is differentiated according to the time constant of the RC circuit 837, 838. This provides desirable characteristics for amplifying the TRACK 1 waveform when the tape is in fast forward or fast reverse operation. Transistor 840 then, switching off and on, provides a voltage across load resistor 841 of suitable form for input to inverter 842.

The output of gate 844 thus corresponds to the cyclic signals appearing on TRACK 1. Squaring circuit 846 responds thereto to provide square wave output signals suitable for digital processing, as follows. The output of squaring circuit 846 is supplied as an input to a four bit counter 848. Counter 848 then divides by two, four, eight, and sixteen in the usual manner, as long as the now, square wave, cycles of information are presented at its input. When counter 848 receives a reset signal, however, it returns to its 0000 state, awaiting further inputs.

The conditions for generating a reset occur as follows. The output of integrator 850 remains at a logic 1 as long as the input information of the squaring circuit 846 is supplying cycles of the proper frequency, corresponding to the time constant of the integrator. Recall that the time constant is selected in accordance with the output of inverter 851 as determined by the logic state of DR in relation to normal speed or high speed operation. When cycles of information no longer occur at the input to the integrator 850, and thus corresponding to the completion of a cycle group, i.e., a group of either two or four cycles, as read from the type, the integrator output then falls to a logic 0, permitting one shot 852 to issue an output pulse. This pulse is employed to strobe flip-flop 860 such that data appearing on the input, that is, a logic state 1 or 0, is then stored in flip-flop 860. The output of flip-flop 860 then appears directly as signal SERIN, which is in turn provided to the shift register logic and, particularly, as the SERIN input to the shift register.

The output of one shot 852 also triggers one shot 854 which in turn issues a pulse to gate 861, gate 861 also receiving at its input the output of flip-flop 858. The purpose of flip-flop 858 is to maintain a reset state such that the input to gate 861 remains at logic 0 of the four bit counter 848 has not counted to given number of cycles. Typically, this would require that two cycles be counted. The output of the four bit counter 848 is presented to inverter 859 which, in turn, sets flip-flop 858. This procedure then serves the function of supplying a "good" signal output, i.e., at least two cycles have been counted, to gate 861.

The output of gate 861, inverted through inverter 863, is presented to gate 864, serving as a logic NAND. The output of gate 864 is enabled when, in addition, inverter 865 produces a logic 1 at its output. This corresponds to the output of gate 862, serving as a logic OR, being in the logic 0 state. In turn, gate 862 produces a logic 0 output when neither signal F3 nor SERBL is true; these signals are supplied through inverters 868 and 869, respectively, to provide the appropriate logic state inputs to gate 962 for the logic OR function. Further, gate 967, serving as a logic OR, provides at its output the output signal CLOCK 1. CLOCK 1, as before noted, is supplied to the system and in particular to the shift register logic.

The logic of the modem selects between the output of clock generator 800, supplied as an input to gate 866, and the tape derived clock signal, supplied as an input to gate 864. Thus, gates 864 and 866 both supply their outputs to gate 867 from which CLOCK 1 is derived. Thus, CLOCK 1 may be derived from data processed in the decoding mode of the modem, or CLOCK 1 may result from gating of the clock generator output in either the record functions, as indicated by F3, or the SERBL function. It is noted that gating with SERBL provides a clock to the system in lieu of the tape derived clock, for clocking the shift register free of extraneous data in tape start up and tape slow down operation. Also, as discussed previously, blanking during serial input of data is achieved by inverters 868, 870, and 871 responsive to F3; inverter 871 produces a logic 0 at its output when F3 is true, and serves the function of blanking the input to the shift register of the shift register logic when the system is in the record state.

The decoding procedure continues with the triggering of one shoot 856, its true output being employed to reset four bit counter 848 and its inverted output, through inverter 857, being employed to reset flip-flop 858. Thus, the decoding circuitry is returned to its initial state each time the input data signal of TRACK 1 ceases to contain cycles of information sufficient to activate amplifiers 840 or 834, as appropriate. The number of cycles counted by four bit counter 848, until time of reset, then is stored in flip-flop 860 to be presented as either logic 1 or logic 0 data to signal line SERIN. It is noted that if a logic 0 obtains at the output of the four bit counter 848, and thus is supplied as an input to flip-flop 860 at the time of the output pulse from one shot 852, then a logic 0 is produced in the SERIN output. If, however, the four bit counter 848 has counted sufficient cycles so that a logic 1 appears on its output, and thus, is supplied as an input to flip-flop 860 at time of the output pulse from one shot 852, a logic 1 is produced in the SERIN output. In any event, a minimum number of cycles, typically two, must be counted to effect setting of flip-flop 858, thereby to indicate receipt of a "good" signal from the tape and accordingly enabling a clock pulse to be issued to the system. Thus, the modem produces both a clock pulse and a corresponding data bit in the CLOCK 1 and SERIN outputs, respectively, which, in accordance with approved digital processing techniques, are required to effect operations in response thereto by the system.

It will be apparent to those skilled in the art that numerous modifications and adaptations to the system of the invention may be made and thus it is intended by the appended claims to cover all such modifications and adaptations as fall within the true spirit and scope of the invention.

What is claimed is:

1. A system for recording information to be reproduced in accordance with a desired program, said system utilizing a recording medium and being operable in a record mode to simultaneously record the information in an information track and digital words in a control track of the medium, the digital words including index words of an ordered sequence for defining positions in said medium and control words defining respectively corresponding operations to be performed for controlling reproduction of the information from the medium in accordance with the desired program, comprising:
    means for rendering said system operable in a record mode,
    means for recording information in the information track of said medium,
    means operable in the record mode of said system during recording of information for generating an ordered sequence of digital index words for recording in the control track of the medium during corresponding, periodic recording intervals,
    means for producing control inputs to said system to effect recording of corresponding control words,
    means responsive to each such control input for generating a corresponding control word to be recorded, and
    means selectively controlling the recording of index and control words and operable in response to each such control input to effect recording of the corresponding control word in the control track of the medium in lieu of a next index word of the sequence and during the next successive recording interval.

2. A system as recited in claim 1 wherein:
    said means responsive to a control input momentarily disables said index word generating means from operating a further index word of the sequence in response to receipt of a control input and said index word generating means again being enabled following recording of a control word corresponding to the control input to resume the generation of the said sequence of index words.

3. A system as recited in claim 1 wherein the digital words have a fixed format of bit positions including control bit positions and wherein:
    said index word and said control word generating means include means normally operable to encode the control bit positions of each digital word in each periodic recording interval to define an index word, and selectively operable in response to said control inputs to automatically encode said control bit positions to define the respectively corresponding control words.

4. A system as recited in claim 3 wherein the digital words are periodically made input to said recording means and wherein:
    said digital words further include a plurality of additional bit positions associated with said control bit positions,
    and there is further provided:
    storage means having a number of bit storage positions corresponding to the control and associated additional bit positions of the digital words,
    first gating means for supplying the encoded bits of the associated bit positions identifying the index number, from said index number generat-ing means to said respectively associated bit storage positions of said storage means,
    second gating means for supplying the encoded control bit positions from said control bit position encoding means to the corresponding bit storage positions of said storage means, and
    means for deriving from said storage means a serial bit train corresponding to the bits stored in the bit storage positions thereof for recording in said recording medium during each said periodic recording interval.

5. A system as recited in claim 4 wherein said storage means comprises a shift register.

6. A system as recited in claim 4 wherein there is further provided:
    further encoding means responsive to predetermined ones of said control inputs to automatically define encoded bits correspondings to at least selected ones of said additional associated bit positions, and third gating means associated with said further encoding means and responsive to receipt of said predetermined ones of said control inputs to supply the encoded bits produced by said further encoding means to the respectively corresponding bit storage positions of said storage means.

7. A system as recited in claim 5 further providing for converting the digital bits of information of the serial bit train to analog form for recording in a magnetic recording medium, further comprising:
means for generating a cyclic signal of predetermined frequency, and
means selectively responsive to the logic 1 and logic 0 data bits of the digital serial bit train and to said generating means to produce corresponding first and second groups of cycles of said cyclic signal, each said group comprising a predetermined and respectively associated number of cycles of said cyclic signal, thereby producing for the successive data bits of the digital information an analog signal of successive, respectively corresponding groups of cyclic signals of the predetermined cyclic frequency and of a number of cycles respectively corresponding to the logic 1 and logic 0 value of the said data bits for recording in the control track of the recording medium.

8. A system as recited in claim 7 wherein there is further provided:
a clock generator producing a clock pulse output of lower frequency than said cyclic signal, and
said cyclic signal generating means is enabled for generating a cyclic signal output of the predetermined frequency in response to each such clock pulse and for the duration thereof.

9. A system as recited in claim 8 wherein said means for producing said first and second groups of cycles of said cyclic signal comprises:
counting means receiving the cyclic signal output of said cyclic signal generator for counting the cycles thereof and producing outputs corresponding to counting of the predetermined numbers of said cycles respectively associated with said first and second groups, and
gating means receiving the cyclic signal output of said cyclic signal generator, the count indicating outputs of said counting means and the corresponding data bits of the digital information and selectively enabled thereby to effect gating through of the respectively corresponding predetermined numbers of cycles of the groups thereof in accordance with the logic 1 or logic 0 value of the data bits.

10. A system as recited in claim 6 further including:
a timing circuit initiated in operation in response to initiation of recording operations to define the periodic recording intervals and defining within each said periodic recording interval an initial blanking interval prior to recording and a second time portion defining the time operations of the recording functions,
decision logic means responsive to said timing means and to recognition of a control input to effect a decision, at the initiation of the recording time portion of said periodic recording interval, to record an index word or to record a control word and to maintain that decision for the duration of the periodic recording interval, and said decision logic means further being responsive to said timing circuit to selectively enable said first and second gating means in accordance with the decision to record an index word or a control word and, in accordance with that decision, to interrupt the further sequential generation of index numbers by said index number generator for each recording interval in which the decision is to record a control word.

11. A system as recited in claim 10 wherein said decision logic circuit further is responsive to said timing means to lock the encoded bits of said control bit positions and said associated bit positions of the digital word into the corresponding bit storage positions of said storage means and to prevent receipt by said storage means of any further bits for the duration of the recording interval.

12. A system as recited in claim 10 wherein said decision logic circuit is further responsive to said timing means to initiate serial read-out of the stored bits from said storage means for recording in the control track of said medium, and to reset said storage means at the conclusion of said recording interval.

13. A system as recited in claim 1 wherein there is further provided:
means to establish an edit substate of said system to enable recording of a control word within a previously recorded portion of the medium and responsive to an edit control input to establish the edit substate, and
means responsive to a control input to said machine during the edit substate thereof for effecting recording of a control word in the record track of said medium and upon completion of recording thereof to terminate the edit substate.

14. A system as recited in claim 13 wherein there is further provided:
means for establishing an index number corresponding to the beginning of the said previously recorded portion,
means for supplying that index number as an input to said system, and
means responsive to the index number thus supplied to preset the index number generating means to that count for initiating the generation of the sequence of index numbers from that count in subsequent recording.

15. A system as recited in claim 1 further operable in a play mode to read digital words from the control track of the medium and further responsive to control inputs to the machine to control the reproduction of the audio information from the information track in accordance with a desired program, further comprising:
means for rendering said system operable in a play mode,
means for reading information from the information track of said medium in said play mode,
means for reading the digital words from the associated control track of said medium in said play mode,
means for enabling both said information track and said control track reading means to effect simultaneous reading of the corresponding tracks during system operation for reproduction of information, and
means responsive to said digital word reading means and selectively operable in accordance with reading of index words to determine a unique location within said medium corresponding to an address as defined thereby, and operable in accordance with reading of control words to automatically establish the respectively corresponding system operations.

16. A system as recited in claim 15 further including:
shift register means for receiving as a serial input the bits of each encoded digital word read from the said medium by said reading means,
storage means for receiving from said system a digital word corresponding to a particular control word recorded on said medium,
comparator means for determining the sign and magnitude difference of a digital word from said storage means and a digital word from said shift register in said play mode to compare the data bits of each digital word read from said medium with the corresponding data bits of each digital word in said storage means, and
gating means associated with said shift register to read out the data bits from said shift register, and enabled in said play mode in response to each digital word read from said medium to enter the digital word thus read into said comparator.

17. A system as recited in claim 16 wherein the digital word supplied to said storage means comprises an index control word identifying an index number address of said medium and wherein there is further provided:
means responsive to said comparator means for searching said medium to locate the desired address thereof, and
said comparator means identifies the location of said desired address when the digital word read from said medium corresponds to the digital word of said storage means.

18. A system as recited in claim 16 further including:
means for inhibiting entry of data bits into said shift register during an initial interval of acceleration or deceleration relative to a transport speed of said recording medium for recording thereon in the record mode and for read out of digital words therefrom in the play mode of operation.

19. A system for reproducing information from a recording medium in accordance with a desired program defined by controls recorded on said medium and wherein the information to be reproduced is recorded on said medium in an information track and the controls are recorded on said medium in an associated control track and comprise digital words recorded at periodic intervals therein, the digital words including index words defining addresses of said medium and control words defining operations of said system in accordance with the desired program for controlling reproduction of information from said medium, comprising:
means for reading information from the information track of said medium,
means for reading the digital words from the associated control track of said medium,
means for enabling both said information track and said control track reading means to effect simultaneous reading of the corresponding tracks during system operation for reproduction of information, and
means responsive to said digital word reading means operable to determine the corresponding addresses of said medium in accordance with the reading of index words recorded in said medium, said means to determine including means to distinguish between index and control words in accordance with reading of control words to automatically establish the respectively corresponding system operations.

20. A system as recited in claim 19 further including:
means for establishing a desired address of the medium to be located in accordance with the number of the index word defining that address,
means responsive to an index control input to effect an address search of said medium in accordance with reading of the digital words from the control track thereof, and
means for comparing the index number of the desired address with the index number of each index word read from the medium to terminate the address search by said address search means when the desired address of the medium is located.

21. A system as recited in claim 19 wherein said simultaneous reading means is enabled only for reading of digital words during said address search and is inoperable to read the information from the information track during the address search.

22. A system as recited in claim 21 wherein said address search means is operable, upon said comparison means establishing that a desired address has been located, to enable said reading means to read information from the information track of the medium simultaneously with reading of a control track thereof.

23. A system as recited in claim 20 wherein the index words are recorded in said control track in an ordered sequence, and wherein:
said address search means is operable to effect relative movement of said medium and said reading means in opposite directions and initially to effect said movement in a first direction for reading of index words therefrom by said reading means and supply thereof to said comparison means for a first comparison to determine if the index numbers of the index words being read are greater than the index number of the desired address,
said address search means being responsive to said comparison means if said first comparison is satisfied to effect said relative movement in a second direction until the opposite comparison is satisfied by said comparison means that the number of the index words read from the tape is less than the index number of the desired address, and said address search means is thereupon operable to effect said relative movement to locate the desired address in accordance with the comparison by said comparison means that the index number of the desired address and that of an index word read from the tape are equal, thereby to initiate reproduction of information from said medium beginning at the desired, located address.

24. A system as recited in claim 19 wherein the information track contains at least one segment of information and plural portions within that segment to be selectively reproduced, each such portion of the segment having associated therewith a control word in said control track and corresponding to the beginning of said portion, and wherein said system further includes:
means selectively operable by an operator of said system to establish a control input designating for reproduction a portion of information contained within a segment and identified by the corresponding control word in the associated control track, and means responsive to said control input means for effecting a search of said medium for identifying the location of the corresponding control word and to effect reproduction of information in that portion of the segment designated by the corresponding control word.

25. A system as recited in claim 24 wherein said search means comprises:

control means for selectively effecting relative movement of said medium and said reading means at a drive speed for reading of information and of digital words from said corresponding tracks, and at fast forward and fast reverse speeds for reading of only said digital words from the corresponding control track during searching, said search means defines, in accordance with the control inputs, the direction of relative movement required for locating the portion thereby identified for reproduction, and said control means is responsive to said search means to drive said medium selectively in the forward and reverse directions at the fast speed to locate the corresponding control word, and at drive upon location thereof for reproduction of the information of that portion.

26. A system as recited in claim 19 wherein there is recorded in said medium a control word containing an index number defining an address of said medium for automatic branching to that defined address, comprising:

means responsive to reading of a branching control word to effect an address search of said medium in accordance with reading of the digital word from the control track thereof, and means for comparing the index number of the desired address derived from said branching control word with the index number of each index word read from the medium to terminate the address search by said address search means when the desired address of the medium is located.

27. A system as recited in claim 19 further including:

means for generating control inputs to said system by an operator of said machine to control system operations, and sequential logic means defining permitted sequences of operation of said system in response to control words read from said medium and the control inputs generated by an operator and inhibiting any response to control inputs inconsistent with the established sequence.

28. A system as recited in claim 19 wherein said recording medium comprises a magnetic tape.

29. A system as recited in claim 28 wherein said magnetic tape is provided in a tape cassette.

30. A system as recited in claim 19 wherein said recording medium comprises a magnetic tape and wherein there is further provided:

means for transporting said tape at drive, fast forward, and fast reverse speeds, means for establishing an indexing operation of said system to drive said tape at a fast transport speed to position said tape at a desired address as defined by a designated index number and corresponding to an index word having that number and defining the desired address, and means for selectively enabling the reading of information from said information track only in the normal drive speed of said transport means.

31. A system as recited in claim 19 wherein the digital words have a fixed format of bit positions including control bit positions distinguishing index and control words and defining each of a plurality of control words, further comprising:

means for receiving digital words read from the control track of the tape to distinguish and identify each bit thereof in accordance with the format of the digital words, and means responsive to the control bit positions of the digital words read from the tape to automatically produce the system operation identified thereby.

32. A system as recited in claim 31 further comprising:

means for transporting said medium for reading in a forward drive speed and in fast forward and fast reverse speeds, and means responsive to the direction of transport of said medium including gating means associated with the outputs of said digital word bit position receiving means and enabled in accordance with the direction of transport of the medium to select the correct bit positions as the control bits of the digital word read from the tape.

33. A system as recited in claim 32 wherein the digital words further include in the format thereof a plurality of additional bit positions associated with said control bit positions, and wherein:

said digital word receiving means includes bit storage positions corresponding to each bit position of the digital word format for storing in the respectively corresponding bit storage positions thereof the coded bits of each digital word read from the control track of the medium, and said gating means includes a plurality of bit gating means respectively associated with each bit storage position of said receiving means.

34. A system as recited in claim 33 further comprising:

means for generating a clock pulse in response to reading of each digital word from said medium, means responsive to each said clock pulse for enabling entry of the bits of each said digital word into said storage means, and means responsive to entry of a complete digital word for generating as outputs of said storage means, the data bits from the data bit storage positions of said storage means.

35. A system as recited in claim 34 further comprising:

means for storing a digital word defining a position of the medium to be addressed, and comparator means responsive to said address storage means and to said storage means for the digital words read from said medium to determine when the medium is positioned at the desired address.

36. A system as recited in claim 35 wherein:

the digital word defining a desired address is derived from a control word read from the medium, thereby to effect an automatic branching operation of said system.

37. A system as recited in claim 35 wherein the digital word defining a desired address is derived from a control input supplied to the system.

38. A system as recited in claim 37 wherein the control input comprises an indexing control to effect a random access search of the medium for a desired address.

39. A system as recited in claim 24 wherein the recorded information comprises a teaching program and each segment comprises a lesson and the portions thereof comprise at least a first portion including a question and associated multiple choice answers and a further portion corresponding to the selection of each such multiple choice answer and wherein a stop control word is recorded at the completion of the multiple choice answers and prior to the answer selection response portions and each such answer selection portion is preceded by a respectively corresponding answer control word, and wherein the system further comprises:

means responsive to the reading of a stop word by said reading means for stopping further reading of said medium, means responsive to an answer selection control input by an operator of the system to initiate search of that segment by said search means to locate a control word corresponding to the answer selection control input and designating the answer selection response portion of that segment, and said system thereupon reproducing that portion of the segment designated by and associated with the corresponding answer control word.

40. A system as recited in claim 22 wherein:

said search means is responsive to reading of answer control words not conforming to the answer selection control input to effect continued search of said medium.

41. A system as recited in claim 24 wherein a question start word is recorded in the control track simultaneously with the initiation of said first portion comprising the question and wherein there is further provided:

means responsive to a question repeat control input by an operator of the system to initiate search of that segment by said search means to locate the question start control word, and said system thereupon reproduces that question portion of the segment as designated by and associated with the corresponding question start word.

42. A system as recited in claim 19 wherein the signals read from the recording medium comprise groups of cyclic signals and wherein the system further includes means operable for converting the cyclic signals thus read to a digital format of logic 1 and logic 0 data bits and comprises:

means responsive to each group of cycles read from the medium to identify the receipt thereof, second counting means for counting the number of cycles in each said group to define the data bit value thereof as logic 1 or logic 0, accordingly, said counter being responsive to said group receiving means to be reset upon the completion of receipt of said group, and means responsive to the output of said second counting means and to said cycle group identifying means to be enabled by the latter upon completion of receipt of a group of cycles to produce an output of logic 1 or logic 0 data bits in accordance with the count accumulated by said counter.

43. A system as recited in claim 42 wherein there is further provided:

output gating means for producing a clock pulse in response to said cycle group identifying means identifying completion of receipt of a cycle group in reading of said medium.

44. A system for reproducing information from a recording medium in accordance with a desired program defined by digital control words recorded on said medium and wherein the information to be reproduced is recorded on said medium in an information track and the control words are recorded on said medium in an associated control track and define corresponding operations of said system in accordance with the desired program for controlling reproduction of information from said medium, and wherein the information track contains at least one segment of information and plural portions within that segment to be selectively reproduced, each such portion of the segment having associated therewith a control word in said control track and corresponding to the beginning of said portion, comprising:

means for reading information from the information track of said medium, means for reading the control words from the associated control track of said medium, means for enabling both said information track and said control track reading means to effect simultaneous reading of the corresponding tracks during machine operation for reproduction of information, means selectively operable by an operator of said system to establish a control input designating for reproduction a portion of information contained within a segment and identified by the corresponding control word in the associated control track, means responsive to said control input means for effecting a search of said medium for identifying the location of the corresponding control word and to effect reproduction of information in that portion of the segment designated by the corresponding control word, and wherein said search means includes control means for selectively effecting relative movement of said medium and said reading means at a drive speed for reading of information and of control words from said corresponding tracks, and at fast forward and fast reverse speed for reading of only said control words from the corresponding control tracks during search, said search means defines, in accordance with the control inputs, the direction of relative movement required for locating the portion thereby identified for reproduction, said control means is responsive to said search means to drive said medium selectively in the forward and reverse direction at the fast speed to locate the corresponding control word, and at drive upon location thereof for reproduction of the information of that portion, and means responsive to said digital control word reading means and operable in response to reading of each such control word to automatically establish the respectively corresponding system operation.

45. A system for recording information to be reproduced in accordance with a desired teaching program and operable in a record mode to simultaneously record audio information, comprising a sequence of instructional segments, each segment including at least a question and associated multiple choice answers and comments on each answer selection, in sequence, in an information track of a recording medium and digital words for controlling reproduction of the instructional sequence, in an associated control track of the recording medium, comprising:
  means for rendering said system operable in a record mode,
  audio response means for generating a signal for recording of the audio instructions in the information track of said medium in the record mode,
  means for generating index words of an ordered sequence for recording in said control track of said medium in periodic recording intervals in the record mode of said system to define addressable positions of said medium for selective reproduction in the play mode of said system,
  means for selectively recording control words in response to control inputs to said system during the record mode in lieu of index words within said periodic intervals,
  means operable in the record mode of said system for receiving control inputs and producing in response thereto digital control words for recording in the control track for controlling reproduction of the instructional sequence in accordance with a desired program.

46. A system as recited in claim 45 further comprising encoding means responsive to a plurality of control inputs for producing respectively corresponding digital control words and including a stop control word to be recorded upon completion of recording of a question and an answer control word recorded at the initiation of recording of each answer selection comment.

47. A system as recited in claim 46 operable in a play mode to reproduce the instructional sequence in accordance with the desired program established by the recorded control words and comprising:
  means responsive to a stop control word for interrupting further reproduction of information from said medium,
  means for receiving control inputs identifying answer choice selections in the play mode, and
  means operable to effect a search of said medium to locate the corresponding recorded answer control word within a given instructional segment for reproduction of the associated audio information.

48. A system as recited in claim 47 wherein said search means is responsive to reading of answer control words in conforming to the answer selection control input to effect continued search of said medium.

49. A system as recited in claim 46 wherein there is further provided:
  means for producing a question start control input,
  said encoding means responding thereto to generate a question start control word to be recorded on said medium at the initiation of recording of a question, and there is further provided
  means for receiving a question repeat control input in the play mode, and
  said search means is operable to search said medium within the corresponding segment to locate the question start control word in response to the question repeat control input and to automatically repeat the reproduction of that question.

50. A system as recited in claim 45 wherein there is further provided:
  means for producing a branching control input and including an index number identifying an address in said medium to which branching is to be effected in accordance with the program upon reading of the branch control word in the play mode.

51. A system as recited in claim 45 further comprising:
  means for producing an edit control input to establish an edit substate of the system, and
  means responsive to the edit substate and to a further control input to effect recording of a corresponding control word and simultaneously erasing of a previously recorded control word in the control track of the medium and thereupon to terminate further recording in the edit substate upon completion of recording of the control word.

52. A system as recited in claim 51 wherein said means responsive to the edit substate includes means for effecting a delay in recording of the control word subsequent to receipt of the control input to effect the recording thereof, thereby to permit proper relative movement of the recording medium and the recording means to assure proper recording of the control word.

53. A system as recited in claim 52 wherein there is further provided:
  means for establishing a predetermined index number, and
  means for initializing said index number generator at the established index number, thereby to effect generation of the ordered sequence of digital words from the established index number.

54. A system as recited in claim 46 wherein there is further provided:
  means for automatically encoding an answer control word to identify correct multiple choice answer selections.

* * * * *